United States Patent
Nakayama et al.

(10) Patent No.: US 11,426,980 B2
(45) Date of Patent: Aug. 30, 2022

(54) INTERLAYER FOR LAMINATED GLASS, LAMINATED GLASS, AND GLASS STRUCTURE

(71) Applicant: SEKISUI CHEMICAL CO., LTD., Osaka (JP)

(72) Inventors: Kazuhiko Nakayama, Kusatsu (JP); Yuusuke Oota, Moriyama (JP); Atsushi Nohara, Kusatsu (JP); Moyuru Okajima, Moriyama (JP); Kinryou Chou, Kusatsu (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 17/269,776

(22) PCT Filed: Aug. 23, 2019

(86) PCT No.: PCT/JP2019/033113
§ 371 (c)(1),
(2) Date: Feb. 19, 2021

(87) PCT Pub. No.: WO2020/040305
PCT Pub. Date: Feb. 27, 2020

(65) Prior Publication Data
US 2021/0316532 A1 Oct. 14, 2021

(30) Foreign Application Priority Data
Aug. 23, 2018 (JP) .............................. JP2018-156650

(51) Int. Cl.
*B32B 15/04* (2006.01)
*B32B 17/06* (2006.01)
(Continued)

(52) U.S. Cl.
CPC .......... *B32B 17/1066* (2013.01); *B32B 3/263* (2013.01); *B32B 17/10036* (2013.01);
(Continued)

(58) Field of Classification Search
CPC ....................... B32B 2307/4026; B32B 7/023
(Continued)

(56) References Cited

U.S. PATENT DOCUMENTS 8,137,815 B2 * 3/2012 Marumoto ............. C09J 129/14
428/436
8,288,746 B2 * 10/2012 Matsushita ................ B60J 1/00
250/573
(Continued)

FOREIGN PATENT DOCUMENTS

| CN | 102432203 | 5/2012 |
|---|---|---|
| EP | 2 330 089 | 6/2011 |

(Continued)

OTHER PUBLICATIONS

International Search Report dated Nov. 12, 2019 in International (PCT) Application No. PCT/JP2019/033113.

*Primary Examiner* — Lauren R Colgan
(74) *Attorney, Agent, or Firm* — Wenderoth, Lind & Ponack, L.L.P.

(57) ABSTRACT

An interlayer film for laminated glass of the present invention comprises at least an absorption region in which a skin absorption energy rate (X1) of a laminated glass is 25% or less, provided that the laminated glass is produced using two clear glass plates having a solar transmittance of 87.3% based on JIS R 3106.

6 Claims, 3 Drawing Sheets

(51) Int. Cl.
| | |
|---|---|
| *B32B 17/10* | (2006.01) |
| *B32B 3/26* | (2006.01) |
| *C03C 3/087* | (2006.01) |
| *C03C 17/32* | (2006.01) |
| *B32B 7/023* | (2019.01) |
| *B32B 27/08* | (2006.01) |
| *B32B 27/20* | (2006.01) |
| *B32B 27/30* | (2006.01) |
| *C03C 17/00* | (2006.01) |

(52) U.S. Cl.
CPC .. B32B 17/10357 (2013.01); B32B 17/10633 (2013.01); C03C 3/087 (2013.01); C03C 17/32 (2013.01); *B32B 7/023* (2019.01); *B32B 27/08* (2013.01); *B32B 27/20* (2013.01); *B32B 27/306* (2013.01); *B32B 2264/108* (2013.01); *B32B 2307/304* (2013.01); *B32B 2307/4026* (2013.01); *B32B 2307/412* (2013.01); *B32B 2551/00* (2013.01); *C03C 17/007* (2013.01); *C03C 17/009* (2013.01)

(58) Field of Classification Search
USPC .......................................... 428/426, 701, 702
See application file for complete search history.

(56) References Cited

U.S. PATENT DOCUMENTS

| | | | |
|---|---|---|---|
| 2007/0231584 A1 | 10/2007 | Hasegawa | |
| 2010/0219654 A1* | 9/2010 | Fujita | B60J 1/00 296/97.7 |
| 2012/0164409 A1* | 6/2012 | Masaki | B32B 17/10036 428/203 |
| 2014/0377567 A1* | 12/2014 | Ii | C08K 9/02 428/432 |
| 2015/0168619 A1* | 6/2015 | Ohmoto | B32B 17/10678 359/359 |
| 2016/0288460 A1* | 10/2016 | Nakayama | B32B 17/10623 |
| 2016/0288465 A1* | 10/2016 | Nakayama | B32B 17/10559 |
| 2016/0332424 A1* | 11/2016 | Yamaguchi | B32B 27/20 |
| 2017/0131446 A1 | 5/2017 | Fujita | |
| 2017/0259533 A1* | 9/2017 | Yamamoto | B32B 17/10036 |
| 2017/0274630 A1 | 9/2017 | Oota et al. | |
| 2018/0257343 A1* | 9/2018 | Yoshida | B32B 17/10761 |
| 2018/0264785 A1* | 9/2018 | Oota | B29C 48/13 |

FOREIGN PATENT DOCUMENTS

| | | |
|---|---|---|
| JP | 2001-220171 | 8/2001 |
| JP | 2007-55822 | 3/2007 |
| JP | 2007-91486 | 4/2007 |
| JP | 2010-111563 | 5/2010 |
| JP | 2012-206877 | 10/2012 |
| JP | 2014-166701 | 9/2014 |
| JP | 2015-6986 | 1/2015 |
| JP | 2017-119626 | 7/2017 |
| JP | 2017-128661 | 7/2017 |
| WO | 10/120431 | 5/1998 |
| WO | 2009/054051 | 4/2009 |
| WO | 2014/021407 | 2/2014 |
| WO | 2016/052421 | 4/2016 |

* cited by examiner

INTERLAYER FOR LAMINATED GLASS, LAMINATED GLASS, AND GLASS STRUCTURE

TECHNICAL FIELD

The present invention relates to an interlayer film for laminated glass, and a glass structure such as laminated glass, and for example, relates to an interlayer film for laminated glass, and a glass structure such as laminated glass which are used in automobiles and the like.

BACKGROUND ART

Even if laminated glass is externally shocked and damaged, bits of glass are less likely to be scattered, which is safe, so that the laminated glass is widely used as windshield of vehicles including automobiles, and windowpanes of buildings and the like. Laminated glass including a pair of glass plates and an interlayer film for laminated glass containing a resin component such as a polyvinyl acetal resin interposed between the pair of glass plates for integrating is widely known.

The Laminated glass used as the windshield of automobiles and windowpanes of buildings is required to have improved heat shielding property in order to prevent the internal temperatures of the automobiles or buildings from excessively rising. Therefore, it is conventionally known that an interlayer film for laminated glass includes first and second layers, and an infrared reflection layer interposed between the layers, whereby infrared rays are reflected by the infrared reflection layer, to improve heat shielding property (for example, see PTL 1).

As shown in PTL 2, an interlayer film for laminated glass is also known, which contains a thermoplastic resin, tin-doped indium oxide particles, metal-doped tungsten oxide particles, and at least one kind of compound among a phthalocyanine compound, a naphthalocyanine compound, and an anthracyanine compound. In the interlayer film for laminated glass of PTL 2, these particles and compounds are used to increase an infrared ray shielding rate, whereby feeling of scorching hot felt by catching infrared rays is suppressed.

CITATION LIST

Patent Literatures

PTL 1: WO 2014/021407
PTL 2: JP 2017-119626 A

SUMMARY OF INVENTION

Technical Problem

Meanwhile, the ratio of windowpane occupying a vehicle body or a building external wall or the like has tended to become larger year by year recently. For example, windowpane occupying a great majority of an automobile body has been also studied. Therefore, occupants of automobiles are apt to catch sunlight through windowpane for a long period of time, and may feel burning sensation. The burning sensation is feeling burning pains of the skin heated by light. However, in the conventional interlayer film for laminated glass, reduction in the burning sensation is not sufficiently considered, and therefore, it cannot be said that the burning sensation can be effectively reduced.

Then, it is an object of the present invention to provide an interlayer film for laminated glass, and a glass structure such as laminated glass which can effectively reduce burning sensation caused by continuously catching sunlight for a long period of time.

Solution to Problem

As a result of intensive studies, the present inventors have found that the sense of burning sensation is closely related to a skin absorption energy rate represented by a proportion of sunlight absorbed by the skin. As a result of further studies, the present inventors have found that, by reducing the skin absorption energy rate of an interlayer film for laminated glass, and a glass structure such as laminated glass, the burning sensation felt by continuously catching the sunlight through the glass structure such as laminated glass can be effectively reduced, and have completed the following present invention.

That is, the present invention provides the following [1] to [14].

[1] An interlayer film for laminated glass comprising at least an absorption region in which a skin absorption energy rate (X1) of a laminated glass is 25% or less, provided that the laminated glass is produced using two clear glass plates having a solar transmittance of 87.3% based on JIS R 3106.

[2] The interlayer film for laminated glass according to the above [1], wherein the interlayer film for laminated glass includes a light-blocking absorption region in which a visible light transmittance (X2) of the laminated glass is less than 70% and a skin absorption energy rate (X1) of the laminated glass is 15% or less.

[3] The interlayer film for laminated glass according to the above [2], wherein the interlayer film for laminated glass contains both a heat shielding agent and a colorant in the light-blocking absorption region.

[4] The interlayer film for laminated glass according to any one of the above [1] to [3], wherein: the interlayer film for laminated glass contains a colorant; and the colorant contains a carbonaceous material and a coloring matter other than the carbonaceous material.

[5] The interlayer film for laminated glass according to any one of the above [1] to [4], wherein the interlayer film for laminated glass includes a light-permeable absorption region in which the visible light transmittance (X2) is 70% or more and the skin absorption energy rate (X1) is 25% or less.

[6] The interlayer film for laminated glass according to the above [5], wherein the interlayer film for laminated glass contains a heat shielding agent in the light-permeable absorption region.

[7] A laminated glass comprising: two glass plates; and an interlayer film for laminated glass disposed between the two glass plates, the laminated glass including at least a glass absorption region in which a skin absorption energy rate (Y1) of the laminated glass is 25% or less.

[8] The laminated glass according to the above [7], wherein the laminated glass includes a glass light-blocking absorption region in which a visible light transmittance (Y2) of the laminated glass is less than 70% and the skin absorption energy rate (Y1) is 15% or less.

[9] The laminated glass according to the above [8], wherein the interlayer film for laminated glass contains both a heat shielding agent and a colorant in the glass light-blocking absorption region.

[10] The laminated glass according to the above [8] or [9], wherein: the interlayer film for laminated glass contains a colorant in the glass light-blocking absorption region; and the colorant contains a carbonaceous material and a coloring matter other than the carbonaceous material.

[11] The laminated glass according to any one of the above [7] to [10], wherein the laminated glass includes a glass light-permeable absorption region in which the visible light transmittance (Y2) is 70% or more and the skin absorption energy rate (Y1) is 25% or less.

[12] The laminated glass according to the above [11], wherein the interlayer film for laminated glass contains a heat shielding agent in the glass light-permeable absorption region.

[13] A glass structure comprising at least a glass absorption region in which a skin absorption energy rate (Y1) of the glass structure is 25% or less.

[14] The glass structure according to the above [13], further comprising a glass plate, wherein a skin absorption energy rate of the glass plate is 25% or less.

Advantageous Effects of Invention

An interlayer film for laminated glass, laminated glass, and a glass structure of the present invention can effectively reduce burning sensation caused by continuously catching sunlight for a long period of time.

DESCRIPTION OF EMBODIMENTS

Figure 1:
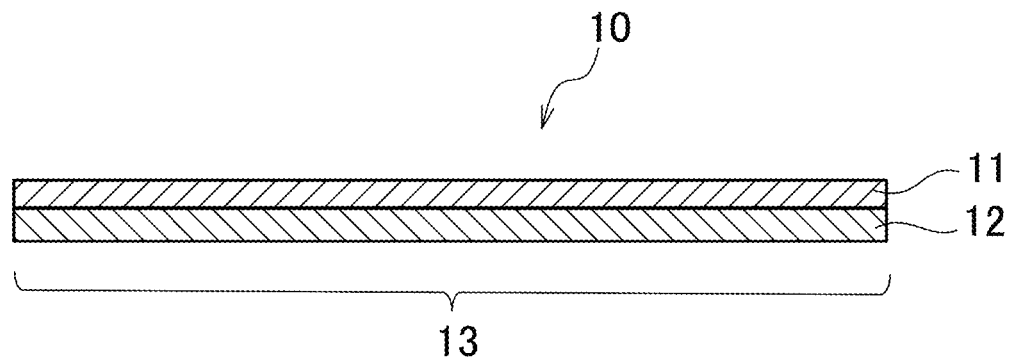
FIG. 1 is a sectional view of an interlayer film for laminated glass according to a first embodiment.

<Interlayer Film for Laminated Glass>
Hereinafter, the present invention will be described in detail using an embodiment.

An interlayer film for laminated glass of the present invention includes at least a region (hereinafter also merely referred to as "absorption region") in which a skin absorption energy rate (hereinafter also merely referred to as "skin absorption energy rate (X1)") of a laminated glass is 25% or more, provided that the laminated glass is produced using two standard glass plates. The standard glass is a clear glass plate having a solar transmittance of 87.3% based on JIS R 3106. The skin absorption energy rate (X1) is calculated by a method shown in Examples to be described later.

In the present invention, the interlayer film for laminated glass includes the absorption region in which the skin absorption energy rate (X1) is 25% or less, whereby the proportion of sunlight absorbed by the skin is low, which is less likely to cause the skin to feel burning sensation even if the sunlight is caught through the laminated glass for a long period of time.

Meanwhile, if the skin absorption energy rate (X1) is more than 25%, the proportion of sunlight absorbed by the skin is high, so that the skin is caused to be apt to feel the burning sensation in a short time when the sunlight is caught through the laminated glass. The skin absorption energy rate (X1) is preferably 20% or less, more preferably 15% or less, still more preferably 12% or less, and particularly preferably 10% or less, from the viewpoint of further extending a time until the burning sensation is felt from the start of catching of the sunlight.

The skin absorption energy rate (X1) is preferably lower in order to extend the time until the burning sensation is felt, but the skin absorption energy rate (X1) is preferably 0.5% or more, and more preferably 1.0% or more in order not to shield the sunlight beyond necessity to decrease a visible light transmittance beyond necessity.

In the present invention, the interlayer film for laminated glass may be an absorption region in which the skin absorption energy rate (X1) of the whole surface (that is, the whole region) of the interlayer film for laminated glass is within the above range, or only a part thereof may serve as the absorption region. Even when only a part thereof is the absorption region, and a person is irradiated with sunlight through the region, the person irradiated with the sunlight is less likely to feel the burning sensation, whereby a certain effect is provided. In such a case, for example, a region in which the skin of a person's face or the like is apt to be directly irradiated with sunlight may be the absorption region.

In the interlayer film for laminated glass, the area of the absorption region is not particularly limited, but it is preferably 5% or more and 100% or less of the whole region, more preferably 10% or more and 100% or less, and still more preferably 30% or more and 100% or less. The area of the absorption region may be 40% or more, 60% or more, or 80% or more.

The visible light transmittance in the interlayer film for laminated glass of the present invention may be appropriately set according to applications and use positions and the like. For example, the interlayer film for laminated glass may include a region (hereinafter also referred to as "light-blocking region") in which the visible light transmittance (hereinafter also merely referred to as "visible light transmittance (X2)") of a laminated glass is less than 70%, provided that the laminated glass is produced using standard glass plates, or may include a region (hereinafter also referred to as "light-permeable region") in which the visible light transmittance (X2) is 70% or more.

(Light-Blocking Absorption Region)
In one embodiment of the present invention, the interlayer film for laminated glass preferably includes a region (hereinafter also referred to as "light-blocking absorption region") in which a visible light transmittance (X2) is less than 70%, and a skin absorption energy rate (X1) is 15% or less.

The light-blocking region in which a visible light transmittance (X2) is less than 70% is generally a region blocking sunlight with which a person is irradiated for securing antiglare property, for example, and the skin and the like to be exposed is irradiated with the sunlight with which a person is irradiated through the region for a long period of time in many cases. For example, in an automobile, a sunshade and roof glass and the like provided in the upper part of windshield are composed of a light-blocking region in many cases. The skin of an occupant's face and the like is mainly directly irradiated with sunlight transmitted through the light-blocking region in many cases. Therefore, burning sensation felt by the occupant and the like of the automobile can be effectively reduced by setting the skin absorption energy rate in such a region to 15% or less.

Since the light-blocking absorption region generally contains a colorant in order to decrease the visible light transmittance (X2) as described later, an interaction between the colorant and a heat shielding agent to be described later makes it possible to effectively set the skin absorption energy rate to a low value. That is, in the light-blocking absorption region, the skin absorption energy rate is likely to be further decreased.

From the aforementioned points, the interlayer film for laminated glass more preferably includes a region in which a skin absorption energy rate (X1) is 12% or less in the light-blocking absorption region, still more preferably a region in which a skin absorption energy rate (X1) is 10% or less, particularly preferably a region in which a skin absorption energy rate (X1) is 7% or less, and most preferably a region in which a skin absorption energy rate (X1) is theoretically 0%. The skin absorption energy rate (X1) in the light-blocking absorption region is preferably 0.1% or more in order to secure a visible light transmittance equal to or greater than a certain value, more preferably 0.5% or more, and still more preferably 1.0% or more.

The interlayer film for laminated glass preferably has a visible light transmittance (X2) of 50% or less, more preferably 20% or less, and still more preferably 4% or less in the light-blocking absorption region having the desired skin absorption energy rate (X1). The interlayer film for laminated glass includes the light-blocking absorption region in which the visible light transmittance (X2) is equal to or less than these upper limits, whereby sufficient light-blocking property can be imparted to the laminated glass, and the skin absorption energy rate (X1) is also likely to be decreased.

The visible light transmittance (X2) of the interlayer film for laminated glass is preferably 0.5% or more, more preferably 0.7% or more, and still more preferably 1% or more in the light-blocking absorption region in order to transmit light of a certain amount or more through the laminated glass to cause the laminated glass to function as a window.

The whole region (whole surface) of the interlayer film for laminated glass including the light-blocking absorption region may serve as the light-blocking absorption region, or a part of the region may serve as the light-blocking absorption region.

When a part of the region in the interlayer film for laminated glass serves as the light-blocking absorption region, a region other than the light-blocking absorption region may be a region (light-permeable region) in which a visible light transmittance (X2) is 70% or more, or a light-blocking region in which a visible light transmittance (X2) is less than 70%, but a skin absorption energy rate (X1) is more than 15%. Both the regions may be present in the region other than the light-blocking absorption region.

In the interlayer film for laminated glass, the area of the light-blocking absorption region is not particularly limited, but it is preferably 5% or more and 100% or less of the whole region, and more preferably 10% or more and 100% or less.

(Light-Permeable Absorption Region)

In another preferred embodiment of the present invention, the interlayer film for laminated glass includes a region (hereinafter also referred to as "light-permeable absorption region") in which a visible light transmittance (X2) is 70% or more and a skin absorption energy rate (X1) is 25% or less.

In the present invention, burning sensation felt by an occupant of an automobile or a person in a building can be effectively reduced by setting the skin absorption energy rate (X1) to 25% or less. The interlayer film for laminated glass preferably includes a region in which the skin absorption energy rate (X1) is 20% or less in the light-permeable absorption region from such a viewpoint.

The light-permeable region in which a visible light transmittance (X2) is 70% or more is generally a region for visually recognizing the external side from the inside of a building or the inside of an automobile. For example, the light-permeable region is a portion other than a sunshade provided in an upper part in the windshield of an automobile, and an exposed portion of the skin of a face or the like is less likely to be irradiated with sunlight made incident through the region in many cases. Therefore, even if the skin absorption energy rate (X1) is not so low, burning sensation felt by an occupant and the like of an automobile can be reduced. From such a viewpoint, the interlayer film for laminated glass may have a skin absorption energy rate (X1) of 10% or more or 15% or more in the light-permeable absorption region.

The interlayer film for laminated glass preferably includes a region in which a visible light transmittance (X2) is 75% or more in the light-permeable absorption region from the viewpoint of securing light permeability while effectively reducing burning sensation, and more preferably includes a region in which a visible light transmittance (X2) is 80% or more. The visible light transmittance (X2) is preferably higher, but the interlayer film for laminated glass preferably has a visible light transmittance (X2) of 95% or less, more preferably 90% or less, and still more preferably 87% or less in the light-permeable absorption region in order to decrease the skin absorption energy rate (X1).

When the interlayer film for laminated glass includes the light-permeable absorption region, the whole region of the interlayer film for laminated glass may serve as the light-permeable absorption region, and a part of the region may serve as the light-permeable absorption region. When a part of the region may serve as the light-permeable absorption region, the other region may be a region (light-blocking region) in which a visible light transmittance (X2) is less than 70%, or a region in which a visible light transmittance (X2) is 70% or more, and a skin absorption energy rate (X1) is more than 25%. Both the regions may be present in the other region.

In the interlayer film for laminated glass, the area of the light-permeable light-blocking absorption region is not particularly limited, but it is preferably 5% or more and 100% or less of the whole region, and more preferably 10% or more and 100% or less.

In yet another preferred embodiment of the present invention, the interlayer film for laminated glass includes both the light-blocking absorption region and the light-permeable absorption region. According to such a constitution, while the light-permeable absorption region provides good visibility, both the light-permeable absorption region and the light-blocking absorption region effectively prevent the absorption of light energy by the skin of a person in an automobile or a building, whereby burning sensation can be more effectively reduced.

When the interlayer film for laminated glass includes both the light-blocking absorption region and the light-permeable absorption region, detailed constitutions such as ranges of the visible light transmittance (X2) and the skin absorption energy rate (X1) in each of the light-blocking absorption region and the light-permeable absorption region are as described above.

In the interlayer film for laminated glass of the present invention, the skin absorption energy rate (X1) may be within a predetermined range as described above, but T1500 of a laminated glass is, for example, 30% or less, preferably 0.1% or more and 28% or less, more preferably 0.1% or more and 15% or less, and still more preferably 0.1% or more and 5% or less, provided that the laminate glass is produced using two standard glass plates.

The interlayer film for laminated glass of the present invention includes the light-blocking absorption region, the light-permeable absorption region, or both the regions as described above, but when the interlayer film for laminated glass includes the light-blocking absorption region, the above T1500 of the light-blocking absorption region may be within the above range. When the interlayer film for laminated glass includes the light-permeable absorption region, the above T1500 of the light-permeable absorption region may be within the above range. Furthermore, when the interlayer film for laminated glass includes both the light-blocking absorption region and the light-permeable absorption region, the above T1500 of each of the light-blocking absorption region and the light-permeable absorption region may be within the above range. The T1500 is obtained by measuring a transmittance at a wavelength of 1500 nm using a spectral photometer, and the measuring method thereof is as described in detail in Examples.

When the interlayer film for laminated glass includes the light-permeable region and the light-blocking region, these regions are disposed so as to be aligned along a direction perpendicular to a thickness direction. The interlayer film for laminated glass may include a gradation region in which a visible light transmittance (X2) is continuously changed.

The gradation region may be provided in the light-permeable region or the light-blocking region. The gradation region may be provided across the light-permeable region and the light-blocking region, a boundary between the light-permeable region and the light-blocking region being in the gradation region. That is, the whole gradation region may serve as the light-permeable region or the light-blocking region, but a part of the gradation region may serve as the light-permeable region, a part thereof serving as the light-blocking region.

The skin absorption energy rate (X1) in the gradation region may be continuously changed together with the visible light transmittance (X2).

When the interlayer film for laminated glass includes the light-permeable region and the light-blocking region, the skin absorption energy rate (X1) may be a predetermined range as described above in the light-permeable region, at least a part thereof serving as the light-permeable absorption region. Similarly, the interlayer film for laminated glass may have a skin absorption energy rate (X1) within a predetermined range as described above in the light-blocking region, at least a part thereof serving as the light-blocking absorption region. Of course, both at least a part of the light-permeable region and at least a part of the light-blocking region may respectively serve as the light-permeable absorption region and the light-blocking absorption region, or the whole light-permeable region and the whole light-blocking region may respectively serve as the light-permeable absorption region and the light-blocking absorption region.

The thickness of the interlayer film for laminated glass is preferably 0.2 mm or more and 1.5 mm or less. The kind and content of the colorant, and the kind and content of the heat shielding agent in the interlayer film for laminated glass are adjusted as described above, and the thickness of the interlayer film for laminated glass is set within these ranges, whereby the visible light transmittance (X2) and the skin absorption energy rate (X1) are likely to be adjusted within the above ranges. From these viewpoints, the thickness of the interlayer film for laminated glass is more preferably 0.25 mm or more and 1.0 mm or less, and still more preferably 0.3 mm or more and 0.9 mm or less.

(Resin)

The interlayer film for laminated glass of the present invention contains one or more resin layers, and each of the resin layers contains a resin. The resin is preferably a thermoplastic resin. The interlayer film for laminated glass contains the thermoplastic resin, which is likely to serve a function as an adhesion layer, whereby good adhesiveness to a glass plate is provided. The colorant and the heat shielding agent and the like to be described later are dispersed in the resin or the mixture of the resin and the plasticizer to be described later.

Examples of the thermoplastic resin include, but are not particularly limited to, a polyvinyl acetal resin, an ethylene-vinyl acetate copolymer resin, an ionomer resin, a polyurethane resin, a thermoplastic elastomer, an acrylic resin, an acrylic-vinyl acetate copolymer resin, a polyvinyl alcohol resin, a polyolefin resin, a polyvinyl acetate resin, and a polystyrene resin. The use of these resins is likely to secure adhesiveness to the glass plate.

In the interlayer film for laminated glass of the present invention, each of the thermoplastic resins may be used alone, or two or more of them may be used in combination. Among these, at least one selected from the group consisting of a polyvinyl acetal resin and an ethylene-vinyl acetate copolymer resin is preferable, and a polyvinyl acetal resin is more preferable from the viewpoint of exhibiting excellent adhesiveness to glass when the polyvinyl acetal resin is used in combination with a plasticizer.

When the interlayer film for laminated glass contains a plurality of resin layers, resins constituting the resin layers may be appropriately selected from the group consisting of the resins listed above. The resins constituting the resin layers may be different from each other, but these are preferably the same.

Therefore, when the interlayer film for laminated glass contains a plurality of resin layers, the resins constituting the resin layers are preferably a polyvinyl acetal resin or an ethylene-vinyl acetate copolymer resin, and more preferably a polyvinyl acetal resin.

(Polyvinyl Acetal Resin)

The polyvinyl acetal resin is not particularly limited as long as it is obtained by acetalizing a polyvinyl alcohol with an aldehyde, and a polyvinyl butyral resin is suitable. A preferable lower limit of the acetalization degree of the polyvinyl acetal resin is 40 mol %, and a preferable upper limit thereof is 85 mol %. A more preferable lower limit thereof is 60 mol %, and a more preferable upper limit thereof is 75 mol %.

A preferable lower limit of the amount of hydroxyl groups of the polyvinyl acetal resin is 15 mol %, and a preferable upper limit thereof is 35 mol %. The amount of the hydroxyl groups of 15 mol % or more is likely to provide good adhesiveness to a glass plate and the like, and good penetration resistance of the laminated glass, and the like. The amount of the hydroxyl groups is set to 35 mol % or less, which prevents the laminated glass from being too hard. A more preferable lower limit of the amount of the hydroxyl groups is 25 mol %, and a more preferable upper limit thereof is 33 mol %.

When a polyvinyl butyral resin is used as the polyvinyl acetal resin, from the same viewpoint, a preferable lower limit of the amount of the hydroxyl groups is 15 mol %, and a preferable upper limit thereof is 35 mol %. A more preferable lower limit of the hydroxyl groups is 25 mol %, and a more preferable upper limit thereof is 33 mol %.

The acetalization degree and the amount of the hydroxyl groups can be measured by a method based on JIS K 6728 "Testing methods for polyvinyl butyral".

The polyvinyl acetal resin can be prepared by acetalizing a polyvinyl alcohol with an aldehyde. The polyvinyl alcohol is usually obtained by saponifying a polyvinyl acetate, and a polyvinyl alcohol with a saponification degree of 80 to 99.8 mol % is generally used.

A preferable lower limit of the polymerization degree of the polyvinyl acetal resin is 500, and a preferable upper limit thereof is 4,000. The polymerization degree is set to 500 or more, whereby the laminated glass has good penetration resistance. The polymerization degree is set to 4,000 or less, whereby the laminated glass is likely to be molded. A preferable lower limit of the polymerization degree is 1000, and a preferable upper limit thereof is 3600.

The aldehyde is not particularly limited, and generally, a C1 to C10 aldehyde is suitably used. The C1 to C10 aldehyde is not particularly limited, and examples thereof include n-butyl aldehyde, isobutyl aldehyde, n-valeraldehyde, 2-ethyl butyl aldehyde, n-hexyl aldehyde, n-octyl aldehyde, n-nonyl aldehyde, n-decyl aldehyde, formaldehyde, acetaldehyde, and benzaldehyde. Among these, n-butyl aldehyde, n-hexyl aldehyde, and n-valeraldehyde are preferable, and n-butyl aldehyde is more preferable. Each of these aldehydes may be used alone, or two or more of them may be used in combination.

(Ethylene-Vinyl Acetate Copolymer Resin)

The ethylene-vinyl acetate copolymer resin may be a non-crosslinked type ethylene-vinyl acetate copolymer resin or a high temperature crosslinked type ethylene-vinyl acetate copolymer resin. There may also be used modified ethylene-vinyl acetate resins such as saponified ethylene-vinyl acetate copolymer and hydrolyzed ethylene vinyl acetate as the ethylene-vinyl acetate copolymer resin.

The ethylene-vinyl acetate copolymer resin preferably has a vinyl acetate content of 10 to 50% by mass, and more preferably 20 to 40% by mass, as measured based on JIS K 6730 "Testing method for ethylene-vinyl acetate resin" or JIS K 6924-2:1997. The vinyl acetate content is set to be equal to or greater than these lower limits, whereby the adhesiveness to the glass is increased, and the penetration resistance of the laminated glass is likely to be good. The vinyl acetate content is set to be equal to or less than these upper limits, whereby the breaking strength of the interlayer film for laminated glass is increased, which provides good shock resistance of the laminated glass.

(Ionomer Resin)

The ionomer resin is not particularly limited, and various ionomer resins may be used. Specific examples thereof include an ethylene-based ionomer, a styrene-based ionomer, a perfluorocarbon-based ionomer, a telechelic ionomer, and a polyurethane ionomer. Among these ionomers, an ethylene-based ionomer is preferable from the viewpoints of good mechanical strength, endurance, and transparency and the like of the laminated glass, and excellent adhesiveness to glass.

Since an ionomer of an ethylene-unsaturated carboxylic acid copolymer has excellent transparency and high toughness, the ionomer is suitably used as the ethylene-based ionomer. The ethylene-unsaturated carboxylic acid copolymer is a copolymer containing at least a constitutional unit derived from ethylene and a constitutional unit derived from unsaturated carboxylic acid, and may have a constitutional unit derived from other monomer.

Examples of the unsaturated carboxylic acid include acrylic acid, methacrylic acid, and maleic acid. Acrylic acid and methacrylic acid are preferable, and methacrylic acid is particularly preferable. Examples of the other monomer include an acrylic acid ester, a methacrylic acid ester, and 1-butene.

The ethylene-unsaturated carboxylic acid copolymer preferably contains 75 to 99 mol % of the constitutional unit derived from ethylene when all the constitutional units contained in the copolymer is 100 mol %, and preferably contains 1 to 25 mol % of the constitutional unit derived from unsaturated carboxylic acid.

The ionomer of the ethylene-unsaturated carboxylic acid copolymer is an ionomer resin obtained by neutralizing or crosslinking at least a part of carboxyl groups contained in the ethylene-unsaturated carboxylic acid copolymer with metal ions. The degree of neutralization of the carboxyl group is usually 1 to 90%, and preferably 5 to 85%.

Examples of an ion source in the ionomer resin include alkaline metals such as lithium, sodium, potassium, rubidium, and cesium, and polyvalent metals such as magnesium, calcium, and zinc. Sodium and zinc are preferable.

A method for manufacturing the ionomer resin is not particularly limited, and the ionomer resin can be manufactured by a conventionally known manufacturing method. For example, when the ionomer of ethylene-unsaturated carboxylic acid copolymer is used as the ionomer resin, for example, ethylene and unsaturated carboxylic acid are subjected to radical copolymerization at elevated temperatures and pressures to manufacture an ethylene-unsaturated carboxylic acid copolymer. The ionomer of ethylene-unsaturated carboxylic acid copolymer can be manufactured by causing the ethylene-unsaturated carboxylic acid copolymer to react with a metallic compound containing the ion source.

(Polyurethane Resin)

Examples of the polyurethane resin include polyurethane obtained by causing an isocyanate compound to react with a diol compound, and polyurethane obtained by causing an isocyanate compound to react with a diol compound, and a chain extender such as polyamine. The polyurethane resin may contain a sulfur atom. In that case, a part or the whole of the diol may be selected from the group consisting of a polythiol and a sulfur-containing polyol. The polyurethane resin can provide good adhesiveness to organic glass. Therefore, when the glass plate is organic glass, the polyurethane resin is suitably used.

(Thermoplastic Elastomer)

Examples of the thermoplastic elastomer include a styrene-based thermoplastic elastomer and an aliphatic polyolefin. The styrene-based thermoplastic elastomer is not particularly limited, and a known styrene-based thermoplastic elastomer can be used. The styrene-based thermoplastic elastomer generally has a styrene monomer polymer block serving as a hard segment, and a conjugate diene compound polymer block serving as a soft segment or its hydrogenated block. Specific examples of the styrene-based thermoplastic elastomer include a styrene-isoprene diblock copolymer, a styrene-butadiene diblock copolymer, a styrene-isoprene styrene triblock copolymer, a styrene-butadiene/isoprene-styrene triblock copolymer, a styrene-butadiene-styrene triblock copolymer, and their hydrogenated products.

The aliphatic polyolefin may be a saturated aliphatic polyolefin, or may be an unsaturated aliphatic polyolefin. The aliphatic polyolefin may be a polyolefin containing a chain olefin as a monomer, or may be a polyolefin containing a cyclic olefin as a monomer. From the viewpoint of effectively improving the preservation stability of the interlayer film, and sound insulating properties, the aliphatic polyolefin is preferably a saturated aliphatic polyolefin.

Examples of the material of the aliphatic polyolefin include ethylene, propylene, 1-butene, trans-2-butene, cis-2-butene, 1-pentene, trans-2-pentene, cis-2-pentene, 1-hexene, trans-2-hexene, cis-2-hexene, trans-3-hexene, cis-3-hexene, 1-heptene, trans-2-heptene, cis-2-heptene, trans-3-heptene, cis-3-heptene, 1-octene, trans-2-octene, cis-2-octene, trans-3-octene, cis-3-octene, trans-4-octene, cis-4-octene, 1-nonen, trans-2-nonen, cis-2-nonen, trans-3-nonen, cis-3-nonen, trans-4-nonen, cis-4-nonen, 1-decene, trans-2-decene, cis-2-decene, trans-3-decene, cis-3-decene, trans-4-decene, cis-4-decene, trans-5-decene, cis-5-decene, 4-methyl-1-pentene, and vinyl cyclohexane.

(Plasticizer)

The interlayer film for laminated glass of the present invention may further contain a plasticizer when it contains the thermoplastic resin. When the interlayer film for laminated glass contains the plasticizer, the interlayer film for laminated glass is softened. As a result, the laminated glass is softened to have improved penetration resistance. Furthermore, high adhesiveness to the glass plate can also be exhibited. When the polyvinyl acetal resin is used as the thermoplastic resin, containing the plasticizer is particularly effective.

Examples of the plasticizer include organic ester plasticizers such as a monobasic organic acid ester and a polybasic organic acid ester, and phosphate plasticizers such as an organic phosphate plasticizer and an organic phosphorous acid plasticizer. Among these, an organic ester plasticizer is preferable.

Examples of the organic ester plasticizer include triethylene glycol di-2-ethyl butyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethyl butyrate, 1,3-propylene glycol di-2-ethylbutyrate, 1,4-butylene glycol di-2-ethylbutyrate, 1,2-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, triethylene glycol di-2-ethylbutyrate, diethylene glycol dicaprylate, triethylene glycol di-n-heptanoate, tetraethylene glycol di-n-heptanoate, triethylene glycol di-2-ethylbutyrate, dihexyl adipate, dioctyl adipate, hexylcyclohexyl adipate, diisononyl adipate, heptylnonyl adipate, dibutyl sebacate, modified sebacic alkyd, mixtures of a phosphoric acid ester and an adipic acid ester, and mixed adipic acid esters. Examples of the mixed adipic acid ester include an adipic acid ester prepared from two or more alcohols selected from the group consisting of a C4 to C9 alkyl alcohol, and a C4 to C9 cyclic alcohol.

Among these plasticizers, triethylene glycol-di-2-ethylhexanoate (3GO) is particularly suitably used.

In the interlayer film for laminated glass, the content of the plasticizer is not particularly limited, and a preferable lower limit of the content thereof is 30 parts by mass, and a preferable upper limit thereof is 70 parts by mass, per 100 parts by mass of the thermoplastic resin. When the content of the plasticizer is 30 parts by mass or more, the laminated glass is moderately softened, which provides good penetration resistance and the like. When the content of the plasticizer is 70 parts by mass or less, the plasticizer is prevented from being separated from the interlayer film for laminated glass. A preferable lower limit of the content of the plasticizer is 35 parts by mass, and a preferable upper limit thereof is 63 parts by mass.

The interlayer film for laminated glass contains the resin, or the resin and the plasticizer as a main component. The total amount of the thermoplastic resin and the plasticizer is usually 70% by mass or more, preferably 80% by mass or more, and still more preferably 90% by mass or more and less than 100% by mass based on the total amount of the interlayer film for laminated glass in the colored region. When the total amount is less than 100% by mass, the interlayer film for laminated glass can contain at least one of the heat shielding agent and the colorant.

(Heat Shielding Agent)

In the interlayer film for laminated glass of the present invention, the heat shielding agent is preferably contained in the absorption region. That is, when the interlayer film for laminated glass has the light-blocking absorption region, the heat shielding agent is preferably contained in the light-blocking absorption region. When the interlayer film for laminated glass includes the light-permeable absorption region, the heat shielding agent is preferably contained in the light-permeable absorption region. Furthermore, when the interlayer film for laminated glass includes both the light-permeable absorption region and the light-blocking absorption region, the heat shielding agent may be contained in one of the regions, but the heat shielding agent is preferably contained in both the regions.

The energy amount of an infrared ray with a wavelength of 780 nm or more is smaller than that of an ultraviolet ray. However, the thermal action of infrared rays is large, and once the infrared rays are absorbed into a substance, heat is released from the substance. The infrared rays are generally called heat rays. The heat shielding agent is a material capable of absorbing the infrared rays with a wavelength of 780 nm or more, that is, heat rays.

Examples of the heat shielding agent include heat shielding particles. The heat shielding particles are made of an inorganic material, and specific examples thereof include metal oxide particles and particles other than metal oxide particles such as lanthanum hexaboride (LaB6) particles. Examples of the metal oxide particles include tin oxide particles such as aluminum-doped tin oxide particles, indium-doped tin oxide particles, and antimony-doped tin oxide particles (ATO particles), zinc oxide particles such as gallium-doped zinc oxide particles (GZO particles), indium-doped zinc oxide particles (IZO particles), aluminum-doped zinc oxide particles (AZO particles), tin-doped zinc oxide particles, and silicon-doped zinc oxide particles, titanium oxide particles such as niobium-doped titanium oxide particles, indium oxide particles such as tin-doped indium oxide particles (ITO particles), and tungsten oxide particles such as sodium-doped tungsten oxide particles, cesium-doped tungsten oxide particles (CWO particles), thallium-doped tungsten oxide particles, and rubidium-doped tungsten oxide particles. Heat shielding particles other than these may be used as the heat shielding agent. The heat shielding materials may be used alone or in combination of two or more.

Among these, since the heat ray shielding function is high, preferred are metal oxide particles, more preferred are at least one selected from the group consisting of ATO particles, GZO particles, ITO particles, and CWO particles, and still more preferred are ITO particles or CWO particles.

The lower limit of the average particle diameter of the heat shielding particles is preferably 10 nm, and more preferably 20 nm. The upper limit of the average particle diameter of the heat shielding particles is preferably 100 nm, more preferably 80 nm, and still more preferably 50 nm. When the average particle diameter is the above preferable lower limit or more, the heat ray shielding properties can be sufficiently improved. When the average particle diameter is the above preferable upper limit or less, visible light is less likely to be shielded by the heat shielding material, whereby the above visible light transmittance (X2) is likely to be adjusted within a predetermined range.

The "average particle diameter" refers to a volume average particle diameter. The average particle diameter can be measured using a particle size distribution measuring apparatus ("UPA-EX150" manufactured by NIKKISO CO., LTD.), or the like.

Examples of the heat shielding agent include a heat shielding compound. The heat shielding compound is an organic material or an organic-inorganic composite material which can absorb infrared rays, and is also referred to as a near-infrared absorber. The near-infrared absorber has absorption local maximum in a near-infrared region, and the absorption local maximum represents global maximum absorption among the absorption maxima present in a region having a wavelength of 380 nm to 2500 nm. Specifically, the absorption local maximum has global maximum absorption in a wavelength region of 720 nm or more, and preferably 750 nm or more and 2000 nm or less.

Examples of the heat shielding compound include one or two or more compounds (hereinafter also referred to as "compound X") selected from the group consisting of a phthalocyanine compound, a naphthalocyanine compound, and an anthracyanine compound.

The phthalocyanine compound is phthalocyanine or a phthalocyanine derivative having a phthalocyanine skeleton, and a metal atom is preferably contained in them. The naphthalocyanine compound is naphthalocyanine or a naphthalocyanine derivative having a naphthalocyanine skeleton, and a metal atom is preferably contained in them. The anthracyanine compound is anthracyanine or an anthracyanine derivative having an anthracyanine skeleton, and a metal atom is preferably contained in them.

In these compounds X, the metal atom serves as a central metal of the naphthalocyanine skeleton, the naphthalocyanine skeleton, and the anthracyanine skeleton.

The heat shielding compound is preferably one or two or more selected from the group consisting of a phthalocyanine compound and a naphthalocyanine compound, and a phthalocyanine compound is more preferable.

The metal atom is preferably a vanadium atom, and a phthalocyanine compound containing a vanadium atom is more preferable. The vanadium atom is generally present in a state where it is bonded to an oxygen atom (V=O).

Each of the heat shielding compounds may be used alone, or two or more of them may be used in combination.

The content of the heat shielding agent in the interlayer film for laminated glass may be set so that the skin absorption energy rate (X1) is within a predetermined range. The content of the heat shielding agent is, for example, 0.05% by mass or more and 1.5% by mass or less, preferably 0.10% by mass or more and 1.2% by mass or less, and still more preferably 0.15% by mass or more and 0.9% by mass or less.

When two or more heat shielding agents are used, the total content of the two or more heat shielding agents may be within the above range.

When two or more heat shielding agents are used, the heat shielding agents preferably contain ITO particles from the viewpoint of improving heat shielding property while suppressing the coloring of a laminated glass to be obtained. When two or more heat shielding agents are used, the content of ITO particles is more than that of other heat shielding agent. The content ratio (mass ratio) of the other heat shielding agent to the ITO particles is preferably is less than 1, more preferably $1/50$ or more and $1/3$ or less, and still more preferably $1/30$ or more and $1/5$ or less.

Among the above compounds, both the tungsten oxide particles and the compound X are preferably used as the other heat shielding agent used in combination with the ITO particles, and the CWO particles as the tungsten oxide particles, and the phthalocyanine compound as the compound X are particularly preferably used.

The content of the heat shielding agent may be set within the above range in the absorption region (the light-blocking absorption region, the light-permeable absorption region, or both the regions) in which the skin absorption energy rate (X1) is within a predetermined range.

When the interlayer film for laminated glass includes a plurality of resin layers laminated in a thickness direction in the absorption region of the interlayer film for laminated glass so that the interlayer film for laminated glass serves as a multilayer structure, the content and content ratio of the heat shielding agent in the absorption region may be within the above ranges. That is, the content and content ratio of the heat shielding agent may be within the above ranges as the whole multilayer structure, and the content and content ratio of the heat shielding agent in each of the resin layers may not be within the above ranges.

(Colorant)

The interlayer film for laminated glass of the present invention preferably contains a colorant, and above all, the colorant is more preferably contained in the light-blocking region.

The colorant used is not particularly limited, and coloring matters conventionally blended with the interlayer film for laminated glass can be used. Blue, yellow, red, green, purple, black, and white coloring matters and the like can be used. As the coloring matter, a pigment and a dye and the like can be used.

Herein, the colorant means materials other than the above heat shielding agent. Therefore, for example, the blue coloring matter generally has absorption local maximum in a red region or a near-infrared region, but herein, one having absorption local maximum in a near-infrared region is classified as the above near-infrared absorber. That is, for example, a blue coloring matter having one or more absorption maxima in a region of less than 720 nm, one of the one or more absorption maxima representing global maximum absorption in a region having a wavelength of 380 nm to 2500 nm, is classified as the colorant.

The colorant is used in the interlayer film for laminated glass, whereby the laminated glass is colored, and antiglare property and the like can be imparted by improving the light-blocking property of the laminated glass. Furthermore, the skin absorption energy rate (X1) of the light-blocking region can also be decreased by using the colorant in the light-blocking region. In particular, in the present invention, the heat shielding agent is used in addition to the colorant, whereby the skin absorption energy rate (X1) of the light-blocking region can be more easily decreased by the interaction between the colorant and the heat shielding agent while the light-blocking property is improved by the colorant.

Therefore, from the viewpoint of effectively reducing the burning sensation, the light-blocking absorption region preferably contains the heat shielding agent in addition to the colorant, but the light-blocking absorption region may not contain the heat shielding agent while it contains the colorant.

Examples of the pigment include copper phthalocyanine pigments such as pigment blue, phthalocyanine-based pigments such as a cobalt phthalocyanine pigment, anthraquinone-based pigments, perylene-based pigments, diketopyrrolopyrrole-based pigments, quinacridone-based pigments, perinone-based pigments, thioindigo-based pigments, isoindoline-based pigments, isoindolinone-based pigments, quinophthalone-based pigments, threne-based pigments, titanium oxide-based pigments, and carbonaceous materials such as carbon black, i.e., pigment black 7, graphene, and carbon nanotube.

Examples of the dye include an azo dye, a cyanine dye, a triphenylmethane dye, a phthalocyanine dye, an anthraquinone dye, a naphthoquinone dye, a quinonimine dye, a methine dye, an azomethine dye, a squarylium dye, an acridine dye, a styryl dye, a coumarin dye, a quinoline dye, and a nitro dye. The dye may be a dispersive dye.

Among these, the pigment is preferably a phthalocyanine-based pigment, an anthraquinone-based pigment, a perylene-based pigment, and carbon black because they are highly compatible with the thermoplastic resin and are less likely to bleed out. The dye is preferably an anthraquinone-based dye.

Each of the colorants may be used alone, or two or more of them may be used in combination.

In the present invention, the colorant contained in the light-blocking absorption region preferably contains a carbonaceous material. The carbonaceous material is contained, whereby the skin absorption energy rate (X1) can be effectively decreased while the visible light transmittance (X2) is decreased. The carbonaceous material is preferably carbon black.

As the colorant, a carbonaceous material such as carbon black and a coloring matter other than the carbonaceous material may be used in combination. Above all, in the light-blocking absorption region, a carbonaceous material such as carbon black and a coloring matter other than the carbonaceous material are preferably used in combination. The combination of such colorants makes it possible to more effectively decrease the skin absorption energy rate (X1) while improving the light-blocking property.

As other coloring matter, coloring matters other than a black coloring matter such as blue, yellow, red, green, purple, and white coloring matters may be used. Specifically, the above pigments and dyes other than the carbonaceous material may be used. Above all, one or more selected from the group consisting of a phthalocyanine-based pigment, an anthraquinone-based pigment, a perylene-based pigment, an azo-based pigment, a dioxazine-based pigment, a quinacridone-based pigment, an azo-based dye, and an anthraquinone-based dye are preferable.

In the combination of the carbonaceous material and the coloring matter other than the carbonaceous material, the carbonaceous material is preferably used as a main component of the colorant. The carbonaceous material is used as the main component, whereby the skin absorption energy rate (X1) and the visible light transmittance (X2) can be more effectively decreased. Specifically, the content ratio (mass ratio) of the carbonaceous material to the whole colorant is preferably 0.50 or more and 1.0 or less, more preferably 0.55 or more and 0.90 or less, and still more preferably 0.60 or more and 0.85 or less.

Even when the combination of the carbonaceous material and the coloring matter other than the carbonaceous material is used as the colorant in the light-blocking absorption region, the interlayer film for laminated glass preferably contains the heat shielding agent as described above. The combination of the carbonaceous material, the colorant other than the carbonaceous material, and the heat shielding agent makes it possible to more effectively decrease the skin absorption energy rate (X1).

Of course, in the interlayer film for laminated glass, the colorant and the heat shielding agent may be used in combination even when the carbonaceous material is independently used as the colorant in the light-blocking absorption region. Furthermore, the colorant and the heat shielding agent may be used in combination even in a region other than the light-blocking absorption region.

The content of the colorant in the interlayer film for laminated glass is preferably 0.01% by mass or more and 3.0% by mass or less, more preferably 0.02% by mass or more and 0.5% by mass or less, and still more preferably 0.04% by mass or more and 0.3% by mass or less. In the interlayer film for laminated glass, the content of the colorant in the light-blocking region and the light-blocking absorption region may be within these ranges. By setting the content of the colorant to be equal to or greater than these lower limits, the light-blocking properties of the light-blocking region and the light-blocking absorption region can be sufficiently secured. By setting the content of the colorant to be equal to or less than these upper limits, a visible light transmittance of a certain value or more is likely to be secured in the light-blocking region and the light-blocking absorption region.

The content ratio of the colorant to the heat shielding agent in the light-blocking absorption region may be appropriately adjusted so that the skin absorption energy rate (X1) and the visible light transmittance (X2) are within a predetermined range. The content ratio (mass ratio) of the heat shielding agent to the colorant in the light-blocking absorption region is not particularly limited, but for example, the content of the heat shielding agent may be more than that of the colorant, and the content ratio of the heat shielding agent to the colorant is, for example, more than 1, preferably 1.3 or more and 25 or less, and more preferably 1.5 or more and 20 or less.

When the interlayer film for laminated glass includes a plurality of resin layers so that it has a multilayer structure in the light-blocking region (and the light-blocking absorption region) of the interlayer film for laminated glass, the content and content ratio of the colorant in the whole multilayer structure, and the content ratio of the heat shielding agent to the colorant in the whole multilayer structure may be within the above ranges.

In the present invention, the pigment and the dye which constitute the colorant may be blended with a resin as-is, but the pigment and the dye may be blended with the resin in a form of ink or toner or the like. In such a case, the content of the colorant means the masses of the pigment and dye themselves.

The heat shielding agent and the colorant may be dispersed in a plasticizer, and then blended with a resin. For example, the heat shielding agent and the colorant may be added to the plasticizer, followed by adding a dispersant and the like to the plasticizer to disperse the heat shielding agent and the colorant in the plasticizer, and mixing the dispersed product with a resin. Examples of the dispersant to be used include a phosphoric acid ester compound. Examples of the phosphoric acid ester compound include trioctyl phosphate, triisopropyl phosphate, tributoxyethyl phosphate, tricresyl phosphate, and isodecylphenyl phosphate. The blending amount of the phosphoric acid ester compound is, for example, 0.001 to 5 parts by mass based on 100 parts by mass of the resin.

(Other Additives)

The interlayer film for laminated glass may further contain additives such as an ultraviolet absorbing agent, an antioxidant, a light stabilizer, an adhesion control agent, a fluorescent whitening agent, and a nucleating agent as necessary.

<Layer Constitution>

Hereinafter, the layer constitution of the interlayer film for laminated glass of the present invention will be described in more detail.

(Single-Layer Structure)

In the present invention, the interlayer film for laminated glass may be composed of a single resin layer, as described above. For example, the heat shielding agent is contained in the single resin layer, whereby the whole surface of the interlayer film for laminated glass can be made the light-permeable absorption region. The content and content ratio and the like of the heat shielding agent in this case are as described above.

For example, both the heat shielding agent and the colorant are contained in the single resin layer, whereby the whole surface of the interlayer film for laminated glass can be made the light-blocking absorption region. The contents and content ratios and the like of the heat shielding agent and colorant in the light-blocking absorption region in this case are as described above.

In the interlayer film for laminated glass composed of the single resin layer, the composition of the resin composition constituting the interlayer film may be substantially the same at any position of the interlayer film for laminated glass, and the thickness of the interlayer film may also be substantially the same. According to such a constitution, the visible light transmittance (X2) and the skin absorption energy rate (X1) are substantially constant in the whole region of the interlayer film for laminated glass.

However, even when the interlayer film for laminated glass has the single-layer structure, the composition of the resin composition may be changed in each of the regions to make only some regions the light-blocking absorption region.

In this case, the region other than the light-blocking absorption region may be a region (light-permeable region) in which a visible light transmittance (X2) is 70% or more, or a region in which a visible light transmittance (X2) is less than 70%, but a skin absorption energy rate (X1) is more than 15%. Both the regions may be provided.

The composition of the resin composition may be changed in each of the regions to make only some regions the light-permeable absorption region. In this case, the region other than the light-permeable absorption region may be a region (light-blocking region) in which a visible light transmittance (X2) is less than 70%, or a region in which a visible light transmittance (X2) is 70% or more, but a skin absorption energy rate (X1) is more than 25%. Both the regions may be provided.

Furthermore, the composition of the resin composition may be changed in each of the regions to make some regions the light-permeable absorption region or to make some regions the light-blocking absorption region.

(Multilayer Structure)

The interlayer film for laminated glass may have a multilayer structure containing a plurality of resin layers as described above. The multilayer structure composed of a plurality of layers may be a two-layer structure in which two resin layers are laminated in a thickness direction, a three-layer structure in which three resin layers are laminated, or a structure in which four or more resin layers are laminated. Among these, the interlayer film for laminated glass preferably has a two-layer structure or a three-layer structure, and more preferably a three-layer structure.

In the case of the multilayer structure, the content of the colorant in at least one resin layer (hereinafter also referred to as "second layer") may be more than that in other resin layer (hereinafter also referred to as "first layer"). It is preferable that the colorant is contained in at least one resin layer (second layer), by contrast, the colorant is not contained in the other resin layer (first layer). A large amount of the colorant is blended with the second layer, whereby the second layer has transparency (that is, visible light transmittance) lower than that of the first layer. Thus, if the light-blocking property of the light-blocking region is secured by the coloring of some resin layers (second layer), the thickness of the second layer is changed or a region (that is, a region composed of only the first layer) in which the second layer is not provided is provided, whereby the visible light transmittance (X2) can be changed in each of the regions. Therefore, both the light-blocking region and the light-permeable region can also be easily provided in the interlayer film for laminated glass. Color tones can also be individually operated, whereby antiglare property and design property can also be improved.

As described above, when the interlayer film for laminated glass includes the first and second layers, and contains the heat shielding agent, the heat shielding agent may be contained in any one of the first and second layers, but the heat shielding agent is preferably contained in both the layers.

The content of the colorant in the first layer may be less than the total content of the colorant of the second layer, and is, for example, 0% by mass or more and 1% by mass or less, preferably 0% by mass or more and 0.2% by mass or less, still more preferably 0% by mass or more and 0.005% by mass or less, and most preferably 0% by mass (that is, the colorant is not contained). When the content of the colorant in the first layer is decreased, or the colorant is not contained, the visible light transmittance of a region composed of only the first layer, or a region whose a large part in a thickness direction is composed of the first layer can be increased, whereby the light-permeable region is likely to be formed.

The content of the colorant in the second layer is not particularly limited, but it is, for example, 0.03% by mass or more and 3% by mass or less, preferably 0.05% by mass or more and 1.5% by mass or less, and more preferably 0.1% by mass or more and 1.0% by mass or less. By setting the content of the colorant in the second layer to be equal to or greater than these lower limits, the light-blocking region and the light-blocking absorption region can be easily formed by the second layer.

The content in each of the layers herein means a content ratio based on the total amount of the layer. For example, the content of the colorant in the first layer means a content ratio based on the total amount of the first layer, and other similar expressions are also the same.

When the interlayer film for laminated glass has a multilayer structure, the number of the first layers and the number of the second layers may be 1 or more. For example, in the light-blocking region, the number of the first layers may be 2 and the number of the second layers may be 1. The second layer may be disposed between the two first layers.

Thus, the second layer is sandwiched between the first layers to prevent deteriorated adhesiveness to the glass plate caused by the colorant.

Meanwhile, the second layer in the light-permeable region may be set to be thinner than that in the light-blocking region, or no second layer may be provided in the light-permeable region, to increase the visible light transmittance.

In the multilayer structure, the ratio of the total thickness of the second layer to that of the first layer (second layer/first layer) is preferably 0.05 or more and 5 or less, more preferably 0.1 or more and 4 or less, and still more preferably 0.12 or more and 3 or less in a portion (a thickest part to be described later) in which the total thickness of the first layer is the thinnest, by contrast, the total thickness of the second layer is the thickest. Such a thickness ratio makes it easy to adjust the visible light transmittance within a desired range while suitably setting the amount of the colorant blended with the second layer.

In a portion (thinnest part) in which the first layer is the thinnest, the total thickness of the first layer is preferably 0.05 mm or more and 1.4 mm or less, preferably 0.08 mm or more and 0.9 mm or less, and still more preferably 0.1 mm or more and 0.8 mm or less.

Meanwhile, in a portion (thickest part) in which the second layer is the thickest, the total thickness of the second layer is preferably 0.03 mm or more and 1 mm or less, preferably 0.05 mm or more and 0.8 mm or less, and still more preferably 0.08 m or more and 0.5 mm or less.

Hereinafter, specific examples of the case where the interlayer film for laminated glass has the multilayer structure will be described using first to sixth embodiments shown in FIGS. 1 to 6.

As in a first embodiment shown in FIG. 1, it is preferable that, when an interlayer film for laminated glass 10 has a two-layer structure, one resin layer is a second layer 12 containing a colorant, and the other resin layer is a first layer 11 containing a colorant less than that of the second layer 12, or containing no colorant. Such a constitution provides the second layer 12 having transparency (that is, visible light transmittance) lower than that of the first layer 11. The first layer 11 preferably contains no colorant. Meanwhile, a heat shielding agent may be contained in any one of the first and second layers 11 and 12, but the heat shielding agent is preferably contained in both the layers.

The interlayer film for laminated glass 10 includes a light-blocking region having light-blocking property secured by the second layer 12 having low transparency. The whole region of the interlayer film for laminated glass 10 shown in FIG. 1 is composed of the two-layer structure, and the whole region serves as a light-blocking region 13. The light-blocking region 13 contains a colorant, or a colorant and a heat shielding agent, so that the light-blocking region 13 has a low skin absorption energy rate (X1), and serves as a light-blocking absorption region.

It is preferable that, when an interlayer film for laminated glass has a three-layer structure, one or two resin layers are second layers containing a colorant, and two or one resin layer is a first layer containing a colorant less than that of the second layer, or containing no colorant. In this case, as in a second embodiment shown in FIG. 2, the interlayer film for laminated glass 20 includes one second layer 22 and two first layers 21A and 21B, and the second layer 22 is disposed so as to be sandwiched between the first layers 21A and 21B. Such a structure provides the interlayer film for laminated glass 20 having light-blocking property secured by the second layer 22, and the interlayer film for laminated glass 20 serves as a light-blocking region 23.

Any one of the first layers 21A and 21B and the second layer 22 may contain a heat shielding agent, but all the layers preferably contain the heat shielding agent. Both the first layers 21A and 21B preferably contain no colorant.

Figure 2:
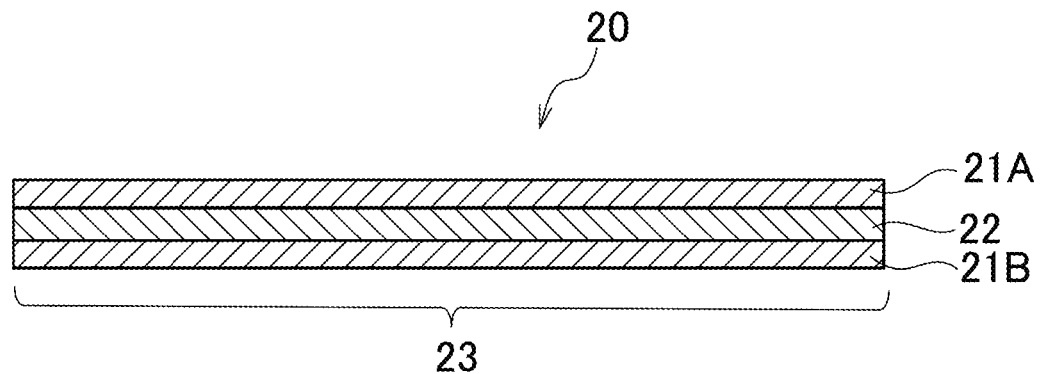
FIG. 2 is a sectional view of an interlayer film for laminated glass according to a second embodiment.

The light-blocking region 23 has a low skin absorption energy rate (X1) provided by the colorant, or the colorant and the heat shielding agent, and serves as a light-blocking absorption region. The whole region of the interlayer film for laminated glass 20 shown in FIG. 2 is composed of a three-layer structure, and serves as the light-blocking region 23 (light-blocking absorption region).

Even when the interlayer film for laminated glass has a multilayer structure, a part of the interlayer film for laminated glass may serve as a light-blocking region, a part thereof serving as a light-permeable region.

Figure 3:
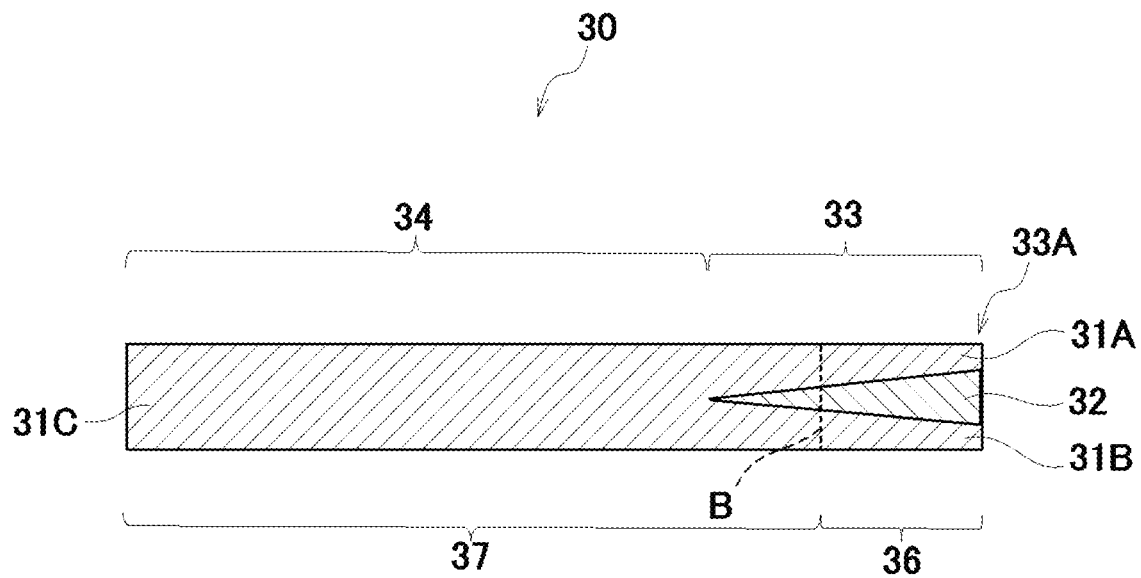
FIG. 3 is a sectional view of an interlayer film for laminated glass according to a third embodiment.

Specifically, as in a third embodiment shown in FIG. 3, an interlayer film for laminated glass 30 includes a second layer 32 and first layers 31A and 31B. The second layer 32 is a resin layer containing a colorant, and the first layers 31A and 31B are resin layers containing a colorant less than that of the second layer 32, or containing no colorant. Therefore, the second layer 32 serves as a layer having lower transparency than that of the first layers 31A and 31B.

Any one of the first layers 31A and 31B and the second layer 32 may contain a heat shielding agent, but all the layers preferably contain the heat shielding agent. Both the first layers 31A and 31B preferably contain no colorant.

The interlayer film for laminated glass 30 has a structure in which the second layer 32 is disposed between the first layers 31A and 31B in its partial region 33 (second region 33), and embedded between the first layers 31A and 31B. Here, the second region 33 is a region (gradation region) in which the thickness of the second layer 32 is continuously decreased along a direction perpendicular to a thickness direction. The second layer 32 has a tapered shape along the direction perpendicular to the thickness direction. In a region (that is, a first region 34 adjacent to the second region 33) fronter than the front end of the tapered shape, the first layers 31A and 32B are directly laminated for integrating to constitute one resin layer (first layer 31C). The first region 34 is composed of the first layer 31C having high transparency to serve as a light-permeable region. The first region 34 (light-permeable region) preferably serves as a light-permeable absorption region provided by a heat shielding agent or the like blended with the first layer 31C, but the first region 34 may have a skin absorption energy rate (X1) of more than 25% and may not be the light-permeable absorption region.

Meanwhile, the second region 33 serves as a light-blocking region since light is blocked by the second layer 32 in a portion (thickest part 33A) in which the second layer 32 is the thickest. The skin absorption energy rate (X1) of the second region 33 is decreased by a colorant, or a colorant and a heat shielding agent, whereby the second region 33 (light-blocking region) serves as a light-blocking absorption region.

In the second region 33, the thickness of the second layer 32 is continuously decreased toward the region 34 from the thickest part 33A, whereby the visible light transmittance (X2) is 70% or more on the way to the region 34 from the thickest part 33A, and a light-blocking region 36 is switched to a light-permeable region 37 at a boundary B.

Since the skin absorption energy rates (X1) of the thickest part 33A and the first region 34 are usually different from each other, the skin absorption energy rate (X1) in the second region 33 (gradation region) is continuously changed from the value of the thickest part 33A to the value of the region 34 as going to the region 34 from the thickest part 33A. Since the first region 34 preferably has a skin absorption energy rate (X1) higher than that of the thickest part 33A, the first region 34 preferably has a higher skin absorption energy rate (X1) as going to the first region 34 from the thickest part 33A.

The skin absorption energy rate (X1) in the light-blocking region 36 is maintained at 15% or less between the thickest part 33A and the boundary B, and the light-blocking region 36 may serve as a light-blocking absorption region in which a skin absorption energy rate (X1) is 15% or less at any position. A part of the light-blocking region 36 has a skin absorption energy rate (X1) of more than 15% without the skin absorption energy rate (X1) maintained at 15% or less between the thickest part 33A and the boundary B, and may not serve as the light-blocking absorption region.

In the interlayer film for laminated glass 30 a part of which serves as the light-blocking region 36 and a part of which serves as the light-permeable region 37, the aspect in which at least a part of the light-blocking region 36 serves as the light-blocking absorption region is described above, but the light-blocking region 36 may not include the light-blocking absorption region. In that case, at least one part (for example, the first region 34) of the light-permeable region 37 may have a skin absorption energy rate (X1) of 25% or less, and serve as the light-permeable absorption region.

In the interlayer film for laminated glass 30, it is more preferable that the light-blocking region 36 includes the light-blocking absorption region and the light-permeable region 37 includes the light-permeable absorption region.

In the present embodiment, the boundary B is disposed on the second region 33 (gradation region), so that the gradation region is disposed across the light-blocking region 36 and the light-permeable region 37.

However, the boundary B may be disposed so that it overlaps with the boundary between the second region 33 and the first region 34. According to such an aspect, the second region 33 which is the gradation region is wholly disposed in the light-blocking region 36.

When the partial region 33 has a structure in which the second layer 32 is disposed between the first layers 31A and 31B and embedded therebetween, as shown in the interlayer film for laminated glass 30 of the above third embodiment, the constitution of the second region 33 is not limited to the above. For example, as in an interlayer film for laminated glass 30A of a fourth embodiment shown in FIG. 4, a second region 33 may be composed of a region 33X having a constant thickness and a region (gradation region) 33Y connected to the region 33X and having a thickness continuously decreased along a direction perpendicular to a thickness direction.

In this case, as with the third embodiment, a first region 34 is provided on the front end side of the tapered shape of the region 33Y. In the fourth embodiment, the region 33Y having a constant area serves as a thickest part 33A, whereby the area of a light-permeable region 36, and also the area of a light-permeable absorption region can be increased.

In the present embodiment, a boundary B is disposed on the region 33Y (gradation region), but the boundary B may be disposed so that it overlaps with the boundary between the second region 33 and the first region 34. The boundary B may be disposed so that it overlaps with the boundary between the region 33X and the region 33Y. Therefore, the gradation region is disposed in a light-permeable region 37.

Figure 5:
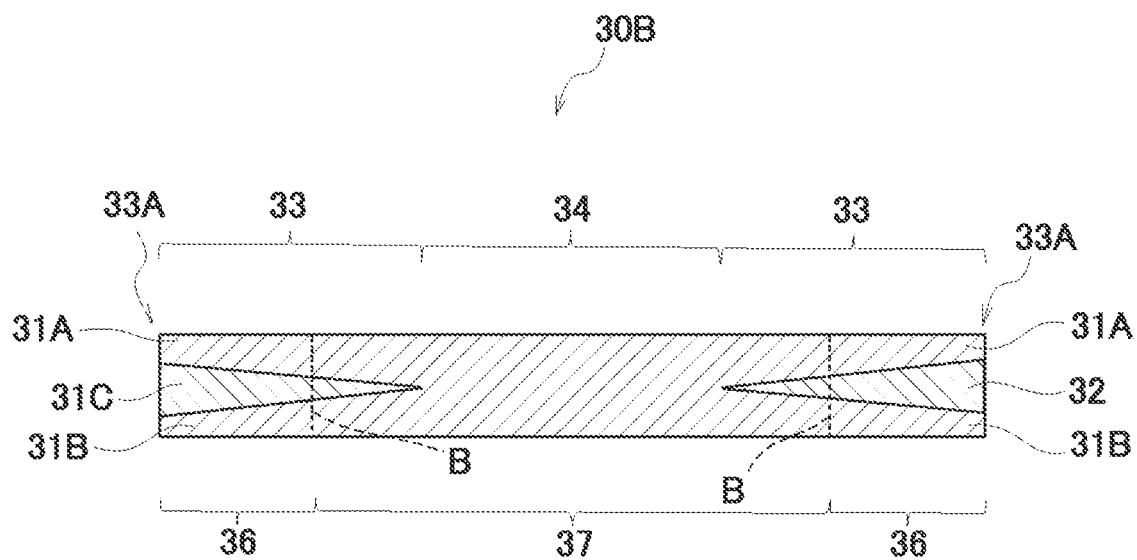
FIG. 5 is a sectional view of an interlayer film for laminated glass according to a fifth embodiment.
Figure 6:
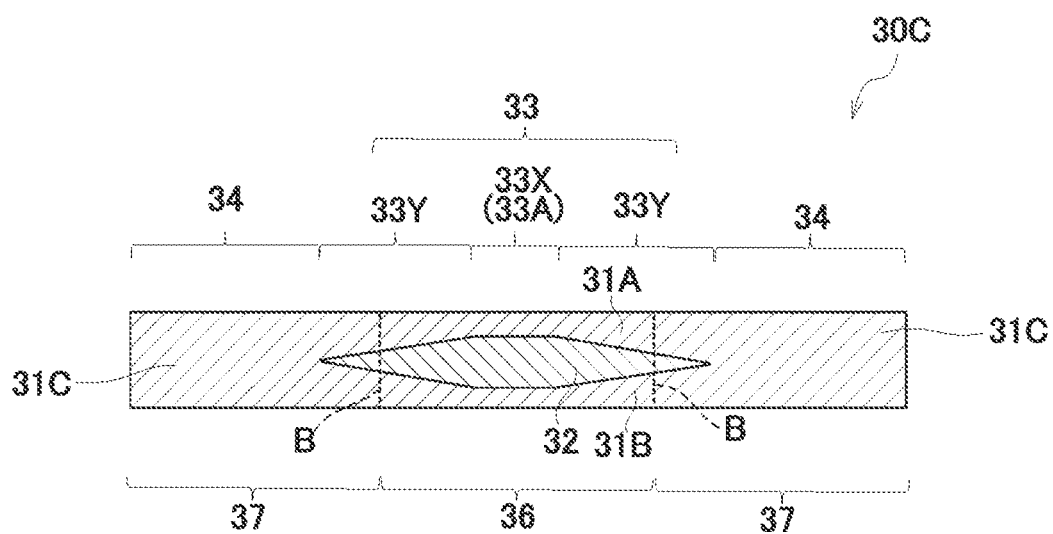
FIG. 6 is a sectional view of an interlayer film for laminated glass according to a sixth embodiment.

In the third and fourth embodiments, only one second region 33 is provided, but as shown in a fifth embodiment of FIG. 5, a plurality of second regions 33 may be provided. That is, as described above, the second region 33 is provided only on one end part in the direction perpendicular to the thickness direction, but it may be provided on each of both ends as in an interlayer film for laminated glass 30C of the fifth embodiment. In this case, light-blocking regions 36 and 36 composed of the second region 33 are provided on both end parts of the interlayer film for laminated glass 30C, and therefore, the light-blocking region 36, a light-permeable region 37, and the light-blocking region 36 are aligned along a direction perpendicular to a thickness direction.

Other constitutions in the interlayer film for laminated glass 30C of the fifth embodiment are the same as those of the interlayer film for laminated glass 30B of the fourth embodiment, and therefore, the description thereof will be omitted.

In the fifth embodiment, each of the first regions 33 is composed of a gradation region, but it may be composed of a region 33X having a constant thickness and a region 33Y composed of a gradation region as in the fourth embodiment.

Furthermore, the region 33 in which the second layer 32 is embedded between the first resin layers 31A and 31B may be provided at a position other than the end part. For example, as shown in a sixth embodiment shown in FIG. 6, the region 33 may be provided between both end parts.

Here, the region 33 is composed of a region 33X having a constant thickness, and regions (gradation regions) 33Y and 33Y connected to both ends of the region 33X and having a thickness continuously decreased along a direction perpendicular to a thickness direction. As in the above third to fifth embodiments, a first region 34 is provided on the front end side of the tapered shape of each of the regions 33Y. In the first region 34, the first layers 31A and 32B are directly laminated for integrating to constitute one resin layer (first layer 31C). Therefore, in the interlayer film for laminated glass, a light-permeable region 37, a light-blocking region 36, and a light-permeable region 37 are aligned in the order along the direction perpendicular to the thickness direction, so that the light-blocking region 36 is disposed at a position between the end parts.

In the above description, the first layer 31A and 31B have the same composition, and in the first region 34, the two first layers 31A and 31B are integrated to constitute one layer (first layer 31C). However, the two first layers 31A and 31B may have different compositions so that a multilayer structure is formed by the two first layers 31A and 31B without one layer constituted in the first region 34.

The laminated structure described above is an example of the laminated structure of the interlayer film for laminated glass of the present invention, and is not limited to these structures.

(Combination with Other Functional Films)

The interlayer film for laminated glass of the present invention may include other functional films in order to exhibit other functions. For example, in order to further improve heat shielding property, the interlayer film may include an infrared reflective film. For example, in order to further improve design property or to combine the interlayer film with other patterns, the interlayer film may include a colored film, or may include a film having a printed design.

(Method for Manufacturing Interlayer Film for Laminated Glass)

The interlayer film for laminated glass of the present invention is not particularly limited. When the interlayer film for laminated glass has a single-layer structure, the interlayer film for laminated glass may be molded by, for example, mixing components constituting the interlayer film such as a resin, a heat shielding material, and a colorant, and subjecting the obtained composition to extrusion molding, press molding and the like.

When the interlayer film for laminated glass has a single-layer structure and has compositions different in regions, the interlayer film for laminated glass can be formed by, for example, aligning a plurality of resin sheets having compositions different from each other in a plane direction.

The interlayer film for laminated glass may be molded by extrusion molding and press molding and the like as with the case of the single-layer structure even when the interlayer film for laminated glass has a multilayer structure. For example, a method is preferable, in which two or more extruders are prepared, and a multi-layer feed block is attached to the front end of each of the extruders to perform coextrusion.

For example, when the interlayer film for laminated glass includes the first and second layers as described above, a method is preferable, in which components contained in the first layer are supplied into a first extruder, components for forming the second layer are supplied into a second extruder, and a multi-layer feed block is attached to the front end of each of the first and second extruders to perform coextrusion. The thickness of each of the first and second layers may be changed along a direction perpendicular to a thickness direction, but in that case, for example, the amount of a resin supplied and the like may be adjusted to change the thickness.

<Glass Structure>

The present invention further provides a glass structure. The glass structure includes at least a region (hereinafter also merely referred to as "glass absorption region") in which the skin absorption energy rate (hereinafter also merely referred to as skin absorption energy rate (Y1)) of the glass structure itself is 25% or less. The glass structure includes at least one glass plate, but it may include one glass plate or two or more glass plates. In the glass structure, two or more glass plates may be bonded to each other for integrating with the glass interlayer film and the adhesion layer and the like interposed therebetween. For example, the two or more glass plates may constitute laminated glass.

[Laminated Glass]

As described above, the present invention further provides laminated glass. The laminated glass of the present invention includes two glass plates, and an interlayer film for laminated glass interposed between the two glass plates. In the laminated glass of the present invention, the above interlayer film for laminated glass may be used as the interlayer film for laminated glass. The interlayer film for laminated glass has one surface bonded to one glass plate and the other surface bonded to the other glass plate.

(Glass Plate)

The glass plate used in the laminated glass may be any of inorganic glass and organic glass, and inorganic glass is preferable. Examples of the inorganic glass include, but are not particularly limited to, clear glass, float plate glass, polished plate glass, molded plate glass, meshed plate glass, wired plate glass, and green glass.

As organic glass, one generally referred to as resin glass is used without particular limitation, and examples thereof include organic glass composed of a resin such as polycarbonate, an acrylic resin, an acrylic copolymer resin, or polyester.

The two glass plates may be composed of the same material or different materials. For example, one of the two glass plates may be inorganic glass, and the other may be organic glass. It is preferable that each of the two glass plates is inorganic glass or organic glass.

The thickness of each of the glass plates is not particularly limited, but the thickness is, for example, about 0.1 to 15 mm, and preferably 0.5 to 5 mm. The thicknesses of the glass plates may be the same or different from each other, and are preferably the same.

The laminated glass may be produced by disposing the above-mentioned interlayer film for laminated glass between two glass plates, and subjecting these to pressure bonding and the like for integrating.

The laminated glass of the present invention includes at least a region (glass absorption region) in which a skin absorption energy rate (Y1) of the laminated glass itself is 25% or less.

The laminated glass of the present invention includes the glass absorption region in which a skin absorption energy rate (Y1) is 25% or less, whereby the proportion of sunlight absorbed by the skin is low, which is less likely to cause the skin to feel burning sensation even if the sunlight is caught through the laminated glass for a long period of time.

The skin absorption energy rate (Y1) is calculated by a method shown in Examples to be described later.

The skin absorption energy rate (Y1) is preferably 20% or less, more preferably 15% or less, still more preferably 12% or less, and particularly preferably 10% or less, from the viewpoint of further extending a time until the burning sensation is felt from the start of catching of the sunlight, as with the skin absorption energy rate (X1). The skin absorption energy rate (Y1) is preferably lower in order to extend the time until the burning sensation is felt, but the skin absorption energy rate (Y1) is preferably 0.5% or more, and more preferably 1.0% or more in order not to shield the sunlight beyond necessity to decrease a visible light transmittance beyond necessity.

In the present invention, as with the above interlayer film for laminated glass, the skin absorption energy rate (Y1) of the whole surface (that is, the whole region) of the laminated glass may be within the above range, or the skin absorption energy rate of only a part of the laminated glass may be within the above range.

In the laminated glass, the area of the glass absorption region is not particularly limited, but it is preferably 5% or more and 100% or less of the whole region, more preferably 10% or more and 100% or less, and still more preferably 30% or more and 100% or less. The area of the absorption region may be 40% or more, 60% or more, or 80% or more.

The visible light transmittance of the laminated glass of the present invention may be appropriately set according to applications and use positions and the like, but the laminated glass may include a region (hereinafter also referred to as "glass light-blocking region") in which the visible light transmittance is less than 70%, or may include a region (hereinafter also referred to as "glass light-permeable region") in which the visible light transmittance (Y2) is 70% or more.

(Glass Light-Blocking Absorption Region)

In one embodiment of the present invention, the laminated glass preferably includes a region (hereinafter also referred to as "glass light-blocking absorption region") in which a visible light transmittance (Y2) is less than 70% and a skin absorption energy rate (Y1) is 15% or less from the same viewpoint as that of the interlayer film for laminated glass.

The laminated glass preferably includes a region in which a skin absorption energy rate (Y1) is 12% or less in the glass light-blocking absorption region, more preferably includes a region in which a skin absorption energy rate (Y1) is 10% or less, particularly preferably includes a region in which a skin absorption energy rate (Y1) is 7% or less, and most preferably includes a region in which a skin absorption energy rate (Y1) is theoretically 0%. The skin absorption energy rate (Y1) in the glass light-blocking absorption region is preferably 0.1% or more, preferably 0.5% or more, and more preferably 1.0% or more.

From the same viewpoint as that of the interlayer film for laminated glass, the laminated glass preferably has a visible light transmittance (Y2) of 50% or less in the glass light-blocking absorption region having the desired skin absorption energy rate (Y1), more preferably 20% or less, and still more preferably 4% or less. The visible light transmittance (Y2) of the laminated glass is preferably 0.5% or more in the glass light-blocking absorption region, more preferably 0.7% or more, and still more preferably 1% or more.

The whole region (whole surface) of the laminated glass including the glass light-blocking absorption region may serve as the glass light-blocking absorption region, or a part of the region of the laminated glass may serve as the glass light-blocking absorption region.

When a part of the region of the laminated glass serves as the glass light-blocking absorption region, a region other than the glass light-blocking absorption region may be a region (glass light-permeable region) in which a visible light transmittance (Y2) is 70% or more, or a glass light-blocking region in which a visible light transmittance (Y2) is less than 70%, but a skin absorption energy rate (Y1) is more than 15%. Both the regions may be present.

In the laminated glass, the area of the glass light-blocking absorption region is not particularly limited, but it is preferably 5% or more and 100% or less of the whole region, and more preferably 10% or more and 100% or less.

(Glass Light-Permeable Absorption Region)

In another preferred embodiment of the present invention, the laminated glass includes a region (hereinafter also referred to as "glass light-permeable absorption region") in which a visible light transmittance (Y2) is 70% or more and a skin absorption energy rate (Y1) is 25% or less as with the interlayer film for laminated glass. The laminated glass preferably includes a region in which the skin absorption energy rate (Y1) is 20% or less in the glass light-permeable absorption region from the same viewpoint.

As described in the interlayer film for laminated glass, the laminated glass may have a skin absorption energy rate (Y1) of 10% or more, or 15% or more in the glass light-permeable absorption region. Furthermore, from the same viewpoint as that of the interlayer film for laminated glass, the laminated glass preferably includes a region in which a visible light transmittance (Y2) is 75% or more in the glass light-permeable absorption region, and more preferably includes a region in which a visible light transmittance (Y2) is 80% or more. The laminated glass preferably has the visible light transmittance (Y2) of 95% or less in the glass light-permeable absorption region, more preferably 90% or less, and still more preferably 87% or less.

When the laminated glass includes the glass light-permeable absorption region, the whole region thereof may serve as the glass light-permeable absorption region, or a part of the region may serve as the glass light-permeable absorption region. When a part of the region serves as the glass light-permeable absorption region, the other region may be a region (glass light-blocking region) in which a visible light transmittance (Y2) is less than 70%, or a region in which a visible light transmittance (Y2) is 70% or more, but a skin absorption energy rate (Y1) is more than 25%. Both the regions may be present.

In the laminated glass, the area of the glass light-permeable absorption region is not particularly limited, but it is preferably 5% or more and 100% or less of the whole region, and more preferably 10% or more and 100% or less.

In still another preferred embodiment of the present invention, the laminated glass includes both the glass light-blocking absorption region and the glass light-permeable absorption region from the same viewpoint as that of the interlayer film for laminated glass. When the laminated glass includes both the glass light-blocking absorption region and the glass light-permeable absorption region, the ranges and the like of the visible light transmittance (Y2) and the skin absorption energy rate (Y1) in each of the glass light-blocking absorption region and the glass light-permeable absorption region have been described above.

In the laminated glass of the present invention, the skin absorption energy rate (Y1) may be within a predetermined range as described above, but the T1500 of the laminated glass is, for example, 30% or less, preferably 0.1% or more and 28% or less, more preferably 0.1% or more and 15% or less, and still more preferably 0.1% or more and 5% or less.

The laminated glass of the present invention includes the glass light-blocking absorption region, the glass light-permeable absorption region, or both the regions as described above. However, when the laminated glass includes the glass light-blocking absorption region, the T1500 of the glass light-blocking absorption region may be within the above range. Furthermore, when the laminated glass includes the glass light-permeable absorption region, the T1500 of the glass light-permeable absorption region may be within the above range. Furthermore, when the laminated glass includes both the glass light-blocking absorption region and the glass light-permeable absorption region, the T1500 of each of the glass light-blocking absorption region and the glass light-permeable absorption region may be within the above range.

When the laminated glass includes the glass light-permeable region and the glass light-blocking region, these regions are disposed so as to be aligned along a direction perpendicular to a thickness direction. The laminated glass may include a glass gradation region in which a visible light transmittance (Y2) is continuously changed.

The glass gradation region may be provided in the glass light-permeable region or the glass light-blocking region. The glass gradation region may be provided across the glass light-permeable region and the glass light-blocking region, the boundary between the glass light-permeable region and the glass light-blocking region being in the glass gradation region. That is, the whole glass gradation region may serve as the glass light-permeable region or the glass light-blocking region, but a part of the glass gradation region may serve as the glass light-permeable region, a part thereof serving as the glass light-blocking region.

The skin absorption energy rate (Y1) in the glass gradation region may be continuously changed together with the visible light transmittance (Y2).

When the laminated glass includes the glass light-permeable region and the glass light-blocking region, the skin absorption energy rate (Y1) may be within a predetermined range as described above in the glass light-permeable region, at least a part thereof serving as the glass light-permeable absorption region. Similarly, the laminated glass may have a skin absorption energy rate (Y1) within a predetermined range as described above in the glass light-blocking region, a part thereof serving as the glass light-blocking absorption region. Of course, both at least a part of the glass light-permeable region and at least a part of the glass light-blocking region may respectively serve as the glass light-permeable absorption region and the glass light-blocking absorption region.

In the laminated glass, the interlayer film for laminated glass as described above may be used, and the details of resins used for the interlayer film for laminated glass and various additives (a plasticizer, a heat shielding agent, a colorant, other additives) blended with the resins have been described above.

The constitution of the interlayer film for laminated glass in each of the glass absorption region, the glass light-blocking region, the glass light-blocking absorption region, the glass light-permeable region, and the glass light-permeable absorption region is the same as that of the interlayer film for laminated glass in the absorption region, the light-blocking region, the light-blocking absorption region, the light-permeable region, and the light-permeable absorption region.

Therefore, in the glass light-blocking absorption region, the interlayer film for laminated glass preferably contains a colorant, and more preferably contains a colorant and a heat shielding agent. In the glass light-permeable absorption region, the interlayer film for laminated glass preferably contains a heat shielding agent. The contents and content ratios and the like of the heat shielding agent and colorant in each of the regions have also been described above.

Furthermore, the layer constitution of the interlayer film for laminated glass has also been described above, and the details thereof have been described above. At this time, the glass absorption region, the glass light-blocking region, the glass light-blocking absorption region, the glass light-permeable region, the glass light-permeable absorption region, and the glass gradation region can be respectively formed as with the absorption region, the light-blocking region, the light-blocking absorption region, the light-permeable region, the light-permeable absorption region, and the gradation region, and have the same constitutions as those of the regions.

The laminated glass may be produced by disposing the above-mentioned interlayer film for laminated glass between two glass plates, and subjecting these to pressure bonding and the like for integrating.

The laminated glass of the present invention can be used as windshield for various vehicles such as automobiles, aircraft, ships, and buildings and the like. The laminated glass is preferably used as automobile laminated glass. The automobile laminated glass may be any one of windshield, side glass, rear glass, and roof glass. Among these, windshield and roof glass are preferable.

When the laminated glass is used for the automobile laminated glass, the whole surface of the laminated glass may be the light-blocking region or the light-permeable region, but a part thereof may be the light-blocking region or the light-permeable region.

For example, the glass light-blocking region may be provided on the upper part of the windshield to form a sunshade, the glass light-permeable region being provided on the lower part thereof. In this case, at least a part of the glass light-blocking region is preferably the glass absorption region (glass light-blocking absorption region). However, at least a part of the glass light-permeable region may be the glass absorption region (glass light-permeable absorption region), or at least a part of each of the glass light-blocking region and the glass light-permeable region may be the glass absorption region.

For example, the whole surface of the roof glass may be the glass light-blocking absorption region. At least a part of the automobile roof laminated glass may be disposed on the roof. For example, glass disposed over the roof and the rear is also used as the automobile roof laminated glass.

In the glass structure of the present invention, the glass absorption region is formed by using the interlayer film for laminated glass including the absorption region in which the skin absorption energy rate (X1) is low, but the interlayer film for laminated glass including the absorption region in which the skin absorption energy rate (X1) is low may not be provided. For example, the glass absorption region may be formed by a coating layer in which a skin absorption energy rate is low on the surface of the glass plate. That is, a glass structure including a glass plate and a coating layer provided on at least one surface of the glass plate can also be used.

The coating layer may contain a heat shielding agent or colorant, and preferably contains both the colorant and the heat shielding agent. The coating layer contains the heat shielding agent, the colorant, or both the heat shielding agent and the colorant, whereby the region in which the coating layer is provided can serve as the glass absorption region. The details of the heat shielding agent and the colorant in the coating layer are the same as those of the interlayer film for laminated glass except for the following contents, and the descriptions thereof will be omitted. The content of the heat shielding agent in the coating layer may be set so that the skin absorption energy rate (Y1) is within a predetermined range. The content is, for example, 0.1 g/m$^2$ or more and 25 g/m$^2$ or less, preferably 0.3 g/m$^2$ or more and 10 g/m$^2$ or less, and still more preferably 0.8 g/m$^2$ or more and 5 g/m$^2$ or less. The content of the colorant in the coating layer is preferably 0.06 g/m$^2$ or more and 25 g/m$^2$ or less, more preferably 0.12 g/m$^2$ or more and 5 g/m$^2$ or less, and still more preferably 0.3 g/m$^2$ or more and 2.0 g/m$^2$ or less. Various content ratios have been described in the interlayer film for laminated glass.

The glass absorption region may be the glass light-blocking absorption region or the glass light-permeable absorption region also in the glass structure other than the laminated glass, or may be composed of both the regions. The details of the cases are the same as those of the laminated glass, and the descriptions thereof will be omitted.

It is preferable that the coating layer further contains a binder resin in addition to the heat shielding agent, the colorant, or both the heat shielding agent and the colorant. The coating layer contains the binder resin, which is likely to form the heat shielding agent, the colorant, or both the heat shielding agent and the colorant in a film form on the surface of the glass plate. As the binder resin, for example, a UV curable resin, a thermosetting resin, an electron beam curable resin, a room temperature curable resin, and a thermoplastic resin and the like may be selected according to the purpose. Specific examples of the binder resin include a polyethylene resin, a polyvinyl chloride resin, a polyvinylidene chloride resin, a polyvinyl alcohol resin, a polystyrene resin, a polypropylene resin, an ethylene/vinyl acetate copolymer, a polyester resin, a polyethylene terephthalate resin, a fluorine resin, a polycarbonate resin, an acrylic resin, a polyvinyl butyral resin, a polymetalloxane polymer, polysiloxane, and a silicone resin. These resins may be used alone, or a mixture of two or more kinds thereof may be used. It is also possible to use a binder using a metal alkoxide in place of the binder resin. As the metal alkoxide, alkoxides such as Si, Ti, Al, and Zr are representative. These binders using metal alkoxides can hydrolyzed and polycondensed by heating or the like to form oxide films.

Furthermore, the coating layer may contain various additives such as a plasticizer, a dispersant, a coupling agent, an ultraviolet absorbing agent, a light stabilizer, an antioxidant, and a plasticizer as necessary.

The coating layer can be formed by applying an application liquid containing a heat shielding agent, a colorant, or both the heat shielding agent and the colorant, and further containing a binder such as a binder resin, and various additives as necessary to a glass plate.

The application liquid applied to the glass plate may be appropriately subjected to drying by heating and the like. When the curable resin is used as the binder resin, the binder resin may be applied to the glass plate, followed by curing the curable resin by heating, ultraviolet rays, or electron irradiation as necessary.

In the application liquid, the heat shielding agent and the colorant and the like may be dispersed. As a dispersing medium used for the application liquid, various media such as various organic solvents and water can be selected. When the binder resin is the curable resin, and is in a liquid form before being cured, or at least a part of the binder resin is a liquid resin, the binder resin may be used as the dispersing medium. When the plasticizer is used, the plasticizer may also be used as the dispersing medium.

In the glass structure, the glass absorption region may be formed by the constitution of the glass plate itself. In that case, the glass structure may be composed of a glass plate single body. When the glass absorption region is formed by the constitution of the glass plate itself, the thickness of the glass plate is, for example, about 1 to 10 mm, and preferably about 2 to 6 mm.

When the glass absorption region is formed by the constitution of the glass plate itself, components constituting the glass plate may be appropriately adjusted to set the skin absorption energy of the glass plate itself to 25% or less, thereby forming the glass absorption region. For example, when the glass plate is soda lime glass, the glass plate generally contains MgO, $Fe_2O_3$, FeO, $TiO_2$, $Ce_2O_3$, $V_2O_5$, $K_2O$, and $CeO_2$ and the like as optional components in addition to $SiO_2$, $Na_2O$, CaO, and $Al_2O_3$, but for example, the glass absorption region may be formed by changing the blending amount and the presence or absence of blending and the like of at least one component among these optional components. For example, since $Fe_2O_3$ has an absorption peak at the vicinity of 1100 nm, the content of $Fe_2O_3$ or the ratio of the content of $Fe_2O_3$ to that of FeO may be increased to decrease the skin absorption energy rate of the glass plate, thereby forming the glass absorption region.

When the glass absorption region is formed by the glass plate itself, the glass plate can be produced by known methods, but for example, when the glass plate containing $Fe_2O_3$ is produced, the glass plate may be produced by means of the following steps (i) to (iv) in order.

(i) A glass matrix raw material, coloring component raw materials such as an iron source, a reducing agent, and a refining agent and the like are mixed to achieve the desired glass composition to prepare a glass raw material.

(ii) The glass raw material is continuously supplied to a melting furnace, heated to a temperature of from about 1,400° C. to 1,550° C., and melted to form molten glass.

(iii) The molten glass is refined, and then molded into a glass plate having a predetermined thickness by a glass plate-molding method such as a float process.

(iv) The glass plate is slowly cooled, and then cut into a predetermined size.

Examples of the glass matrix raw material include one used as a raw material of conventional soda lime silica glass such as silica sand, soda ash, lime stone, or feldspar. Examples of the iron source include iron powder, iron oxide powder, and red iron oxide. Examples of the reducing agent include carbon and coke. The reducing agent can suppress the oxidation of iron in the molten glass. The glass plate cut into a predetermined size may be tempered as necessary.

EXAMPLES

The present invention will be described in more detail by means of Examples, but the present invention is not limited in any way by these examples.

(Skin Absorption Energy Rates (X1) and (Y1))

The spectral light intensity of an artificial sunlight source ("XC-500E" manufactured by SERIC LTD.) was acquired per 1 nm in a range of 280 to 2500 nm, to obtain relative illuminance per 1 nm. The relative illuminance represented the relative intensity of the spectral light intensity per wavelength, and was calculated so that the relative illuminances of 280 to 2500 nm in total was set to 1. The calculation results of the relative illuminances are shown in Tables 1 to 5. Based on the relative illuminances, a weighting factor A shown in Table 6 was obtained using trapezoidal rule as described in ISO 9845 Annex B as prescribed by ISO 13837.

Based on human skin samples, the spectral absorption rate B of the skin shown in Table 6 was preliminarily calculated. The human skin samples are actually measured and calculated based on xanthous hands. In the present invention, the weighting factor A and the spectral absorption rate B shown in Table 6 are used in calculation of skin absorption energy rates (X1) and (Y1).

As shown in Table 6, the weighting factor A and the spectral absorption rate B were calculated per 5 nm at less than 380 nm, per 10 nm at 380 to 780 nm, and per 50 nm at 800 nm or more.

A spectral transmittance was measured for the laminated glass or the glass structure other than the laminated glass of each of Examples and Comparative Examples using a spectral photometer ("U-4100" manufactured by Hitachi High-Technologies Corporation) based on JIS R3106 (1998). The laminated glass or the glass structure other than the laminated glass was placed at a position separated by 13 cm from an integrating sphere in parallel with a normal line of an optic axis on an optical path between a light source and the integrating sphere so that the integrating sphere received only parallel light transmitting through the laminated glass or the glass structure other than the laminated glass during measurement, to measure a spectral transmittance (transmittance C).

Measuring conditions were as follows: scanning speed: 300 nm/min; and slit width: 8 nm. Measurement was performed based on JIS R 3106:1998 for the other conditions. The spectral transmittance (transmittance C) was measured per the same wavelength as that of the weighting factor A and the spectral absorption rate B.

Per wavelength, the weighting factor A ($\lambda$), the spectral absorption rate B ($\lambda$), and the transmittance C ($\lambda$) were multiplied with one another to calculate (A ($\lambda$)×B ($\lambda$)×C ($\lambda$)). The total ($\Sigma$(A ($\lambda$)×B ($\lambda$)×C ($\lambda$))) was taken as the skin absorption energy rate (Y1).

TABLE 1

| Wavelength (nm) | Relative illuminance |
|---|---|
| 280 | 0.000005 |
| 281 | 0.000005 |
| 282 | 0.000006 |
| 283 | 0.000008 |
| 284 | 0.000008 |
| 285 | 0.000010 |
| 286 | 0.000012 |
| 287 | 0.000013 |
| 288 | 0.000016 |
| 289 | 0.000018 |
| 290 | 0.000021 |
| 291 | 0.000025 |
| 292 | 0.000027 |
| 293 | 0.000030 |
| 294 | 0.000033 |
| 295 | 0.000033 |
| 296 | 0.000033 |
| 297 | 0.000032 |
| 298 | 0.000031 |
| 299 | 0.000031 |
| 300 | 0.000028 |
| 301 | 0.000027 |
| 302 | 0.000026 |
| 303 | 0.000024 |
| 304 | 0.000024 |
| 305 | 0.000024 |
| 306 | 0.000022 |
| 307 | 0.000024 |
| 308 | 0.000024 |
| 309 | 0.000024 |
| 310 | 0.000026 |
| 311 | 0.000026 |
| 312 | 0.000028 |
| 313 | 0.000031 |
| 314 | 0.000033 |
| 315 | 0.000036 |
| 316 | 0.000040 |
| 317 | 0.000044 |
| 318 | 0.000049 |
| 319 | 0.000057 |
| 320 | 0.000063 |
| 321 | 0.000075 |
| 322 | 0.000085 |
| 323 | 0.000099 |
| 324 | 0.000113 |
| 325 | 0.000131 |
| 326 | 0.000150 |
| 327 | 0.000172 |
| 328 | 0.000195 |
| 329 | 0.000221 |
| 330 | 0.000243 |
| 331 | 0.000269 |
| 332 | 0.000287 |
| 333 | 0.000309 |
| 334 | 0.000330 |
| 335 | 0.000347 |
| 336 | 0.000358 |
| 337 | 0.000368 |
| 338 | 0.000379 |
| 339 | 0.000385 |
| 340 | 0.000390 |
| 341 | 0.000398 |
| 342 | 0.000401 |
| 343 | 0.000405 |
| 344 | 0.000410 |
| 345 | 0.000413 |
| 346 | 0.000418 |
| 347 | 0.000424 |
| 348 | 0.000429 |
| 349 | 0.000434 |
| 350 | 0.000442 |
| 351 | 0.000444 |
| 352 | 0.000452 |
| 353 | 0.000457 |
| 354 | 0.000462 |
| 355 | 0.000465 |
| 356 | 0.000472 |

TABLE 1-continued

| Wavelength (nm) | Relative illuminance |
|---|---|
| 357 | 0.000477 |
| 358 | 0.000483 |
| 359 | 0.000488 |
| 360 | 0.000497 |
| 361 | 0.000501 |
| 362 | 0.000510 |
| 363 | 0.000516 |
| 364 | 0.000522 |
| 365 | 0.000531 |
| 366 | 0.000540 |
| 367 | 0.000551 |
| 368 | 0.000558 |
| 369 | 0.000567 |
| 370 | 0.000572 |
| 371 | 0.000581 |
| 372 | 0.000584 |
| 373 | 0.000591 |
| 374 | 0.000592 |
| 375 | 0.000602 |
| 376 | 0.000608 |
| 377 | 0.000618 |
| 378 | 0.000624 |
| 379 | 0.000631 |
| 380 | 0.000636 |
| 381 | 0.000642 |
| 382 | 0.000642 |
| 383 | 0.000643 |
| 384 | 0.000642 |
| 385 | 0.000640 |
| 386 | 0.000642 |
| 387 | 0.000646 |
| 388 | 0.000647 |
| 389 | 0.000653 |
| 390 | 0.000663 |
| 391 | 0.000667 |
| 392 | 0.000673 |
| 393 | 0.000685 |
| 394 | 0.000698 |
| 395 | 0.000716 |
| 396 | 0.000733 |
| 397 | 0.000734 |
| 398 | 0.000733 |
| 399 | 0.000723 |
| 400 | 0.000706 |
| 401 | 0.000695 |
| 401 | 0.000689 |
| 403 | 0.000685 |
| 404 | 0.000688 |
| 404 | 0.000697 |
| 406 | 0.000702 |
| 407 | 0.000709 |
| 408 | 0.000724 |
| 409 | 0.000732 |
| 410 | 0.000739 |
| 411 | 0.000749 |
| 412 | 0.000752 |
| 413 | 0.000750 |
| 414 | 0.000754 |
| 415 | 0.000751 |
| 416 | 0.000751 |
| 417 | 0.000761 |
| 418 | 0.000776 |
| 419 | 0.000782 |
| 420 | 0.000786 |
| 421 | 0.000786 |
| 422 | 0.000776 |
| 423 | 0.000768 |
| 424 | 0.000766 |
| 425 | 0.000760 |
| 426 | 0.000757 |
| 427 | 0.000760 |
| 428 | 0.000758 |
| 429 | 0.000756 |
| 430 | 0.000757 |
| 431 | 0.000752 |
| 432 | 0.000751 |
| 433 | 0.000755 |

TABLE 1-continued

| Wavelength (nm) | Relative illuminance |
|---|---|
| 434 | 0.000757 |
| 435 | 0.000758 |
| 436 | 0.000768 |
| 437 | 0.000776 |
| 438 | 0.000781 |
| 439 | 0.000783 |
| 440 | 0.000782 |
| 441 | 0.000774 |
| 442 | 0.000769 |
| 443 | 0.000766 |
| 444 | 0.000764 |
| 445 | 0.000762 |
| 446 | 0.000765 |
| 447 | 0.000788 |
| 448 | 0.000819 |
| 449 | 0.000859 |
| 450 | 0.000892 |
| 451 | 0.000901 |
| 452 | 0.000899 |
| 453 | 0.000880 |
| 454 | 0.000865 |
| 455 | 0.000867 |
| 456 | 0.000880 |
| 457 | 0.000897 |
| 458 | 0.000916 |
| 459 | 0.000938 |
| 460 | 0.000977 |
| 461 | 0.001020 |
| 462 | 0.001058 |
| 463 | 0.001082 |
| 464 | 0.001112 |
| 465 | 0.001155 |
| 466 | 0.001218 |
| 467 | 0.001293 |
| 468 | 0.001332 |
| 469 | 0.001292 |
| 470 | 0.001227 |
| 471 | 0.001152 |
| 472 | 0.001087 |
| 473 | 0.001062 |
| 474 | 0.001040 |
| 475 | 0.000995 |
| 476 | 0.000951 |
| 477 | 0.000913 |
| 478 | 0.000907 |
| 479 | 0.000937 |
| 480 | 0.000981 |
| 481 | 0.001028 |
| 482 | 0.001045 |
| 483 | 0.001040 |
| 484 | 0.001009 |
| 485 | 0.000967 |
| 486 | 0.000927 |
| 487 | 0.000900 |
| 488 | 0.000883 |
| 489 | 0.000898 |
| 490 | 0.000933 |
| 491 | 0.000969 |
| 492 | 0.000984 |
| 493 | 0.000972 |
| 494 | 0.000940 |
| 495 | 0.000905 |
| 496 | 0.000868 |
| 497 | 0.000845 |
| 498 | 0.000835 |
| 499 | 0.000835 |
| 500 | 0.000833 |
| 501 | 0.000837 |
| 502 | 0.000843 |
| 503 | 0.000846 |
| 504 | 0.000845 |
| 505 | 0.000845 |
| 506 | 0.000846 |
| 507 | 0.000843 |
| 508 | 0.000846 |
| 509 | 0.000846 |
| 510 | 0.000852 |

TABLE 1-continued

| Wavelength (nm) | Relative illuminance |
|---|---|
| 511 | 0.000853 |
| 512 | 0.000857 |
| 513 | 0.000860 |
| 514 | 0.000868 |
| 515 | 0.000866 |
| 516 | 0.000867 |
| 517 | 0.000868 |
| 518 | 0.000869 |
| 519 | 0.000869 |
| 520 | 0.000872 |
| 521 | 0.000867 |
| 522 | 0.000866 |
| 523 | 0.000865 |
| 524 | 0.000863 |
| 525 | 0.000862 |
| 526 | 0.000859 |
| 527 | 0.000859 |
| 528 | 0.000857 |
| 529 | 0.000859 |
| 530 | 0.000855 |
| 531 | 0.000857 |
| 532 | 0.000856 |
| 533 | 0.000859 |
| 534 | 0.000859 |
| 535 | 0.000859 |
| 536 | 0.000861 |
| 537 | 0.000864 |
| 538 | 0.000867 |
| 539 | 0.000868 |
| 540 | 0.000872 |
| 541 | 0.000875 |
| 542 | 0.000877 |
| 543 | 0.000878 |
| 544 | 0.000880 |
| 545 | 0.000877 |
| 546 | 0.000877 |
| 547 | 0.000876 |
| 548 | 0.000879 |
| 549 | 0.000875 |
| 550 | 0.000873 |
| 551 | 0.000874 |
| 552 | 0.000873 |
| 553 | 0.000870 |
| 554 | 0.000871 |
| 555 | 0.000870 |
| 556 | 0.000867 |
| 557 | 0.000867 |
| 558 | 0.000863 |
| 559 | 0.000858 |
| 560 | 0.000853 |
| 561 | 0.000851 |
| 562 | 0.000846 |
| 563 | 0.000843 |
| 564 | 0.000839 |
| 565 | 0.000837 |
| 566 | 0.000837 |
| 567 | 0.000843 |
| 568 | 0.000839 |
| 569 | 0.000842 |
| 570 | 0.000846 |
| 571 | 0.000850 |
| 572 | 0.000849 |
| 573 | 0.000850 |
| 574 | 0.000848 |
| 275 | 0.000848 |
| 576 | 0.000852 |
| 577 | 0.000853 |
| 578 | 0.000854 |
| 579 | 0.000859 |
| 580 | 0.000868 |
| 581 | 0.000874 |
| 582 | 0.000883 |
| 583 | 0.000889 |
| 584 | 0.000899 |
| 585 | 0.000904 |
| 586 | 0.000907 |
| 587 | 0.000910 |

TABLE 1-continued

| Wavelength (nm) | Relative illuminance |
|---|---|
| 588 | 0.000913 |
| 589 | 0.000912 |
| 590 | 0.000915 |
| 591 | 0.000912 |
| 592 | 0.000904 |
| 593 | 0.000899 |
| 594 | 0.000892 |
| 595 | 0.000879 |
| 596 | 0.000870 |
| 597 | 0.000860 |
| 598 | 0.000848 |
| 599 | 0.000841 |
| 600 | 0.000835 |
| 601 | 0.000829 |
| 602 | 0.000822 |
| 603 | 0.000821 |
| 604 | 0.000814 |
| 605 | 0.000811 |
| 606 | 0.000811 |
| 607 | 0.000809 |
| 608 | 0.000813 |
| 609 | 0.000820 |
| 610 | 0.000822 |
| 611 | 0.000830 |
| 612 | 0.000843 |
| 613 | 0.000849 |
| 614 | 0.000859 |
| 615 | 0.000873 |
| 616 | 0.000892 |
| 617 | 0.000911 |
| 618 | 0.000933 |
| 619 | 0.000947 |
| 620 | 0.000946 |
| 621 | 0.000943 |
| 622 | 0.000933 |
| 623 | 0.000911 |
| 624 | 0.000899 |
| 625 | 0.000888 |
| 626 | 0.000876 |
| 627 | 0.000873 |
| 628 | 0.000878 |
| 629 | 0.000875 |
| 630 | 0.000887 |
| 631 | 0.000892 |
| 632 | 0.000903 |
| 633 | 0.000898 |
| 634 | 0.000884 |
| 635 | 0.000871 |
| 636 | 0.000855 |
| 637 | 0.000834 |
| 638 | 0.000823 |
| 639 | 0.000814 |
| 640 | 0.000801 |
| 641 | 0.000797 |
| 642 | 0.000796 |
| 643 | 0.000796 |
| 644 | 0.000805 |
| 645 | 0.000823 |
| 646 | 0.000844 |
| 647 | 0.000869 |
| 648 | 0.000884 |
| 649 | 0.000880 |
| 650 | 0.000865 |
| 651 | 0.000841 |
| 652 | 0.000818 |
| 653 | 0.000802 |
| 654 | 0.000792 |
| 655 | 0.000779 |
| 653 | 0.000775 |
| 657 | 0.000776 |
| 658 | 0.000771 |
| 659 | 0.000772 |
| 660 | 0.000775 |
| 661 | 0.000776 |
| 662 | 0.000780 |
| 663 | 0.000789 |
| 664 | 0.000793 |
| 665 | 0.000804 |
| 666 | 0.000818 |
| 667 | 0.000827 |
| 668 | 0.000831 |
| 669 | 0.000828 |
| 670 | 0.000828 |
| 671 | 0.000827 |
| 672 | 0.000830 |
| 673 | 0.000839 |
| 674 | 0.000842 |
| 675 | 0.000840 |
| 676 | 0.000838 |
| 677 | 0.000824 |
| 678 | 0.000815 |
| 679 | 0.000813 |
| 680 | 0.000828 |
| 681 | 0.000861 |
| 682 | 0.000907 |
| 683 | 0.000954 |
| 684 | 0.000986 |
| 685 | 0.001014 |
| 686 | 0.001049 |
| 687 | 0.001078 |
| 688 | 0.001104 |
| 689 | 0.001100 |
| 690 | 0.001063 |
| 691 | 0.001007 |
| 692 | 0.000938 |
| 693 | 0.000876 |
| 694 | 0.000834 |
| 695 | 0.000811 |
| 696 | 0.000795 |
| 697 | 0.000789 |
| 698 | 0.000784 |
| 699 | 0.000772 |
| 700 | 0.000762 |
| 701 | 0.000742 |
| 702 | 0.000722 |
| 703 | 0.000706 |
| 704 | 0.000696 |
| 705 | 0.000694 |
| 706 | 0.000699 |
| 707 | 0.000713 |
| 708 | 0.000745 |
| 709 | 0.000793 |
| 710 | 0.000862 |
| 711 | 0.000924 |
| 712 | 0.000978 |
| 713 | 0.000993 |
| 714 | 0.000956 |
| 715 | 0.000894 |
| 716 | 0.000820 |
| 717 | 0.000760 |
| 718 | 0.000715 |
| 719 | 0.000687 |
| 720 | 0.000667 |
| 721 | 0.000651 |
| 722 | 0.000643 |
| 723 | 0.000641 |
| 724 | 0.000652 |
| 725 | 0.000668 |
| 726 | 0.000697 |
| 727 | 0.000727 |
| 728 | 0.000756 |
| 729 | 0.000773 |
| 730 | 0.000789 |
| 731 | 0.000798 |
| 732 | 0.000796 |
| 733 | 0.000773 |
| 734 | 0.000742 |
| 735 | 0.000701 |
| 736 | 0.000667 |
| 737 | 0.000665 |
| 738 | 0.000682 |
| 739 | 0.000707 |
| 740 | 0.000725 |
| 741 | 0.000721 |

TABLE 1-continued

| Wavelength (nm) | Relative illuminance |
|---|---|
| 742 | 0.000696 |
| 743 | 0.000660 |
| 744 | 0.000616 |
| 745 | 0.000578 |
| 746 | 0.000556 |
| 747 | 0.000547 |
| 748 | 0.000544 |
| 749 | 0.000548 |
| 750 | 0.000553 |
| 751 | 0.000550 |
| 752 | 0.000545 |
| 753 | 0.000538 |
| 754 | 0.000529 |
| 755 | 0.000525 |
| 756 | 0.000522 |
| 757 | 0.000530 |
| 758 | 0.000543 |
| 759 | 0.000560 |

TABLE 2

| Wavelength (nm) | Relative illuminance |
|---|---|
| 760 | 0.000579 |
| 761 | 0.000620 |
| 762 | 0.000704 |
| 763 | 0.000785 |
| 764 | 0.000848 |
| 765 | 0.000845 |
| 766 | 0.000749 |
| 767 | 0.000626 |
| 768 | 0.000504 |
| 769 | 0.000427 |
| 770 | 0.000387 |
| 771 | 0.000363 |
| 772 | 0.000343 |
| 773 | 0.000326 |
| 774 | 0.000316 |
| 775 | 0.000306 |
| 776 | 0.000297 |
| 777 | 0.000291 |
| 778 | 0.000287 |
| 779 | 0.000286 |
| 780 | 0.000288 |
| 781 | 0.000289 |
| 782 | 0.000287 |
| 783 | 0.000283 |
| 784 | 0.000275 |
| 785 | 0.000269 |
| 786 | 0.000273 |
| 787 | 0.000290 |
| 788 | 0.000312 |
| 789 | 0.000333 |
| 790 | 0.000340 |
| 791 | 0.000323 |
| 792 | 0.000301 |
| 793 | 0.000275 |
| 794 | 0.000265 |
| 795 | 0.000274 |
| 796 | 0.000290 |
| 797 | 0.000309 |
| 798 | 0.000314 |
| 799 | 0.000309 |
| 800 | 0.000293 |
| 801 | 0.000277 |
| 802 | 0.000264 |
| 803 | 0.000258 |
| 804 | 0.000262 |
| 805 | 0.000271 |
| 806 | 0.000283 |
| 807 | 0.000291 |
| 808 | 0.000291 |
| 809 | 0.000288 |

TABLE 2-continued

| Wavelength (nm) | Relative illuminance |
|---|---|
| 810 | 0.000276 |
| 811 | 0.000263 |
| 812 | 0.000252 |
| 813 | 0.000244 |
| 814 | 0.000241 |
| 815 | 0.000242 |
| 816 | 0.000249 |
| 817 | 0.000265 |
| 818 | 0.000303 |
| 819 | 0.000382 |
| 820 | 0.000643 |
| 821 | 0.001077 |
| 822 | 0.001556 |
| 823 | 0.001948 |
| 824 | 0.002125 |
| 825 | 0.001993 |
| 826 | 0.001744 |
| 827 | 0.001489 |
| 828 | 0.001283 |
| 829 | 0.001135 |
| 830 | 0.000910 |
| 831 | 0.000678 |
| 832 | 0.000551 |
| 833 | 0.000548 |
| 834 | 0.000636 |
| 835 | 0.000699 |
| 836 | 0.000656 |
| 837 | 0.000527 |
| 838 | 0.000414 |
| 839 | 0.000341 |
| 840 | 0.000328 |
| 841 | 0.000344 |
| 842 | 0.000328 |
| 843 | 0.000276 |
| 844 | 0.000223 |
| 845 | 0.000174 |
| 846 | 0.000148 |
| 847 | 0.000140 |
| 848 | 0.000136 |
| 849 | 0.000133 |
| 850 | 0.000132 |
| 851 | 0.000133 |
| 852 | 0.000135 |
| 853 | 0.000137 |
| 854 | 0.000138 |
| 855 | 0.000141 |
| 856 | 0.000144 |
| 857 | 0.000147 |
| 858 | 0.000149 |
| 859 | 0.000150 |
| 860 | 0.000151 |
| 861 | 0.000153 |
| 862 | 0.000156 |
| 863 | 0.000165 |
| 864 | 0.000175 |
| 865 | 0.000185 |
| 866 | 0.000194 |
| 867 | 0.000198 |
| 868 | 0.000201 |
| 869 | 0.000206 |
| 870 | 0.000213 |
| 871 | 0.000226 |
| 872 | 0.000244 |
| 873 | 0.000261 |
| 874 | 0.000279 |
| 875 | 0.000292 |
| 876 | 0.000300 |
| 877 | 0.000313 |
| 878 | 0.000367 |
| 879 | 0.000585 |
| 880 | 0.001035 |
| 881 | 0.001584 |
| 882 | 0.002002 |
| 883 | 0.002115 |
| 884 | 0.001837 |
| 885 | 0.001367 |
| 886 | 0.000912 |

TABLE 2-continued

| Wavelength (nm) | Relative illuminance |
|---|---|
| 887 | 0.000627 |
| 888 | 0.000504 |
| 889 | 0.000440 |
| 890 | 0.000418 |
| 891 | 0.000436 |
| 892 | 0.000556 |
| 893 | 0.000761 |
| 894 | 0.000969 |
| 895 | 0.001116 |
| 896 | 0.001121 |
| 897 | 0.000972 |
| 898 | 0.000775 |
| 899 | 0.000580 |
| 900 | 0.000451 |
| 901 | 0.000434 |
| 902 | 0.000568 |
| 903 | 0.000774 |
| 904 | 0.000977 |
| 905 | 0.001117 |
| 906 | 0.001060 |
| 907 | 0.000864 |
| 908 | 0.000611 |
| 909 | 0.000400 |
| 910 | 0.000298 |
| 911 | 0.000285 |
| 912 | 0.000316 |
| 913 | 0.000451 |
| 914 | 0.000783 |
| 915 | 0.001186 |
| 916 | 0.001567 |
| 917 | 0.001757 |
| 918 | 0.001622 |
| 919 | 0.001297 |
| 920 | 0.000919 |
| 921 | 0.000627 |
| 922 | 0.000485 |
| 923 | 0.000406 |
| 924 | 0.000346 |
| 925 | 0.000301 |
| 926 | 0.000270 |
| 927 | 0.000256 |
| 928 | 0.000259 |
| 929 | 0.000272 |
| 930 | 0.000289 |
| 931 | 0.000301 |
| 932 | 0.000305 |
| 933 | 0.000304 |
| 934 | 0.000327 |
| 935 | 0.000405 |
| 936 | 0.000520 |
| 937 | 0.000645 |
| 938 | 0.000736 |
| 939 | 0.000762 |
| 940 | 0.000724 |
| 941 | 0.000655 |
| 942 | 0.000592 |
| 943 | 0.000562 |
| 944 | 0.000560 |
| 945 | 0.000571 |
| 946 | 0.000578 |
| 947 | 0.000579 |
| 948 | 0.000600 |
| 949 | 0.000665 |
| 950 | 0.000753 |
| 951 | 0.000838 |
| 952 | 0.000859 |
| 953 | 0.000792 |
| 954 | 0.000667 |
| 955 | 0.000525 |
| 956 | 0.000405 |
| 957 | 0.000338 |
| 958 | 0.000297 |
| 959 | 0.000277 |
| 960 | 0.000264 |
| 961 | 0.000256 |
| 962 | 0.000254 |
| 963 | 0.000254 |

TABLE 2-continued

| Wavelength (nm) | Relative illuminance |
|---|---|
| 964 | 0.000264 |
| 965 | 0.000286 |
| 966 | 0.000334 |
| 967 | 0.000397 |
| 968 | 0.000467 |
| 969 | 0.000528 |
| 970 | 0.000572 |
| 971 | 0.000586 |
| 972 | 0.000575 |
| 973 | 0.000543 |
| 974 | 0.000510 |
| 975 | 0.000490 |
| 976 | 0.000553 |
| 977 | 0.000841 |
| 978 | 0.001293 |
| 979 | 0.001723 |
| 980 | 0.002029 |
| 981 | 0.001990 |
| 982 | 0.001638 |
| 983 | 0.001153 |
| 984 | 0.000718 |
| 985 | 0.000450 |
| 986 | 0.000374 |
| 987 | 0.000373 |
| 988 | 0.000421 |
| 989 | 0.000603 |
| 990 | 0.001042 |
| 991 | 0.001632 |
| 992 | 0.002164 |
| 993 | 0.002461 |
| 994 | 0.002301 |
| 995 | 0.001810 |
| 996 | 0.001242 |
| 997 | 0.000766 |
| 998 | 0.000540 |
| 999 | 0.000456 |
| 1000 | 0.000431 |
| 1001 | 0.000423 |
| 1002 | 0.000429 |
| 1003 | 0.000443 |
| 1004 | 0.000450 |
| 1005 | 0.000448 |
| 1006 | 0.000428 |
| 1007 | 0.000420 |
| 1008 | 0.000433 |
| 1009 | 0.000506 |
| 1010 | 0.000625 |
| 1011 | 0.000758 |
| 1012 | 0.000847 |
| 1013 | 0.000859 |
| 1014 | 0.000793 |
| 1015 | 0.000681 |
| 1016 | 0.000569 |
| 1017 | 0.000482 |
| 1018 | 0.000424 |
| 1019 | 0.000385 |
| 1020 | 0.000361 |
| 1021 | 0.000345 |
| 1022 | 0.000336 |
| 1023 | 0.000330 |
| 1024 | 0.000331 |
| 1025 | 0.000333 |
| 1026 | 0.000335 |
| 1027 | 0.000337 |
| 1028 | 0.000337 |
| 1029 | 0.000335 |
| 1030 | 0.000338 |
| 1031 | 0.000346 |
| 1032 | 0.000360 |
| 1033 | 0.000377 |
| 1034 | 0.000385 |
| 1035 | 0.000387 |
| 1036 | 0.000380 |
| 1037 | 0.000363 |
| 1038 | 0.000350 |
| 1039 | 0.000342 |
| 1040 | 0.000336 |

TABLE 2-continued

| Wavelength (nm) | Relative illuminance |
|---|---|
| 1041 | 0.000341 |
| 1042 | 0.000345 |
| 1043 | 0.000347 |
| 1044 | 0.000353 |
| 1045 | 0.000364 |
| 1046 | 0.000379 |
| 1047 | 0.000395 |
| 1048 | 0.000417 |
| 1049 | 0.000443 |
| 1050 | 0.000490 |
| 1051 | 0.000554 |
| 1052 | 0.000615 |
| 1053 | 0.000660 |
| 1054 | 0.000669 |
| 1055 | 0.000642 |
| 1056 | 0.000586 |
| 1057 | 0.000531 |
| 1058 | 0.000490 |
| 1059 | 0.000464 |
| 1060 | 0.000449 |
| 1061 | 0.000435 |
| 1062 | 0.000425 |
| 1063 | 0.000419 |
| 1064 | 0.000414 |
| 1065 | 0.000409 |
| 1066 | 0.000406 |
| 1067 | 0.000406 |
| 1068 | 0.000406 |
| 1069 | 0.000417 |
| 1070 | 0.000436 |
| 1071 | 0.000461 |
| 1072 | 0.000478 |
| 1073 | 0.000488 |
| 1074 | 0.000487 |
| 1075 | 0.000489 |
| 1076 | 0.000491 |
| 1077 | 0.000500 |
| 1078 | 0.000501 |
| 1079 | 0.000496 |
| 1080 | 0.000485 |
| 1081 | 0.000508 |
| 1082 | 0.000613 |
| 1083 | 0.000774 |
| 1084 | 0.000920 |
| 1085 | 0.000983 |
| 1086 | 0.000924 |
| 1087 | 0.000783 |
| 1088 | 0.000685 |
| 1089 | 0.000649 |
| 1090 | 0.000677 |
| 1091 | 0.000701 |
| 1092 | 0.000675 |
| 1093 | 0.000613 |
| 1094 | 0.000547 |
| 1095 | 0.000495 |
| 1096 | 0.000472 |
| 1097 | 0.000467 |
| 1098 | 0.000460 |
| 1099 | 0.000457 |
| 1100 | 0.000458 |
| 1101 | 0.000461 |
| 1102 | 0.000469 |
| 1103 | 0.000476 |
| 1104 | 0.000490 |
| 1105 | 0.000509 |
| 1106 | 0.000543 |
| 1107 | 0.000619 |
| 1108 | 0.000745 |
| 1109 | 0.000887 |
| 1110 | 0.001022 |
| 1111 | 0.001090 |
| 1112 | 0.001079 |
| 1113 | 0.001019 |
| 1114 | 0.000922 |
| 1115 | 0.000841 |
| 1116 | 0.000766 |
| 1117 | 0.000711 |
| 1118 | 0.000649 |
| 1119 | 0.000610 |
| 1120 | 0.000574 |
| 1121 | 0.000551 |
| 1122 | 0.000536 |
| 1123 | 0.000526 |
| 1124 | 0.000522 |
| 1125 | 0.000512 |
| 1126 | 0.000506 |
| 1127 | 0.000503 |
| 1128 | 0.000500 |
| 1129 | 0.000503 |
| 1130 | 0.000506 |
| 1131 | 0.000511 |
| 1132 | 0.000515 |
| 1133 | 0.000514 |
| 1134 | 0.000509 |
| 1135 | 0.000507 |
| 1136 | 0.000507 |
| 1137 | 0.000509 |
| 1138 | 0.000508 |
| 1139 | 0.000513 |
| 1140 | 0.000516 |
| 1141 | 0.000521 |
| 1142 | 0.000525 |
| 1143 | 0.000528 |
| 1144 | 0.000530 |
| 1145 | 0.000529 |
| 1146 | 0.000528 |
| 1147 | 0.000529 |
| 1148 | 0.000531 |
| 1149 | 0.000528 |
| 1150 | 0.000529 |
| 1151 | 0.000532 |
| 1152 | 0.000524 |
| 1153 | 0.000524 |
| 1154 | 0.000525 |
| 1155 | 0.000522 |
| 1156 | 0.000521 |
| 1157 | 0.000522 |
| 1158 | 0.000522 |
| 1159 | 0.000523 |
| 1160 | 0.000534 |
| 1161 | 0.000548 |
| 1162 | 0.000567 |
| 1163 | 0.000579 |
| 1164 | 0.000589 |
| 1165 | 0.000585 |
| 1166 | 0.000580 |
| 1167 | 0.000576 |
| 1168 | 0.000579 |
| 1169 | 0.000588 |
| 1170 | 0.000611 |
| 1171 | 0.000652 |
| 1172 | 0.000742 |
| 1173 | 0.000907 |
| 1174 | 0.001118 |
| 1175 | 0.001300 |
| 1176 | 0.001400 |
| 1177 | 0.001378 |
| 1178 | 0.001271 |
| 1179 | 0.001138 |
| 1180 | 0.001019 |
| 1181 | 0.000936 |
| 1182 | 0.000879 |
| 1183 | 0.000823 |
| 1184 | 0.000780 |
| 1185 | 0.000753 |
| 1186 | 0.000749 |
| 1187 | 0.000749 |
| 1188 | 0.000744 |
| 1189 | 0.000726 |
| 1190 | 0.000695 |
| 1191 | 0.000657 |
| 1192 | 0.000626 |
| 1193 | 0.000604 |
| 1194 | 0.000587 |

TABLE 2-continued

| Wavelength (nm) | Relative illuminance |
|---|---|
| 1195 | 0.000572 |
| 1196 | 0.000561 |
| 1197 | 0.000549 |
| 1198 | 0.000545 |
| 1199 | 0.000539 |
| 1200 | 0.000534 |
| 1201 | 0.000525 |
| 1202 | 0.000521 |
| 1203 | 0.000517 |
| 1204 | 0.000511 |
| 1205 | 0.000507 |
| 1206 | 0.000506 |
| 1207 | 0.000507 |
| 1208 | 0.000509 |
| 1209 | 0.000512 |
| 1210 | 0.000515 |
| 1211 | 0.000518 |
| 1212 | 0.000519 |
| 1213 | 0.000517 |
| 1214 | 0.000512 |
| 1215 | 0.000509 |
| 1216 | 0.000502 |
| 1217 | 0.000500 |
| 1218 | 0.000494 |
| 1219 | 0.000495 |
| 1220 | 0.000495 |
| 1221 | 0.000498 |
| 1222 | 0.000504 |
| 1223 | 0.000518 |
| 1224 | 0.000535 |
| 1225 | 0.000552 |
| 1226 | 0.000561 |
| 1227 | 0.000560 |
| 1228 | 0.000549 |
| 1229 | 0.000533 |
| 1230 | 0.000517 |
| 1231 | 0.000507 |
| 1232 | 0.000496 |
| 1233 | 0.000487 |
| 1234 | 0.000482 |
| 1235 | 0.000475 |
| 1236 | 0.000472 |
| 1237 | 0.000468 |
| 1238 | 0.000468 |
| 1239 | 0.000464 |

TABLE 3

| Wavelength (nm) | Relative illuminance |
|---|---|
| 1240 | 0.000465 |
| 1241 | 0.000464 |
| 1242 | 0.000463 |
| 1243 | 0.000465 |
| 1244 | 0.000466 |
| 1245 | 0.000467 |
| 1246 | 0.000469 |
| 1247 | 0.000465 |
| 1248 | 0.000470 |
| 1249 | 0.000469 |
| 1250 | 0.000471 |
| 1251 | 0.000473 |
| 1252 | 0.000468 |
| 1253 | 0.000469 |
| 1254 | 0.000467 |
| 1255 | 0.000468 |
| 1256 | 0.000469 |
| 1257 | 0.000478 |
| 1258 | 0.000483 |
| 1259 | 0.000502 |
| 1260 | 0.000531 |
| 1261 | 0.000604 |
| 1262 | 0.000729 |

TABLE 3-continued

| Wavelength (nm) | Relative illuminance |
|---|---|
| 1263 | 0.000869 |
| 1264 | 0.000995 |
| 1265 | 0.001040 |
| 1266 | 0.001000 |
| 1267 | 0.000894 |
| 1268 | 0.000772 |
| 1269 | 0.000673 |
| 1270 | 0.000603 |
| 1271 | 0.000559 |
| 1272 | 0.000525 |
| 1273 | 0.000504 |
| 1274 | 0.000488 |
| 1275 | 0.000478 |
| 1276 | 0.000468 |
| 1277 | 0.000464 |
| 1278 | 0.000459 |
| 1279 | 0.000455 |
| 1280 | 0.000454 |
| 1281 | 0.000450 |
| 1282 | 0.000447 |
| 1283 | 0.000444 |
| 1284 | 0.000442 |
| 1285 | 0.000442 |
| 1286 | 0.000439 |
| 1287 | 0.000435 |
| 1288 | 0.000435 |
| 1289 | 0.000434 |
| 1290 | 0.000432 |
| 1291 | 0.000430 |
| 1292 | 0.000432 |
| 1293 | 0.000429 |
| 1294 | 0.000428 |
| 1295 | 0.000428 |
| 1296 | 0.000426 |
| 1297 | 0.000425 |
| 1298 | 0.000426 |
| 1299 | 0.000426 |
| 1300 | 0.000424 |
| 1301 | 0.000423 |
| 1302 | 0.000426 |
| 1303 | 0.000425 |
| 1304 | 0.000422 |
| 1305 | 0.000421 |
| 1306 | 0.000421 |
| 1307 | 0.000418 |
| 1308 | 0.000418 |
| 1309 | 0.000417 |
| 1310 | 0.000417 |
| 1311 | 0.000419 |
| 1312 | 0.000419 |
| 1313 | 0.000416 |
| 1314 | 0.000416 |
| 1315 | 0.000418 |
| 1316 | 0.000418 |
| 1317 | 0.000415 |
| 1318 | 0.000416 |
| 1319 | 0.000416 |
| 1320 | 0.000417 |
| 1321 | 0.000414 |
| 1322 | 0.000413 |
| 1323 | 0.000414 |
| 1324 | 0.000413 |
| 1325 | 0.000414 |
| 1326 | 0.000414 |
| 1327 | 0.000412 |
| 1328 | 0.000412 |
| 1329 | 0.000412 |
| 1330 | 0.000414 |
| 1331 | 0.000414 |
| 1332 | 0.000414 |
| 1333 | 0.000414 |
| 1334 | 0.000415 |
| 1335 | 0.000417 |
| 1336 | 0.000416 |
| 1337 | 0.000419 |
| 1338 | 0.000421 |
| 1339 | 0.000417 |

TABLE 3-continued

| Wavelength (nm) | Relative illuminance |
|---|---|
| 1340 | 0.000418 |
| 1341 | 0.000419 |
| 1342 | 0.000415 |
| 1343 | 0.000413 |
| 1344 | 0.000416 |
| 1345 | 0.000412 |
| 1346 | 0.000409 |
| 1347 | 0.000410 |
| 1348 | 0.000408 |
| 1349 | 0.000405 |
| 1350 | 0.000404 |
| 1351 | 0.000403 |
| 1352 | 0.000397 |
| 1353 | 0.000400 |
| 1354 | 0.000399 |
| 1355 | 0.000395 |
| 1356 | 0.000399 |
| 1357 | 0.000402 |
| 1358 | 0.000403 |
| 1359 | 0.000403 |
| 1360 | 0.000401 |
| 1361 | 0.000394 |
| 1362 | 0.000394 |
| 1363 | 0.000399 |
| 1364 | 0.000432 |
| 1365 | 0.000505 |
| 1366 | 0.000604 |
| 1367 | 0.000688 |
| 1368 | 0.000730 |
| 1369 | 0.000711 |
| 1370 | 0.000643 |
| 1371 | 0.000568 |
| 1372 | 0.000510 |
| 1373 | 0.000475 |
| 1374 | 0.000451 |
| 1375 | 0.000433 |
| 1376 | 0.000420 |
| 1377 | 0.000408 |
| 1378 | 0.000398 |
| 1379 | 0.000384 |
| 1380 | 0.000377 |
| 1381 | 0.000364 |
| 1382 | 0.000358 |
| 1383 | 0.000356 |
| 1384 | 0.000355 |
| 1385 | 0.000359 |
| 1386 | 0.000361 |
| 1387 | 0.000361 |
| 1388 | 0.000364 |
| 1389 | 0.000366 |
| 1390 | 0.000368 |
| 1391 | 0.000368 |
| 1392 | 0.000367 |
| 1393 | 0.000365 |
| 1394 | 0.000359 |
| 1395 | 0.000357 |
| 1396 | 0.000355 |
| 1397 | 0.000357 |
| 1398 | 0.000360 |
| 1399 | 0.000361 |
| 1400 | 0.000359 |
| 1401 | 0.000362 |
| 1402 | 0.000363 |
| 1403 | 0.000362 |
| 1404 | 0.000369 |
| 1405 | 0.000369 |
| 1406 | 0.000370 |
| 1407 | 0.000368 |
| 1408 | 0.000373 |
| 1409 | 0.000377 |
| 1410 | 0.000382 |
| 1411 | 0.000388 |
| 1412 | 0.000402 |
| 1413 | 0.000421 |
| 1414 | 0.000456 |
| 1415 | 0.000493 |
| 1416 | 0.000528 |
| 1417 | 0.000541 |
| 1418 | 0.000531 |
| 1419 | 0.000510 |
| 1420 | 0.000486 |
| 1421 | 0.000481 |
| 1422 | 0.000488 |
| 1423 | 0.000507 |
| 1424 | 0.000536 |
| 1425 | 0.000562 |
| 1426 | 0.000575 |
| 1427 | 0.000568 |
| 1428 | 0.000543 |
| 1429 | 0.000511 |
| 1430 | 0.000480 |
| 1431 | 0.000460 |
| 1432 | 0.000447 |
| 1433 | 0.000433 |
| 1434 | 0.000430 |
| 1435 | 0.000435 |
| 1436 | 0.000446 |
| 1437 | 0.000460 |
| 1438 | 0.000476 |
| 1439 | 0.000481 |
| 1440 | 0.000474 |
| 1441 | 0.000463 |
| 1442 | 0.000447 |
| 1443 | 0.000431 |
| 1444 | 0.000420 |
| 1445 | 0.000411 |
| 1446 | 0.000404 |
| 1447 | 0.000402 |
| 1448 | 0.000399 |
| 1449 | 0.000398 |
| 1450 | 0.000394 |
| 1451 | 0.000392 |
| 1452 | 0.000393 |
| 1453 | 0.000391 |
| 1454 | 0.000389 |
| 1455 | 0.000391 |
| 1456 | 0.000390 |
| 1457 | 0.000391 |
| 1458 | 0.000390 |
| 1459 | 0.000389 |
| 1460 | 0.000391 |
| 1461 | 0.000393 |
| 1462 | 0.000392 |
| 1463 | 0.000394 |
| 1464 | 0.000395 |
| 1465 | 0.000396 |
| 1466 | 0.000403 |
| 1467 | 0.000408 |
| 1468 | 0.000413 |
| 1469 | 0.000420 |
| 1470 | 0.000431 |
| 1471 | 0.000453 |
| 1472 | 0.000510 |
| 1473 | 0.000638 |
| 1474 | 0.000815 |
| 1475 | 0.000981 |
| 1476 | 0.001077 |
| 1477 | 0.001049 |
| 1478 | 0.000936 |
| 1479 | 0.000786 |
| 1480 | 0.000669 |
| 1481 | 0.000587 |
| 1482 | 0.000534 |
| 1483 | 0.000501 |
| 1484 | 0.000476 |
| 1485 | 0.000459 |
| 1486 | 0.000446 |
| 1487 | 0.000435 |
| 1488 | 0.000428 |
| 1489 | 0.000423 |
| 1490 | 0.000415 |
| 1491 | 0.000410 |
| 1492 | 0.000407 |
| 1493 | 0.000407 |

TABLE 3-continued

| Wavelength (nm) | Relative illuminance |
|---|---|
| 1494 | 0.000407 |
| 1495 | 0.000407 |
| 1496 | 0.000409 |
| 1497 | 0.000409 |
| 1498 | 0.000409 |
| 1499 | 0.000410 |
| 1500 | 0.000410 |
| 1501 | 0.000409 |
| 1502 | 0.000409 |
| 1503 | 0.000409 |
| 1504 | 0.000408 |
| 1505 | 0.000406 |
| 1506 | 0.000405 |
| 1507 | 0.000404 |
| 1508 | 0.000403 |
| 1509 | 0.000404 |
| 1510 | 0.000401 |
| 1511 | 0.000400 |
| 1512 | 0.000398 |
| 1513 | 0.000398 |
| 1514 | 0.000395 |
| 1515 | 0.000392 |
| 1516 | 0.000393 |
| 1517 | 0.000392 |
| 1518 | 0.000392 |
| 1519 | 0.000395 |
| 1520 | 0.000393 |
| 1521 | 0.000392 |
| 1522 | 0.000393 |
| 1523 | 0.000391 |
| 1524 | 0.000391 |
| 1525 | 0.000390 |
| 1526 | 0.000395 |
| 1527 | 0.000394 |
| 1528 | 0.000397 |
| 1529 | 0.000397 |
| 1530 | 0.000396 |
| 1531 | 0.000395 |
| 1532 | 0.000396 |
| 1533 | 0.000397 |
| 1534 | 0.000395 |
| 1535 | 0.000399 |
| 1536 | 0.000398 |
| 1537 | 0.000401 |
| 1538 | 0.000405 |
| 1539 | 0.000414 |
| 1540 | 0.000425 |
| 1541 | 0.000468 |
| 1542 | 0.000528 |
| 1543 | 0.000604 |
| 1544 | 0.000661 |
| 1545 | 0.000684 |
| 1546 | 0.000659 |
| 1547 | 0.000608 |
| 1548 | 0.000550 |
| 1549 | 0.000507 |
| 1550 | 0.000477 |
| 1551 | 0.000459 |
| 1552 | 0.000445 |
| 1553 | 0.000436 |
| 1554 | 0.000428 |
| 1555 | 0.000422 |
| 1556 | 0.000417 |
| 1557 | 0.000416 |
| 1558 | 0.000410 |
| 1560 | 0.000405 |
| 1561 | 0.000404 |
| 1562 | 0.000401 |
| 1563 | 0.000399 |
| 1564 | 0.000397 |
| 1565 | 0.000396 |
| 1566 | 0.000395 |
| 1567 | 0.000396 |
| 1568 | 0.000393 |
| 1569 | 0.000391 |
| 1570 | 0.000391 |
| 1571 | 0.000391 |
| 1572 | 0.000392 |
| 1573 | 0.000391 |
| 1574 | 0.000392 |
| 1575 | 0.000389 |
| 1576 | 0.000388 |
| 1577 | 0.000390 |
| 1578 | 0.000389 |
| 1579 | 0.000386 |
| 1580 | 0.000389 |
| 1581 | 0.000387 |
| 1582 | 0.000387 |
| 1583 | 0.000389 |
| 1584 | 0.000386 |
| 1585 | 0.000386 |
| 1586 | 0.000389 |
| 1587 | 0.000388 |
| 1588 | 0.000385 |
| 1589 | 0.000387 |
| 1590 | 0.000388 |
| 1591 | 0.000389 |
| 1592 | 0.000389 |
| 1593 | 0.000388 |
| 1594 | 0.000388 |
| 1595 | 0.000389 |
| 1596 | 0.000392 |
| 1597 | 0.000393 |
| 1598 | 0.000393 |
| 1599 | 0.000392 |
| 1600 | 0.000395 |
| 1601 | 0.000399 |
| 1602 | 0.000402 |
| 1603 | 0.000408 |
| 1604 | 0.000424 |
| 1605 | 0.000446 |
| 1606 | 0.000474 |
| 1607 | 0.000498 |
| 1608 | 0.000503 |
| 1609 | 0.000494 |
| 1610 | 0.000474 |
| 1611 | 0.000448 |
| 1612 | 0.000432 |
| 1613 | 0.000421 |
| 1614 | 0.000415 |
| 1615 | 0.000408 |
| 1616 | 0.000402 |
| 1617 | 0.000396 |
| 1618 | 0.000396 |
| 1619 | 0.000393 |
| 1620 | 0.000389 |
| 1621 | 0.000385 |
| 1622 | 0.000386 |
| 1623 | 0.000382 |
| 1624 | 0.000383 |
| 1625 | 0.000380 |
| 1626 | 0.000380 |
| 1627 | 0.000378 |
| 1628 | 0.000377 |
| 1629 | 0.000379 |
| 1630 | 0.000378 |
| 1631 | 0.000376 |
| 1632 | 0.000380 |
| 1633 | 0.000380 |
| 1634 | 0.000374 |
| 1635 | 0.000376 |
| 1636 | 0.000375 |
| 1637 | 0.000373 |
| 1638 | 0.000374 |
| 1639 | 0.000374 |
| 1640 | 0.000373 |
| 1641 | 0.000372 |
| 1642 | 0.000373 |
| 1643 | 0.000373 |
| 1644 | 0.000373 |
| 1645 | 0.000374 |
| 1646 | 0.000373 |
| 1647 | 0.000370 |
| 1648 | 0.000371 |

TABLE 3-continued

| Wavelength (nm) | Relative illuminance |
|---|---|
| 1649 | 0.000371 |
| 1650 | 0.000370 |
| 1651 | 0.000370 |
| 1652 | 0.000369 |
| 1653 | 0.000370 |
| 1654 | 0.000369 |
| 1655 | 0.000369 |
| 1656 | 0.000368 |
| 1657 | 0.000369 |
| 1658 | 0.000371 |
| 1659 | 0.000373 |
| 1660 | 0.000374 |
| 1661 | 0.000373 |
| 1662 | 0.000372 |
| 1663 | 0.000374 |
| 1664 | 0.000375 |
| 1665 | 0.000373 |
| 1666 | 0.000371 |
| 1667 | 0.000374 |
| 1668 | 0.000372 |
| 1669 | 0.000375 |
| 1670 | 0.000381 |
| 1671 | 0.000392 |
| 1672 | 0.000411 |
| 1673 | 0.000452 |
| 1674 | 0.000498 |
| 1675 | 0.000532 |
| 1676 | 0.000544 |
| 1677 | 0.000527 |
| 1678 | 0.000490 |
| 1679 | 0.000460 |
| 1680 | 0.000436 |
| 1681 | 0.000415 |
| 1682 | 0.000405 |
| 1683 | 0.000395 |
| 1684 | 0.000388 |
| 1685 | 0.000382 |
| 1686 | 0.000379 |
| 1687 | 0.000373 |
| 1688 | 0.000374 |
| 1689 | 0.000371 |
| 1690 | 0.000367 |
| 1691 | 0.000369 |
| 1692 | 0.000368 |
| 1693 | 0.000364 |
| 1694 | 0.000364 |
| 1695 | 0.000364 |
| 1696 | 0.000365 |
| 1697 | 0.000360 |
| 1698 | 0.000359 |
| 1699 | 0.000359 |
| 1700 | 0.000356 |
| 1701 | 0.000357 |
| 1702 | 0.000356 |
| 1703 | 0.000356 |
| 1704 | 0.000354 |
| 1705 | 0.000352 |
| 1706 | 0.000349 |
| 1707 | 0.000350 |
| 1708 | 0.000351 |
| 1709 | 0.000350 |
| 1710 | 0.000350 |
| 1711 | 0.000352 |
| 1712 | 0.000350 |
| 1713 | 0.000350 |
| 1714 | 0.000348 |
| 1715 | 0.000351 |
| 1716 | 0.000348 |
| 1717 | 0.000350 |
| 1718 | 0.000346 |
| 1719 | 0.000351 |

TABLE 4

| Wavelength (nm) | Relative illuminance |
|---|---|
| 1720 | 0.000350 |
| 1721 | 0.000347 |
| 1722 | 0.000350 |
| 1723 | 0.000349 |
| 1724 | 0.000349 |
| 1725 | 0.000353 |
| 1726 | 0.000353 |
| 1727 | 0.000355 |
| 1728 | 0.000356 |
| 1729 | 0.000359 |
| 1730 | 0.000366 |
| 1731 | 0.000381 |
| 1732 | 0.000394 |
| 1733 | 0.000402 |
| 1734 | 0.000399 |
| 1735 | 0.000388 |
| 1736 | 0.000376 |
| 1737 | 0.000361 |
| 1738 | 0.000358 |
| 1739 | 0.000351 |
| 1740 | 0.000349 |
| 1741 | 0.000346 |
| 1742 | 0.000345 |
| 1743 | 0.000345 |
| 1744 | 0.000341 |
| 1745 | 0.000342 |
| 1746 | 0.000346 |
| 1747 | 0.000347 |
| 1748 | 0.000346 |
| 1749 | 0.000347 |
| 1750 | 0.000346 |
| 1751 | 0.000346 |
| 1752 | 0.000344 |
| 1753 | 0.000345 |
| 1754 | 0.000342 |
| 1755 | 0.000341 |
| 1756 | 0.000340 |
| 1757 | 0.000336 |
| 1758 | 0.000336 |
| 1759 | 0.000336 |
| 1760 | 0.000337 |
| 1761 | 0.000336 |
| 1762 | 0.000333 |
| 1763 | 0.000336 |
| 1764 | 0.000334 |
| 1765 | 0.000334 |
| 1766 | 0.000337 |
| 1767 | 0.000333 |
| 1768 | 0.000337 |
| 1769 | 0.000334 |
| 1770 | 0.000331 |
| 1771 | 0.000332 |
| 1772 | 0.000331 |
| 1773 | 0.000325 |
| 1774 | 0.000329 |
| 1775 | 0.000327 |
| 1776 | 0.000327 |
| 1777 | 0.000328 |
| 1778 | 0.000328 |
| 1779 | 0.000327 |
| 1780 | 0.000326 |
| 1781 | 0.000327 |
| 1782 | 0.000324 |
| 1783 | 0.000328 |
| 1784 | 0.000325 |
| 1785 | 0.000327 |
| 1786 | 0.000323 |
| 1787 | 0.000324 |
| 1788 | 0.000321 |
| 1789 | 0.000321 |
| 1790 | 0.000322 |
| 1791 | 0.000320 |
| 1792 | 0.000320 |
| 1793 | 0.000320 |
| 1794 | 0.000320 |
| 1795 | 0.000320 |
| 1796 | 0.000319 |

TABLE 4-continued

| Wavelength (nm) | Relative illuminance |
|---|---|
| 1797 | 0.000319 |
| 1798 | 0.000319 |
| 1799 | 0.000317 |
| 1800 | 0.000316 |
| 1801 | 0.000311 |
| 1802 | 0.000310 |
| 1803 | 0.000313 |
| 1804 | 0.000311 |
| 1805 | 0.000309 |
| 1806 | 0.000312 |
| 1807 | 0.000309 |
| 1808 | 0.000311 |
| 1809 | 0.000311 |
| 1810 | 0.000309 |
| 1811 | 0.000305 |
| 1812 | 0.000305 |
| 1813 | 0.000303 |
| 1814 | 0.000303 |
| 1815 | 0.000306 |
| 1816 | 0.000306 |
| 1817 | 0.000305 |
| 1818 | 0.000304 |
| 1819 | 0.000301 |
| 1820 | 0.000301 |
| 1821 | 0.000291 |
| 1822 | 0.000289 |
| 1823 | 0.000295 |
| 1824 | 0.000299 |
| 1825 | 0.000300 |
| 1826 | 0.000297 |
| 1827 | 0.000294 |
| 1828 | 0.000294 |
| 1829 | 0.000290 |
| 1830 | 0.000290 |
| 1831 | 0.000286 |
| 1832 | 0.000290 |
| 1833 | 0.000293 |
| 1834 | 0.000294 |
| 1835 | 0.000293 |
| 1836 | 0.000284 |
| 1837 | 0.000280 |
| 1838 | 0.000275 |
| 1839 | 0.000276 |
| 1840 | 0.000278 |
| 1841 | 0.000280 |
| 1842 | 0.000276 |
| 1843 | 0.000279 |
| 1844 | 0.000287 |
| 1845 | 0.000291 |
| 1846 | 0.000288 |
| 1847 | 0.000275 |
| 1848 | 0.000269 |
| 1849 | 0.000272 |
| 1850 | 0.000282 |
| 1851 | 0.000293 |
| 1852 | 0.000292 |
| 1853 | 0.000293 |
| 1854 | 0.000284 |
| 1855 | 0.000279 |
| 1856 | 0.000280 |
| 1857 | 0.000285 |
| 1858 | 0.000282 |
| 1859 | 0.000279 |
| 1860 | 0.000277 |
| 1861 | 0.000278 |
| 1862 | 0.000285 |
| 1863 | 0.000286 |
| 1864 | 0.000289 |
| 1865 | 0.000290 |
| 1866 | 0.000286 |
| 1867 | 0.000279 |
| 1868 | 0.000277 |
| 1869 | 0.000268 |
| 1870 | 0.000264 |
| 1871 | 0.000259 |
| 1872 | 0.000256 |
| 1873 | 0.000256 |
| 1874 | 0.000257 |
| 1875 | 0.000265 |
| 1876 | 0.000267 |
| 1877 | 0.000274 |
| 1878 | 0.000284 |
| 1879 | 0.000291 |
| 1880 | 0.000303 |
| 1881 | 0.000313 |
| 1882 | 0.000317 |
| 1883 | 0.000313 |
| 1884 | 0.000306 |
| 1885 | 0.000302 |
| 1886 | 0.000298 |
| 1887 | 0.000298 |
| 1888 | 0.000294 |
| 1889 | 0.000293 |
| 1890 | 0.000286 |
| 1891 | 0.000285 |
| 1892 | 0.000277 |
| 1893 | 0.000283 |
| 1894 | 0.000285 |
| 1895 | 0.000288 |
| 1896 | 0.000290 |
| 1897 | 0.000287 |
| 1898 | 0.000275 |
| 1899 | 0.000267 |
| 1900 | 0.000264 |
| 1901 | 0.000266 |
| 1902 | 0.000266 |
| 1903 | 0.000271 |
| 1904 | 0.000271 |
| 1905 | 0.000265 |
| 1906 | 0.000260 |
| 1907 | 0.000261 |
| 1908 | 0.000264 |
| 1909 | 0.000272 |
| 1910 | 0.000276 |
| 1911 | 0.000276 |
| 1912 | 0.000269 |
| 1913 | 0.000263 |
| 1914 | 0.000262 |
| 1915 | 0.000263 |
| 1916 | 0.000266 |
| 1917 | 0.000270 |
| 1918 | 0.000274 |
| 1919 | 0.000272 |
| 1920 | 0.000267 |
| 1921 | 0.000263 |
| 1922 | 0.000264 |
| 1923 | 0.000269 |
| 1924 | 0.000277 |
| 1925 | 0.000282 |
| 1926 | 0.000275 |
| 1927 | 0.000276 |
| 1928 | 0.000273 |
| 1929 | 0.000271 |
| 1930 | 0.000276 |
| 1931 | 0.000275 |
| 1932 | 0.000276 |
| 1933 | 0.000276 |
| 1934 | 0.000276 |
| 1935 | 0.000275 |
| 1936 | 0.000276 |
| 1937 | 0.000274 |
| 1938 | 0.000270 |
| 1939 | 0.000271 |
| 1940 | 0.000270 |
| 1941 | 0.000270 |
| 1942 | 0.000274 |
| 1943 | 0.000273 |
| 1944 | 0.000274 |
| 1945 | 0.000271 |
| 1946 | 0.000277 |
| 1947 | 0.000273 |
| 1948 | 0.000276 |
| 1949 | 0.000275 |
| 1950 | 0.000275 |

TABLE 4-continued

| Wavelength (nm) | Relative illuminance |
|---|---|
| 1951 | 0.000277 |
| 1952 | 0.000275 |
| 1953 | 0.000272 |
| 1954 | 0.000272 |
| 1955 | 0.000271 |
| 1956 | 0.000270 |
| 1957 | 0.000271 |
| 1958 | 0.000273 |
| 1959 | 0.000275 |
| 1960 | 0.000274 |
| 1961 | 0.000272 |
| 1962 | 0.000271 |
| 1963 | 0.000269 |
| 1964 | 0.000271 |
| 1965 | 0.000271 |
| 1966 | 0.000273 |
| 1967 | 0.000271 |
| 1968 | 0.000270 |
| 1969 | 0.000268 |
| 1970 | 0.000269 |
| 1971 | 0.000265 |
| 1972 | 0.000268 |
| 1973 | 0.000265 |
| 1974 | 0.000266 |
| 1975 | 0.000267 |
| 1976 | 0.000265 |
| 1977 | 0.000264 |
| 1978 | 0.000265 |
| 1979 | 0.000263 |
| 1980 | 0.000262 |
| 1981 | 0.000261 |
| 1982 | 0.000261 |
| 1983 | 0.000262 |
| 1984 | 0.000261 |
| 1985 | 0.000262 |
| 1986 | 0.000259 |
| 1987 | 0.000260 |
| 1988 | 0.000257 |
| 1989 | 0.000259 |
| 1990 | 0.000257 |
| 1991 | 0.000257 |
| 1992 | 0.000256 |
| 1993 | 0.000258 |
| 1994 | 0.000260 |
| 1995 | 0.000257 |
| 1996 | 0.000256 |
| 1997 | 0.000256 |
| 1998 | 0.000257 |
| 1999 | 0.000256 |
| 2000 | 0.000258 |
| 2001 | 0.000259 |
| 2002 | 0.000255 |
| 2003 | 0.000257 |
| 2004 | 0.000255 |
| 2005 | 0.000255 |
| 2006 | 0.000252 |
| 2007 | 0.000254 |
| 2008 | 0.000255 |
| 2009 | 0.000252 |
| 2010 | 0.000254 |
| 2011 | 0.000252 |
| 2012 | 0.000253 |
| 2013 | 0.000255 |
| 2014 | 0.000255 |
| 2015 | 0.000253 |
| 2016 | 0.000255 |
| 2017 | 0.000258 |
| 2018 | 0.000257 |
| 2019 | 0.000260 |
| 2020 | 0.000264 |
| 2021 | 0.000270 |
| 2022 | 0.000274 |
| 2023 | 0.000284 |
| 2024 | 0.000290 |
| 2025 | 0.000305 |
| 2026 | 0.000321 |
| 2027 | 0.000326 |
| 2028 | 0.000323 |
| 2029 | 0.000308 |
| 2030 | 0.000294 |
| 2031 | 0.000278 |
| 2032 | 0.000263 |
| 2033 | 0.000261 |
| 2034 | 0.000257 |
| 2035 | 0.000253 |
| 2036 | 0.000248 |
| 2037 | 0.000247 |
| 2038 | 0.000248 |
| 2039 | 0.000246 |
| 2040 | 0.000241 |
| 2041 | 0.000245 |
| 2042 | 0.000245 |
| 2043 | 0.000243 |
| 2044 | 0.000241 |
| 2045 | 0.000243 |
| 2046 | 0.000244 |
| 2047 | 0.000241 |
| 2048 | 0.000238 |
| 2049 | 0.000239 |
| 2050 | 0.000240 |
| 2051 | 0.000239 |
| 2052 | 0.000238 |
| 2053 | 0.000234 |
| 2054 | 0.000236 |
| 2055 | 0.000237 |
| 2056 | 0.000236 |
| 2057 | 0.000235 |
| 2058 | 0.000234 |
| 2059 | 0.000238 |
| 2060 | 0.000232 |
| 2061 | 0.000234 |
| 2062 | 0.000233 |
| 2063 | 0.000234 |
| 2064 | 0.000230 |
| 2065 | 0.000229 |
| 2066 | 0.000230 |
| 2067 | 0.000227 |
| 2068 | 0.000228 |
| 2069 | 0.000228 |
| 2070 | 0.000228 |
| 2071 | 0.000225 |
| 2072 | 0.000227 |
| 2073 | 0.000229 |
| 2074 | 0.000224 |
| 2075 | 0.000223 |
| 2076 | 0.000228 |
| 2077 | 0.000228 |
| 2078 | 0.000225 |
| 2079 | 0.000226 |
| 2080 | 0.000227 |
| 2081 | 0.000225 |
| 2082 | 0.000225 |
| 2083 | 0.000225 |
| 2084 | 0.000223 |
| 2085 | 0.000224 |
| 2086 | 0.000225 |
| 2087 | 0.000224 |
| 2088 | 0.000225 |
| 2089 | 0.000225 |
| 2090 | 0.000223 |
| 2091 | 0.000222 |
| 2092 | 0.000221 |
| 2093 | 0.000221 |
| 2094 | 0.000219 |
| 2095 | 0.000219 |
| 2096 | 0.000219 |
| 2097 | 0.000219 |
| 2098 | 0.000216 |
| 2099 | 0.000218 |
| 2100 | 0.000218 |
| 2101 | 0.000216 |
| 2102 | 0.000218 |
| 2103 | 0.000215 |
| 2104 | 0.000216 |

TABLE 4-continued

| Wavelength (nm) | Relative illuminance |
| --- | --- |
| 2105 | 0.000214 |
| 2106 | 0.000213 |
| 2107 | 0.000213 |
| 2108 | 0.000212 |
| 2109 | 0.000212 |
| 2110 | 0.000212 |
| 2111 | 0.000210 |
| 2112 | 0.000211 |
| 2113 | 0.000208 |
| 2114 | 0.000210 |
| 2115 | 0.000209 |
| 2116 | 0.000210 |
| 2117 | 0.000209 |
| 2118 | 0.000208 |
| 2119 | 0.000206 |
| 2120 | 0.000208 |
| 2121 | 0.000206 |
| 2122 | 0.000206 |
| 2123 | 0.000204 |
| 2124 | 0.000205 |
| 2125 | 0.000203 |
| 2126 | 0.000204 |
| 2127 | 0.000203 |
| 2128 | 0.000205 |
| 2129 | 0.000201 |
| 2130 | 0.000206 |
| 2131 | 0.000202 |
| 2132 | 0.000202 |
| 2133 | 0.000199 |
| 2134 | 0.000197 |
| 2135 | 0.000201 |
| 2136 | 0.000197 |
| 2137 | 0.000199 |
| 2138 | 0.000199 |
| 2139 | 0.000199 |
| 2140 | 0.000201 |
| 2141 | 0.000198 |
| 2142 | 0.000197 |
| 2143 | 0.000194 |
| 2144 | 0.000199 |
| 2145 | 0.000198 |
| 2146 | 0.000199 |
| 2147 | 0.000201 |
| 2148 | 0.000200 |
| 2149 | 0.000200 |
| 2150 | 0.000200 |
| 2151 | 0.000194 |
| 2152 | 0.000196 |
| 2153 | 0.000195 |
| 2154 | 0.000193 |
| 2155 | 0.000193 |
| 2156 | 0.000190 |
| 2157 | 0.000190 |
| 2158 | 0.000192 |
| 2159 | 0.000191 |
| 2160 | 0.000192 |
| 2161 | 0.000189 |
| 2162 | 0.000190 |
| 2163 | 0.000189 |
| 2164 | 0.000187 |
| 2165 | 0.000188 |
| 2166 | 0.000188 |
| 2167 | 0.000186 |
| 2168 | 0.000187 |
| 2169 | 0.000189 |
| 2170 | 0.000187 |
| 2171 | 0.000188 |
| 2172 | 0.000185 |
| 2173 | 0.000183 |
| 2174 | 0.000182 |
| 2175 | 0.000181 |
| 2176 | 0.000182 |
| 2177 | 0.000180 |
| 2178 | 0.000181 |
| 2179 | 0.000180 |
| 2180 | 0.000184 |
| 2181 | 0.000180 |
| 2182 | 0.000181 |
| 2183 | 0.000180 |
| 2184 | 0.000182 |
| 2185 | 0.000180 |
| 2186 | 0.000181 |
| 2187 | 0.000179 |
| 2188 | 0.000189 |
| 2189 | 0.000177 |
| 2190 | 0.000178 |
| 2191 | 0.000176 |
| 2192 | 0.000177 |
| 2193 | 0.000178 |
| 2194 | 0.000178 |
| 2195 | 0.000176 |
| 2196 | 0.000174 |
| 2197 | 0.000175 |
| 2198 | 0.000177 |
| 2199 | 0.000177 |

TABLE 5

| Wavelength (nm) | Relative illuminance |
| --- | --- |
| 2200 | 0.000173 |
| 2201 | 0.000171 |
| 2202 | 0.000171 |
| 2203 | 0.000171 |
| 2204 | 0.000171 |
| 2205 | 0.000172 |
| 2206 | 0.000169 |
| 2207 | 0.000167 |
| 2208 | 0.000170 |
| 2209 | 0.000169 |
| 2210 | 0.000167 |
| 2211 | 0.000168 |
| 2212 | 0.000164 |
| 2213 | 0.000168 |
| 2214 | 0.000164 |
| 2215 | 0.000167 |
| 2216 | 0.000166 |
| 2217 | 0.000165 |
| 2218 | 0.000167 |
| 2219 | 0.000165 |
| 2220 | 0.000165 |
| 2221 | 0.000166 |
| 2222 | 0.000168 |
| 2223 | 0.000169 |
| 2224 | 0.000170 |
| 2225 | 0.000171 |
| 2226 | 0.000169 |
| 2227 | 0.000164 |
| 2228 | 0.000167 |
| 2229 | 0.000169 |
| 2230 | 0.000170 |
| 2231 | 0.000167 |
| 2232 | 0.000166 |
| 2233 | 0.000168 |
| 2234 | 0.000172 |
| 2235 | 0.000169 |
| 2236 | 0.000171 |
| 2237 | 0.000171 |
| 2238 | 0.000171 |
| 2239 | 0.000172 |
| 2240 | 0.000171 |
| 2241 | 0.000170 |
| 2242 | 0.000172 |
| 2243 | 0.000172 |
| 2244 | 0.000167 |
| 2245 | 0.000169 |
| 2246 | 0.000167 |
| 2247 | 0.000167 |
| 2248 | 0.000165 |
| 2249 | 0.000166 |

TABLE 5-continued

| Wavelength (nm) | Relative illuminance |
|---|---|
| 2250 | 0.000165 |
| 2251 | 0.000168 |
| 2252 | 0.000168 |
| 2253 | 0.000167 |
| 2254 | 0.000168 |
| 2255 | 0.000167 |
| 2256 | 0.000168 |
| 2257 | 0.000166 |
| 2258 | 0.000166 |
| 2259 | 0.000167 |
| 2260 | 0.000165 |
| 2261 | 0.000166 |
| 2262 | 0.000166 |
| 2263 | 0.000164 |
| 2264 | 0.000165 |
| 2265 | 0.000166 |
| 2266 | 0.000166 |
| 2267 | 0.000167 |
| 2268 | 0.000165 |
| 2269 | 0.000165 |
| 2270 | 0.000165 |
| 2271 | 0.000167 |
| 2272 | 0.000166 |
| 2273 | 0.000165 |
| 2274 | 0.000167 |
| 2275 | 0.000162 |
| 2276 | 0.000166 |
| 2277 | 0.000163 |
| 2278 | 0.000164 |
| 2280 | 0.000165 |
| 2281 | 0.000162 |
| 2282 | 0.000164 |
| 2283 | 0.000166 |
| 2284 | 0.000162 |
| 2285 | 0.000163 |
| 2286 | 0.000165 |
| 2287 | 0.000159 |
| 2288 | 0.000164 |
| 2289 | 0.000165 |
| 2290 | 0.000160 |
| 2291 | 0.000164 |
| 2292 | 0.000161 |
| 2293 | 0.000161 |
| 2294 | 0.000162 |
| 2295 | 0.000163 |
| 2296 | 0.000159 |
| 2297 | 0.000160 |
| 2298 | 0.000165 |
| 2299 | 0.000162 |
| 2300 | 0.000162 |
| 2301 | 0.000163 |
| 2302 | 0.000163 |
| 2303 | 0.000164 |
| 2304 | 0.000161 |
| 2305 | 0.000165 |
| 2306 | 0.000164 |
| 2307 | 0.000166 |
| 2308 | 0.000164 |
| 2309 | 0.000163 |
| 2310 | 0.000166 |
| 2311 | 0.000164 |
| 2312 | 0.000167 |
| 2313 | 0.000165 |
| 2314 | 0.000166 |
| 2315 | 0.000167 |
| 2316 | 0.000166 |
| 2317 | 0.000164 |
| 2318 | 0.000173 |
| 2319 | 0.000181 |
| 2320 | 0.000182 |
| 2321 | 0.000181 |
| 2322 | 0.000174 |
| 2323 | 0.000170 |
| 2324 | 0.000165 |
| 2325 | 0.000164 |
| 2326 | 0.000161 |
| 2327 | 0.000160 |
| 2328 | 0.000163 |
| 2329 | 0.000159 |
| 2330 | 0.000159 |
| 2331 | 0.000162 |
| 2332 | 0.000159 |
| 2333 | 0.000157 |
| 2334 | 0.000155 |
| 2335 | 0.000157 |
| 2336 | 0.000157 |
| 2337 | 0.000157 |
| 2338 | 0.000155 |
| 2339 | 0.000160 |
| 2340 | 0.000159 |
| 2341 | 0.000156 |
| 2342 | 0.000154 |
| 2343 | 0.000155 |
| 2344 | 0.000155 |
| 2345 | 0.000154 |
| 2346 | 0.000156 |
| 2347 | 0.000156 |
| 2348 | 0.000153 |
| 2349 | 0.000149 |
| 2350 | 0.000149 |
| 2351 | 0.000150 |
| 2352 | 0.000150 |
| 2353 | 0.000149 |
| 2354 | 0.000150 |
| 2355 | 0.000152 |
| 2356 | 0.000150 |
| 2357 | 0.000150 |
| 2358 | 0.000153 |
| 2359 | 0.000148 |
| 2360 | 0.000154 |
| 2361 | 0.000151 |
| 2362 | 0.000151 |
| 2363 | 0.000152 |
| 2364 | 0.000149 |
| 2365 | 0.000146 |
| 2366 | 0.000148 |
| 2367 | 0.000147 |
| 2368 | 0.000146 |
| 2369 | 0.000149 |
| 2370 | 0.000148 |
| 2371 | 0.000146 |
| 2372 | 0.000146 |
| 2373 | 0.000149 |
| 2374 | 0.000144 |
| 2375 | 0.000146 |
| 2376 | 0.000149 |
| 2377 | 0.000144 |
| 2378 | 0.000146 |
| 2379 | 0.000142 |
| 2380 | 0.000144 |
| 2381 | 0.000141 |
| 2382 | 0.000143 |
| 2383 | 0.000140 |
| 2384 | 0.000144 |
| 2385 | 0.000142 |
| 2386 | 0.000137 |
| 2387 | 0.000138 |
| 2388 | 0.000139 |
| 2389 | 0.000142 |
| 2390 | 0.000140 |
| 2391 | 0.000139 |
| 2392 | 0.000140 |
| 2393 | 0.000144 |
| 2394 | 0.000136 |
| 2395 | 0.000138 |
| 2396 | 0.000138 |
| 2397 | 0.000140 |
| 2398 | 0.000134 |
| 2399 | 0.000140 |
| 2400 | 0.000140 |
| 2401 | 0.000141 |
| 2402 | 0.000142 |
| 2403 | 0.000140 |
| 2404 | 0.000135 |

TABLE 5-continued

| Wavelength (nm) | Relative illuminance |
|---|---|
| 2405 | 0.000138 |
| 2406 | 0.000140 |
| 2407 | 0.000136 |
| 2408 | 0.000133 |
| 2409 | 0.000138 |
| 2410 | 0.000138 |
| 2411 | 0.000138 |
| 2412 | 0.000132 |
| 2413 | 0.000137 |
| 2414 | 0.000136 |
| 2415 | 0.000133 |
| 2416 | 0.000137 |
| 2417 | 0.000135 |
| 2418 | 0.000135 |
| 2419 | 0.000135 |
| 2420 | 0.000136 |
| 2421 | 0.000129 |
| 2422 | 0.000136 |
| 2423 | 0.000139 |
| 2424 | 0.000132 |
| 2425 | 0.000134 |
| 2426 | 0.000135 |
| 2427 | 0.000133 |
| 2428 | 0.000137 |
| 2429 | 0.000130 |
| 2430 | 0.000137 |
| 2431 | 0.000136 |
| 2432 | 0.000138 |
| 2433 | 0.000134 |
| 2434 | 0.000139 |
| 2435 | 0.000144 |
| 2436 | 0.000136 |
| 2437 | 0.000140 |
| 2438 | 0.000135 |
| 2439 | 0.000139 |
| 2440 | 0.000140 |
| 2441 | 0.000141 |
| 2442 | 0.000142 |
| 2443 | 0.000136 |
| 2444 | 0.000144 |
| 2445 | 0.000138 |
| 2446 | 0.000145 |
| 2447 | 0.000134 |
| 2448 | 0.000136 |
| 2449 | 0.000133 |
| 2450 | 0.000133 |
| 2451 | 0.000132 |
| 2452 | 0.000132 |
| 2453 | 0.000136 |
| 2454 | 0.000126 |
| 2455 | 0.000138 |
| 2456 | 0.000137 |
| 2457 | 0.000132 |
| 2458 | 0.000136 |
| 2459 | 0.000130 |
| 2460 | 0.000127 |
| 2461 | 0.000136 |
| 2462 | 0.000129 |
| 2463 | 0.000131 |
| 2464 | 0.000130 |
| 2465 | 0.000133 |
| 2466 | 0.000140 |
| 2467 | 0.000136 |
| 2468 | 0.000135 |
| 2469 | 0.000139 |
| 2470 | 0.000137 |
| 2471 | 0.000137 |
| 2472 | 0.000134 |
| 2473 | 0.000137 |
| 2474 | 0.000138 |
| 2475 | 0.000138 |
| 2476 | 0.000138 |
| 2477 | 0.000133 |
| 2478 | 0.000137 |
| 2479 | 0.000140 |
| 2480 | 0.000146 |
| 2481 | 0.000152 |
| 2482 | 0.000163 |
| 2483 | 0.000169 |
| 2484 | 0.000170 |
| 2485 | 0.000161 |
| 2486 | 0.000145 |
| 2487 | 0.000143 |
| 2488 | 0.000134 |
| 2489 | 0.000136 |
| 2490 | 0.000127 |
| 2491 | 0.000129 |
| 2492 | 0.000127 |
| 2493 | 0.000130 |
| 2494 | 0.000125 |
| 2495 | 0.000121 |
| 2496 | 0.000124 |
| 2497 | 0.000126 |
| 2498 | 0.000122 |
| 2499 | 0.000129 |
| 2500 | 0.000126 |

TABLE 6

| Wavelength (nm) | Weighting factor A | Spectral absorption rate B of skin |
|---|---|---|
| 2500 | 0.003545 | 0.964 |
| 2450 | 0.006828 | 0.963 |
| 2400 | 0.006975 | 0.961 |
| 2350 | 0.007698 | 0.957 |
| 2300 | 0.008306 | 0.954 |
| 2250 | 0.008425 | 0.950 |
| 2200 | 0.008722 | 0.950 |
| 2150 | 0.009795 | 0.952 |
| 2100 | 0.010899 | 0.953 |
| 2050 | 0.012427 | 0.957 |
| 2000 | 0.013079 | 0.961 |
| 1950 | 0.013703 | 0.962 |
| 1900 | 0.014023 | 0.960 |
| 1850 | 0.014142 | 0.923 |
| 1800 | 0.015791 | 0.912 |
| 1750 | 0.017508 | 0.905 |
| 1700 | 0.018555 | 0.890 |
| 1650 | 0.019128 | 0.874 |
| 1600 | 0.020386 | 0.890 |
| 1550 | 0.022044 | 0.915 |
| 1500 | 0.023707 | 0.938 |
| 1450 | 0.022665 | 0.947 |
| 1400 | 0.020287 | 0.925 |
| 1350 | 0.022400 | 0.790 |
| 1300 | 0.021577 | 0.672 |
| 1250 | 0.027915 | 0.648 |
| 1200 | 0.033182 | 0.699 |
| 1150 | 0.028451 | 0.636 |
| 1100 | 0.032646 | 0.472 |
| 1050 | 0.021468 | 0.480 |
| 1000 | 0.041766 | 0.533 |
| 950 | 0.024117 | 0.527 |
| 900 | 0.041840 | 0.478 |
| 850 | 0.019512 | 0.446 |
| 800 | 0.016769 | 0.440 |
| 780 | 0.005307 | 0.371 |
| 770 | 0.004644 | 0.380 |
| 760 | 0.006414 | 0.361 |
| 750 | 0.005494 | 0.362 |
| 740 | 0.005494 | 0.378 |
| 730 | 0.006818 | 0.375 |
| 720 | 0.007580 | 0.378 |
| 710 | 0.008506 | 0.407 |
| 700 | 0.007565 | 0.421 |
| 690 | 0.010022 | 0.422 |
| 680 | 0.008807 | 0.426 |
| 670 | 0.008340 | 0.454 |
| 660 | 0.007844 | 0.466 |

TABLE 6-continued

| Wavelength (nm) | Weighting factor A | Spectral absorption rate B of skin |
|---|---|---|
| 650 | 0.008447 | 0.479 |
| 640 | 0.008216 | 0.489 |
| 630 | 0.008897 | 0.497 |
| 620 | 0.009250 | 0.516 |
| 610 | 0.008347 | 0.538 |
| 600 | 0.008434 | 0.600 |
| 590 | 0.009108 | 0.655 |
| 580 | 0.008759 | 0.673 |
| 570 | 0.008498 | 0.687 |
| 560 | 0.008591 | 0.690 |
| 550 | 0.008795 | 0.701 |
| 540 | 0.008759 | 0.696 |
| 530 | 0.008632 | 0.682 |
| 520 | 0.008723 | 0.674 |
| 510 | 0.008578 | 0.673 |
| 500 | 0.008511 | 0.681 |
| 490 | 0.009397 | 0.694 |
| 480 | 0.009850 | 0.697 |
| 470 | 0.011847 | 0.720 |
| 460 | 0.009951 | 0.738 |
| 450 | 0.008531 | 0.775 |
| 440 | 0.007768 | 0.810 |
| 430 | 0.007605 | 0.835 |
| 420 | 0.007753 | 0.840 |
| 410 | 0.007379 | 0.838 |
| 400 | 0.007135 | 0.622 |
| 390 | 0.006692 | 0.498 |
| 380 | 0.005120 | 0.610 |
| 375 | 0.002421 | 0.615 |
| 370 | 0.002304 | 0.644 |
| 365 | 0.002140 | 0.694 |
| 360 | 0.001995 | 0.701 |
| 355 | 0.001878 | 0.705 |
| 350 | 0.001771 | 0.753 |
| 345 | 0.001665 | 0.783 |
| 340 | 0.001572 | 0.801 |
| 335 | 0.001379 | 0.835 |
| 330 | 0.000979 | 0.833 |
| 325 | 0.000533 | 0.843 |
| 320 | 0.000264 | 0.844 |
| 315 | 0.000147 | 0.847 |
| 310 | 0.000103 | 0.859 |
| 305 | 0.000094 | 0.862 |
| 300 | 0.000068 | 0.861 |

(Measurement of Visible Light Transmittances (X2) and (Y2))

Visible light transmittances (X2) and (Y2) were obtained by measuring the visible light optical transmittance (Tv) of the obtained laminated glass or glass structure other than the laminated glass at a wavelength of 380 to 780 nm using a spectral photometer ("U-4100" manufactured by Hitachi High-Technologies Corporation) based on JIS R3106:1998.

The laminated glass or the glass structure other than the laminated glass was placed at a position separated by 13 cm from an integrating sphere in parallel with a normal line of an optic axis on an optical path between a light source and the integrating sphere so that the integrating sphere received only parallel light transmitting through the laminated glass or the glass structure other than the laminated glass during measurement, to measure a spectral transmittance. A visible light transmittance was calculated from the obtained spectral transmittance. Measuring conditions were as follows: scanning speed: 300 nm/min; and slit width: 8 nm. Measurement was performed based on JIS R 3106:1998 for the other conditions.

(T1500)

"T1500" which was the transmittance of the obtained laminated glass or glass structure other than the laminated glass at a wavelength of 1500 nm was measured using a spectral photometer ("U-4100" manufactured by Hitachi High-Technologies Corporation). The laminated glass or the glass structure other than the laminated glass was placed at a position separated by 13 cm from an integrating sphere in parallel with a normal line of an optic axis on an optical path between a light source and the integrating sphere so that the integrating sphere received only parallel light transmitting through the laminated glass or the glass structure other than the laminated glass during measurement, to measure a transmittance at 1500 nm. A visible light transmittance was calculated from the obtained spectral transmittance. Measuring conditions were as follows: scanning speed: 300 nm/min; and slit width: 8 nm. Measurement was performed based on JIS R 3106:1998 for the other conditions.

(Time Until Pains are Felt)

From an artificial sunlight source ("XC-500E" manufactured by SERIC LTD.), a wall surface located at a position 65 cm ahead was irradiated with irradiation light so that irradiation intensity was set to 1000 W/m$^2$. The irradiation was performed in a darkroom so that the influence of outside light was eliminated. The irradiation intensity was measured with a pyranometer "Pyranometer MS-602" manufactured by EKO Instruments. The wall surface had a white color in order to suppress the temperature rise of the wall surface. The laminated glass or the glass structure other than the laminated glass was placed on the optic axis of an irradiation light source separated by 30 cm from an irradiation surface.

A test subject was caused to put a test subject's hand on an irradiation wall surface in a resting state after the surface temperature of the back of the hand was stabilized at 33 to 35° C. under an environment of room temperature of 23° C. and humidity of 50 RH %. A time until the test subject began to feel burning pains (burning sensation) after the test subject put the hand was measured. The laminated glass or the glass structure other than the laminated glass was disposed so that the back of the hand was irradiated with irradiation light via a region for evaluating the performance.

Similarly, five evaluators measured times until the evaluators began to feel pains, and the average time thereof was taken as "time until pains are felt".

(Thickness of Each of Layers)

The interlayer film for laminated glass was cut in parallel with a thickness direction using a single-edged razor, and the section thereof was observed using a microscope ("DSX-100" manufactured by Olympus Corporation). The thickness of each of the layers was measured using measurement software in accompanying software.

Components used in Examples and Comparative Examples are as follows.

(1) Resin

PVB: Polyvinyl butyral resin, acetalization degree: 69 mol %, amount of hydroxyl groups: 30 mol %, acetylation degree: 1 mol %, polymerization degree: 1700

(2) Plasticizer

3GO: Triethylene glycol di-2-ethylhexanoate (3) Heat Shielding Agent

Heat shielding agent 1: Tin-doped indium oxide particles (ITO particles), average particle diameter: 35 nm Heat shielding agent 2: Cesium-doped tungsten oxide particles (CWO particles), average particle diameter: 50 nm Heat shielding agent 3: Vanadium phthalocyanine compound, "NIR-43V", manufactured by Yamada Chemical Co.

(4) Colorant

Colorant 1: Black coloring matter, Carbon black pigment, Pigment black 7 (CAS No. 1333-86-4)

Colorant 2: Blue coloring matter, Copper phthalocyanine pigment, Pigment blue 15 (CAS No. 12239-87-1)

Colorant 3: Purple coloring matter, Anthraquinone-based dispersive dye, Disperse violet 28 (CAS No. 81-42-5)

Colorant 4: Yellow coloring matter: Anthraquinone-based dye, Solvent yellow 163 (CAS No. 106768-99-4)

Example 1

(Preparation of Interlayer Film for Laminated Glass)

First, additives other than a dispersant were added to 40 parts by mass of a plasticizer. That is, 0.633 parts by mass of a heat shielding agent 1 (0.45% by mass based on the total amount of an interlayer film for laminated glass), 0.028 parts by mass of a heat shielding agent 2 (0.02% by mass based on the total amount of the interlayer film for laminated glass), and 0.042 parts by mass of a heat shielding agent 3 (0.03% by mass based on the total amount of the interlayer film for laminated glass) were mixed with 40 parts by mass of the plasticizer. To the mixture, 0.06 parts by mass of a phosphoric acid ester compound (0.03% by mass based on the total amount of the interlayer film for laminated glass) as a dispersant was further added, followed by mixing, to obtain a mixed solution.

Next, the total amount of the obtained mixed solution was added to 100 parts by mass of a polyvinyl butyral resin (PVB), followed by sufficiently melt-kneading with a mixing roll, to obtain a resin composition. The obtained resin composition was extruded using an extruder to obtain an interlayer film for laminated glass having a thickness of 800 μm.

(Preparation of Laminated Glass)

The interlayer film for laminated glass obtained above was held under constant temperature and humidity conditions of 23° C. and 28% RH for 4 hours, and then sandwiched between two clear glasses (30 mm long×30 mm wide×2.5 mm thick, solar transmittance: 87.3%, based on JIS R 3106) to obtain a laminated body. The obtained laminated body was subjected to preliminary pressure bonding using a heating roller at 230° C. The laminated body subjected to preliminary pressure bonding was subjected to pressure bonding using an autoclave under conditions of 135° C. and pressure of 1.2 MPa for 20 minutes, to prepare laminated glass.

A visible light transmittance (Tv), T1500, and a skin absorption energy rate were measured for the obtained laminated glass. The measurement results are shown in Table 7. The obtained skin absorption energy rate is a value obtained using standard glass, is a skin absorption energy rate (X1) of the interlayer film for laminated glass, and is also a skin absorption energy rate (Y1) of the laminated glass. The same applies to the visible light transmittance (Tv) and the T1500. The same applies to the following Examples and Comparative Examples. Furthermore, the thicknesses of a thinnest part of a first layer and a thickest part of a second layer are measured, and the total thickness thereof is shown in Table 1.

Example 2

To 100 parts by mass of a PVB, 40 parts by mass of a plasticizer was added, followed by sufficiently melt-kneading with a mixing roll, to obtain a first resin composition.

With 40 parts by mass of a plasticizer, 0.273 parts by mass of a colorant 1 (0.195% by mass based on the total amount of a second layer), 0.124 parts by mass of a colorant 3 (0.088% by mass based on the total amount of the second layer), and 0.034 parts by mass of a colorant 4 (0.024% by mass based on the total amount of the second layer) were mixed to obtain a mixed solution. Next, the total amount of the obtained mixed solution was added to 100 parts by mass of a polyvinyl butyral resin (PVB), followed by sufficiently melt-kneading with a mixing roll, to obtain a second resin composition.

(Preparation of Interlayer Film for Laminated Glass)

Figure 4:
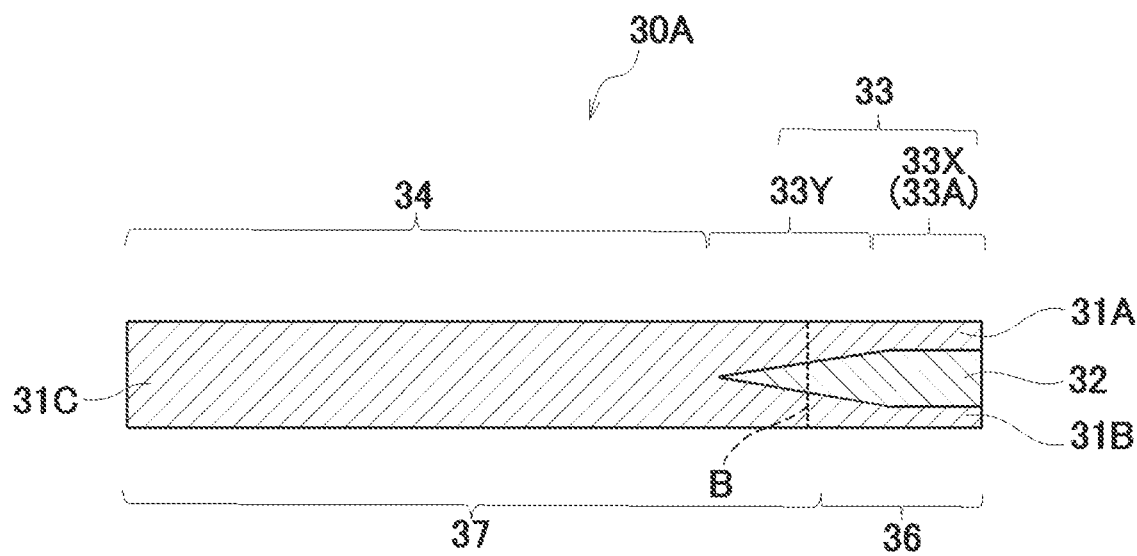
FIG. 4 is a sectional view of an interlayer film for laminated glass according to a fourth embodiment.

The first resin composition was supplied to a first extruder. The second resin composition was supplied to a second extruder. A multi-layer feed block was attached to the front end of each of the first and second extruders to perform coextrusion while adjusting the amounts of the resin compositions to be extruded, and therefore as shown in FIG. 4, an interlayer film for laminated glass was obtained, which included a second layer 32 embedded between two first layers 31A and 31B in a second region 33, and was composed of a first layer 31C in a first region 34.

In the obtained interlayer film for laminated glass, a visible light transmittance (Tv), Ts1500, and a skin absorption energy rate were measured in each of a region 33X which constituted a thickest part 33A and was a light-blocking region, and a region 34 which was a light-permeable region.

Example 3

First, an additive other than a dispersant (phosphoric acid ester compound), that is, 0.21 parts by mass of a heat shielding agent 1 (0.15% by mass based on the total amount of a first layer) was mixed with 40 parts by mass of a plasticizer. To the mixture, 0.021 parts by mass of a phosphoric acid ester compound as a dispersant was further added, followed by mixing, to obtain a mixed solution.

Next, the total amount of the obtained mixed solution was added to 100 parts by mass of a polyvinyl butyral resin (PVB), followed by sufficiently melt-kneading with a mixing roll, to obtain a first resin composition for forming a first layer.

Next, a second resin composition for forming a second layer was obtained by the same method as that of the first resin composition so that the formulation was set as shown in Table 7.

Then, an interlayer film for laminated glass and laminated glass were prepared using the first and second resin compositions in the same manner as in Example 2, and evaluated.

Examples 4 to 6 and 10

First and second resin compositions were prepared by the same method as that of Example 3 so that the formulations of first and second layers were set as shown in Tables 7 and 8. Then, an interlayer film for laminated glass and laminated glass were prepared using the first and second resin compositions in the same manner as in Example 3, and evaluated.

However, in Example 10, the amounts of resins to be coextruded so that the thickness of a thickest part of the second layer and the thickness of a thinnest part of the first layer in total was set as shown in Table 8 were adjusted.

Examples 7 to 9

In Example 7, the formulations of first and second layers were changed as shown in Table 7, and first and second resin compositions were prepared by the same method as that of Example 3.

In Example 8, a first resin composition was prepared by the same method as that of Example 2 so that the formulation of a first layer was set as shown in Table 8. The formulation of a second layer was changed as shown in Table 8, and a second resin composition was prepared by the same method as that of Example 3.

In Example 9, the formulation of a first layer was changed as shown in Table 8, and a first resin composition was prepared by the same method as that of Example 3. The formulation of a second layer was changed as shown in Table 8, and a second resin composition was prepared by the same method as that of Example 2.

Then, the first resin composition was supplied to a first extruder. The second resin composition was supplied to a second extruder. A multi-layer feed block was attached to the front end of each of the first and second extruders to perform coextrusion, thereby obtaining an interlayer film for laminated glass 20 in which a second layer 22 was disposed between two first layers 21A and 21B, as shown in FIG. 2. The two first layers 21A and 21B had the same thickness, and had the same thickness at any position. The second layer 22 also had the same thickness at any position, and the whole region of the second layer 22 served as a light-blocking region 23.

Then, laminated glass was prepared in the same manner as in Example 1, and a visible light transmittance (Tv), T1500, and a skin absorption energy rate were measured for the obtained laminated glass. The measurement results are shown in Table 7.

Examples 11 and 12

(Preparation of Interlayer Film for Laminated Glass)

An interlayer film for laminated glass and laminated glass were prepared by the same method as that of Example 1 except that the formulation of a resin composition was changed as shown in a second layer column of Table 8, and evaluated.

Comparative Example 1

To 100 parts by mass of a PVB, 40 parts by mass of a plasticizer was added, followed by sufficiently melt-kneading with a mixing roll. Then, the melt-kneaded product was extruded using an extruder to obtain an interlayer film for laminated glass having a thickness of 800 μm. Next, laminated glass was prepared by the same method as that of Example 1, and evaluated in the same manner as in Example 1.

Comparative Example 2

The formulation was changed as shown in Table 8, and an interlayer film for laminated glass and laminated glass were prepared by the same method as that of Example 1, and evaluated.

Comparative Example 3

The formulation of a second layer was changed as shown in Table 8, and first and second resin compositions were prepared by the same method as that of Example 2. Then, an interlayer film for laminated glass and laminated glass were prepared using the first and second resin compositions in the same manner as in Example 3, and evaluated.

TABLE 7

| | | | Unit | Example 1 | Example 2 | Example 3 | Example 4 | Example 5 | Example 6 | Example 7 |
|---|---|---|---|---|---|---|---|---|---|---|
| | Glass | | Kind | Clear glass | Clear glass | Clear glass | Clear glass | Clear glass | Clear glass | Clear glass |
| | Layer constitution | | | Single-layer structure | FIG. 4 | FIG. 4 | FIG. 4 | FIG. 4 | FIG. 4 | FIG. 2 |
| | Total thickness | | μm | 800 | 800 | 800 | 800 | 800 | 800 | 800 |
| First layer | Formulation | Resin | phr | 100 | 100 | 100 | 100 | 100 | 100 | 100 |
| | | Plasticizer | phr | 40 | 40 | 40 | 40 | 40 | 40 | 40 |
| | | Heat shielding agent 1 | wt % | 0.45 | 0 | 0.15 | 0.2 | 0.45 | 0.45 | 0.45 |
| | | Heat shielding agent 2 | wt % | 0.02 | 0 | 0 | 0 | 0.02 | 0.02 | 0.02 |
| | | Heat shielding agent 3 | wt % | 0.03 | 0 | 0 | 0 | 0.03 | 0.03 | 0.03 |
| | | Dispersant | wt % | 0.045 | 0 | 0.015 | 0.02 | 0.045 | 0.045 | 0.045 |
| | Resin and plasticizer in total | | wt % | 99.5 | 100.0 | 99.8 | 99.8 | 99.5 | 99.5 | 99.5 |
| | Thickness | Thinnest part | μm | 800 | 500 | 500 | 500 | 500 | 500 | 500 |
| Second layer | Formulation | Resin | phr | — | 100 | 100 | 100 | 100 | 100 | 100 |
| | | Plasticizer | phr | — | 40 | 40 | 40 | 40 | 40 | 40 |
| | | Heat shielding agent 1 | wt % | — | 0.00 | 0.15 | 0.20 | 0.45 | 0.45 | 0.45 |
| | | Heat shielding agent 2 | wt % | — | 0.00 | 0.00 | 0.00 | 0.02 | 0.02 | 0.02 |
| | | Heat shielding agent 3 | wt % | — | 0.00 | 0.00 | 0.00 | 0.03 | 0.03 | 0.03 |
| | | Colorant 1 | wt % | — | 0.195 | 0.181 | 0.213 | 0.077 | 0.000 | 0.077 |
| | | Colorant 2 | wt % | — | 0.000 | 0.053 | 0.053 | 0.016 | 0.096 | 0.016 |
| | | Colorant 3 | wt % | — | 0.088 | 0.000 | 0.000 | 0.000 | 0.088 | 0.000 |
| | | Colorant 4 | wt % | — | 0.024 | 0.000 | 0.000 | 0.000 | 0.133 | 0.000 |
| | | Dispersant | wt % | — | 0 | 0.015 | 0.02 | 0.045 | 0.045 | 0.045 |
| | Resin and plasticizer in total | | wt % | — | 99.7 | 99.6 | 99.5 | 99.4 | 99.2 | 99.4 |
| | Colorants in total | | wt % | | 0.31 | 0.23 | 0.27 | 0.09 | 0.32 | 0.09 |
| | Thickness | Thickest part | μm | — | 300 | 300 | 300 | 300 | 300 | 300 |
| Light-permeable region | Content | Heat shielding agent 1 | wt % | 0.45 | 0.00 | 0.15 | 0.20 | 0.45 | 0.45 | — |
| | | Heat shielding agent 2 | wt % | 0.02 | 0.00 | 0.00 | 0.00 | 0.02 | 0.02 | — |
| | | Heat shielding agent 3 | wt % | 0.03 | 0.00 | 0.00 | 0.00 | 0.03 | 0.03 | — |
| | | Dispersant | wt % | — | 0 | 0.015 | 0.02 | 0.045 | 0.045 | — |
| | Resin and plasticizer in total | | wt % | 99.5 | 100.0 | 99.9 | 99.8 | 99.5 | 99.5 | — |

TABLE 7-continued

|  |  |  | Unit | Example 1 | Example 2 | Example 3 | Example 4 | Example 5 | Example 6 | Example 7 |
|---|---|---|---|---|---|---|---|---|---|---|
|  |  | Heat shielding agents in total | wt % | 0.50 | 0.00 | 0.15 | 0.20 | 0.50 | 0.50 | — |
|  | Optical | Tv | % | 82.4 | 88.3 | 87.4 | 87.4 | 82.4 | 82.4 | — |
|  | index | T1500 | % | 0.4 | 77.1 | 18 | 18 | 0.4 | 0.4 | — |
|  |  | Skin absorption energy rate | % | 19.4 | 47.4 | 29 | 29 | 19.4 | 19.4 | — |
|  |  | Time until pains are felt | Second | 132 | 54 | 90 | 87 | 132 | 132 | — |
| Light-blocking region (thickest part) | Content | Heat shielding agent 1 | wt % | — | 0.00 | 0.15 | 0.20 | 0.45 | 0.45 | 0.45 |
|  |  | Heat shielding agent 2 | wt % | — | 0.00 | 0.00 | 0.00 | 0.02 | 0.02 | 0.02 |
|  |  | Heat shielding agent 3 | wt % | — | 0.00 | 0.00 | 0.00 | 0.03 | 0.03 | 0.03 |
|  |  | Colorant 1 | wt % | — | 0.073 | 0.068 | 0.08 | 0.029 | 0 | 0.029 |
|  |  | Colorant 2 | wt % | — | 0 | 0.02 | 0.02 | 0.006 | 0.036 | 0.006 |
|  |  | Colorant 3 | wt % | — | 0.033 | 0 | 0 | 0 | 0.033 | 0 |
|  |  | Colorant 4 | wt % | — | 0.009 | 0 | 0 | 0 | 0.05 | 0 |
|  |  | Dispersant | wt % | — | 0 | 0.015 | 0.02 | 0.045 | 0.045 | 0.045 |
|  |  | Resin and plasticizer in total | wt % | — | 99.9 | 99.7 | 99.7 | 99.4 | 99.3 | 99.4 |
|  |  | Heat shielding agents in total | wt % | — | 0.00 | 0.15 | 0.20 | 0.50 | 0.50 | 0.50 |
|  |  | Colorants in total | wt % |  | 0.12 | 0.09 | 0.10 | 0.04 | 0.12 | 0.04 |
|  |  | Colorant 1/all colorants |  |  | 0.63 | 0.77 | 0.80 | 0.83 | 0.00 | 0.83 |
|  |  | All heat shielding agents/all colorants |  |  | 0.0 | 1.7 | 2.0 | 14.3 | 4.2 | 14.3 |
|  | Optical | Tv | % | — | 1 | 1.6 | 0.9 | 16.6 | 3.9 | 16.6 |
|  | index | T1500 | % | — | 26.87 | 5.39 | 4.53 | 0.23 | 0.36 | 0.23 |
|  |  | Skin absorption energy rate | % | — | 10.2 | 4.1 | 3.1 | 6.2 | 9.3 | 6.2 |
|  |  | Time until pains are felt | Second | — | 187 | 267 | 291 | 231 | 195 | 231 |

TABLE 8

|  |  |  | Unit | Example 8 | Example 9 | Example 10 | Example 11 | Example 12 | Example Example 1 | Example Example 2 | Comparative Example 3 |
|---|---|---|---|---|---|---|---|---|---|---|---|
|  | Glass |  | Kind | Clear glass | Clear glass | Clear glass | Clear glass | Clear glass | Clear glass | Clear glass | Clear glass |
|  | Layer constitution |  |  | FIG. 2 | FIG. 2 | FIG. 4 | Single-layer structure | Single-layer structure | Single-layer structure | Single-layer structure | FIG. 4 |
|  | Total thickness |  | μm | 800 | 800 | 800 | 800 | 800 | 800 | 800 | 800 |
| First layer | Formulation | Resin | phr | 100 | 100 | 100 |  |  | 100 | 100 | 100 |
|  |  | Plasticizer | phr | 40 | 40 | 40 |  |  | 40 | 40 | 40 |
|  |  | Heat shielding agent 1 | wt % | 0.00 | 0.45 | 0.70 |  |  | 0.00 | 0.30 | 0.00 |
|  |  | Heat shielding agent 2 | wt % | 0.00 | 0.00 | 0.00 |  |  | 0.00 | 0.00 | 0.00 |
|  |  | Heat shielding agent 3 | wt % | 0.00 | 0.00 | 0.00 |  |  | 0.00 | 0.00 | 0.00 |
|  |  | Dispersant | wt % | 0 | 0.045 | 0.07 |  |  | 0 | 0.03 | 0 |
|  |  | Resin and plasticizer in total | wt % | 100.0 | 99.5 | 99.2 |  |  | 100.0 | 99.7 | 100.0 |
|  | Thickness | Thinnest part | μm | 500 | 700 | 100 |  |  | 800 | 800 | 500 |
| Second layer | Formulation | Resin | phr | 100 | 100 | 100 | 100 | 100 |  |  | 100 |
|  |  | Plasticizer | phr | 40 | 40 | 40 | 40 | 40 |  |  | 40 |
|  |  | Heat shielding agent 1 | wt % | 1.200 | 0.00 | 0.70 | 0.10 | 0.07 |  |  | 0.00 |
|  |  | Heat shielding agent 2 | wt % | 0.053 | 0.00 | 0.00 | 0.00 | 0.01 |  |  | 0.00 |
|  |  | Heat shielding agent 3 | wt % | 0.080 | 0.00 | 0.00 | 0.00 | 0.00 |  |  | 0.00 |
|  |  | Colorant 1 | wt % | 0.077 | 0.584 | 0.194 | 0.40 | 0.021 |  |  | 0.067 |
|  |  | Colorant 2 | wt % | 0.016 | 0.000 | 0.057 | 0.002 | 0.015 |  |  | 0.013 |
|  |  | Colorant 3 | wt % | 0.000 | 0.264 | 0.000 | 0.002 | 0.010 |  |  | 0.000 |
|  |  | Colorant 4 | wt % | 0.000 | 0.072 | 0.000 | 0.002 | 0.010 |  |  | 0.000 |
|  |  | Dispersant | wt % | 0.12 | 0 | 0.07 | 0.01 | 0.007 |  |  | 0 |
|  |  | Resin and plasticizer in total | wt % | 98.6 | 99.1 | 99.0 | 99.8 | 99.9 |  |  | 99.9 |
|  |  | Colorants in total | wt % | 0.09 | 0.92 | 0.25 | 0.05 | 0.05 |  |  | 0.08 |
|  | Thickness | Thickest part | μm | 300 | 100 | 280 | 800 | 800 |  |  | 300 |
| Light-permeable region | Content | Heat shielding agent 1 | wt % | — | — | 0.70 | — | — | 0.00 | 0.00 | 0.00 |
|  |  | Heat shielding agent 2 | wt % | — | — | 0.00 | — | — | 0.00 | 0.00 | 0.00 |
|  |  | Heat shielding agent 3 | wt % | — | — | 0.00 | — | — | 0.00 | 0.00 | 0.00 |
|  |  | Dispersant | wt % | — | — | 0.07 | — | — | — | — | 0 |
|  |  | Resin and plasticizer in total | wt % | — | — | 99.3 | — | — | 100.0 | 99.7 | 100.0 |
|  |  | Heat shielding agents in total | wt % | — | — | 0.70 | — | — | 0.00 | 0.30 | 0.00 |
|  | Optical | Tv | % | — | — | 86.2 | — | — | 88.3 | 84.3 | 88.3 |

TABLE 8-continued

| | | | Unit | Example 8 | Example 9 | Example 10 | Example 11 | Example 12 | Comparative Example 1 | Comparative Example 2 | Comparative Example 3 |
|---|---|---|---|---|---|---|---|---|---|---|---|
| | index | T1500 | % | — | — | 2.8 | — | — | 77.08 | 12.96 | 77.08 |
| | | Skin absorption energy rate | % | — | — | 24 | — | — | 47.4 | 26.6 | 47.4 |
| | | Time until pains are felt | Second | — | — | 110 | — | — | 54 | 104 | 54 |
| Light-blocking region (thickest part) | Content | Heat shielding agent 1 | wt % | 0.45 | 0.39 | 0.70 | 0.10 | 0.07 | — | — | 0.00 |
| | | Heat shielding agent 2 | wt % | 0.02 | 0.00 | 0.00 | 0.00 | 0.01 | — | — | 0.00 |
| | | Heat shielding agent 3 | wt % | 0.03 | 0.06 | 0.00 | 0.00 | 0.00 | — | — | 0.00 |
| | | Colorant 1 | wt % | 0.029 | 0.073 | 0.143 | 0.040 | 0.021 | — | — | 0.025 |
| | | Colorant 2 | wt % | 0.006 | 0 | 0.042 | 0.002 | 0.015 | — | — | 0.005 |
| | | Colorant 3 | wt % | 0 | 0.033 | 0 | 0.002 | 0.01 | — | — | 0 |
| | | Colorant 4 | wt % | 0 | 0.009 | 0 | 0.002 | 0.01 | — | — | 0 |
| | | Dispersant | wt % | 0.04 | 0.04 | 0.07 | 0.01 | 0007 | — | — | 0 |
| | | Resin and plasticizer in total | wt % | 99.4 | 99.4 | 99.0 | 99.8 | 99.9 | — | — | 100.0 |
| | | Heat shielding agents in total | wt % | 0.50 | 0.45 | 0.70 | 0.10 | 0.08 | — | — | 0.00 |
| | | Colorants in total | wt % | 0.04 | 0.12 | 0.19 | 0.05 | 0.06 | — | — | 0.03 |
| | Colorant 1/all colorants | | | 0.83 | 0.63 | 0.77 | 0.87 | 0.38 | — | — | 0.83 |
| | All heat shielding agents/ all colorants | | | 14.3 | 3.9 | 3.8 | 2.2 | 1.4 | — | — | 0.00 |
| | Optical index | Tv | % | 16.6 | 0.9 | 1.5 | 12.3 | 10 | — | — | 23 |
| | | T1500 | % | 0.23 | 0.177 | 0.576 | 15.9 | 23.7 | — | — | 54 |
| | | Skin absorption energy rate | % | 6.2 | 1.9 | 2.6 | 9.9 | 14.4 | — | — | 25.5 |
| | Time until pains are felt | | Second | 231 | 333 | 306 | 189 | 160 | — | — | 106 |

\*In Tables 7 and 8, the contents with respect to a light-permeable region and a light-blocking region represent the contents of components in the light-permeable region and the light-blocking region, respectively. The light-permeable region in Examples 2 to 6 and 10 and Comparative Example 3 represents the content in the first region, and the light-blocking region represents the total content of all the layers in the thickest part.

\*The evaluation results of the light-permeable region in Examples 2 to 6 and 10 and Comparative Example 3 represent the evaluation results in the first region, and the evaluation results of the light-blocking region represent the evaluation results in the thickest part.

Examples 13 and 14 and Comparative Examples 4 and 5

Polymethyl methacrylate was dissolved in ethyl acetate, and heat shielding agents 1, 2, and 3 were further dispersed in the solution. The obtained solution was coated on one surface of clear glass having a solar transmittance of 87.3% based on JIS R 3106 and having a thickness of 2.5 mm, and MEK was removed by drying to form a coating film (coating layer), thereby obtaining a glass structure. The surface density of each of the heat shielding agents in the coating film was shown in Table 9. The formulation of the coating layer was changed, and glass structures of Example 14 and Comparative Examples 4 and 5 were similarly prepared.

TABLE 9

| | | Unit | Example 13 | Example 14 | Comparative Example 4 | Comparative Example 5 |
|---|---|---|---|---|---|---|
| Glass | Kind | | Clear glass | Clear glass | Clear glass | Clear glass |
| Layer constitution | | | Glass single body + coating layer | Glass single body + coating layer | Glass single body + coating layer | Glass single body + coating layer |
| Glass thickness | | | 2.5 mm | 2.5 mm | 2.5 mm | 2.5 mm |
| Coating layer | Heat shielding agent 1 | Surface density g/m² | 3.85 | 0.86 | 2.57 | 0 |
| | Heat shielding agent 2 | Surface density g/m² | 0.13 | 0.00 | 0 | 0 |
| | Heat shielding agent 3 | Surface density g/m² | 0.26 | 0.00 | 0 | 0 |
| | Colorant 1 | Surface density g/m² | 0 | 0.28 | 0 | 0.21 |
| | Colorant 2 | Surface density g/m² | 0 | 0.02 | 0 | 0.04 |

TABLE 9-continued

|  |  | Unit | Example 13 | Example 14 | Comparative Example 4 | Comparative Example 5 |
|---|---|---|---|---|---|---|
|  | Colorant 3 | Surface density g/m$^2$ | 0 | 0.02 | 0 | 0 |
|  | Colorant 4 | Surface density g/m$^2$ | 0 | 0.02 | 0 | 0 |
|  | Dispersant | Surface density g/m$^2$ | 0.3 | 0.00 | 0.26 | 0 |
|  | Heat shielding agents in total | Surface density g/m$^2$ | 4.24 | 0.86 | 2.57 | 0 |
|  | Colorants in total | Surface density g/m$^2$ | 0 | 0.33 | 0 | 0.26 |
| Optical index | Tv | % | 82 | 15.3 | 86 | 21.6 |
|  | T1500 | % | 0.45 | 17.7 | 3 | 61 |
|  | Skin absorption energy rate | % | 21.9 | 13.7 | 27.4 | 32.7 |
| Time until pains are felt |  | Second | 120 | 165 | 99 | 35 |

In the above Examples 1 to 14, the skin absorption energy rates (X1) and (Y1) in any region of the interlayer film for laminated glass and the glass structure such as the laminated glass were set to 25% or less, so that a time until pains were felt after the irradiation of sunlight could be sufficiently extended.

By contrast, in Comparative Examples 1 to 5, the skin absorption energy rates (X1) and (Y1) were more than 25%, so that a time until pains were felt after the irradiation of sunlight could not be sufficiently extended.

REFERENCE SIGNS LIST 10, 20, 30, 30A, 30B, 30C interlayer film for laminated glass
11, 21A, 21B, 31A, 31B, 31C first layer
12, 22, 32 second layer
33 second region
33A thickest part
33X region having constant thickness
33Y gradation region
34 first region
23, 36 light-blocking region
37 light-permeable region

The invention claimed is:

1. An interlayer film for laminated glass comprising at least an absorption region in which a skin absorption energy rate (X1) of a laminated glass is 25% or less, provided that the laminated glass is produced using two clear glass plates having a solar transmittance of 87.3% based on JIS R 3106.

2. The interlayer film for laminated glass according to claim 1, wherein the interlayer film for laminated glass includes a light-blocking absorption region in which a visible light transmittance (X2) of the laminated glass is less than 70% and a skin absorption energy rate (X1) of the laminated glass is 15% or less.

3. The interlayer film for laminated glass according to claim 2, wherein the interlayer film for laminated glass contains both a heat shielding agent and a colorant in the light-blocking absorption region.

4. The interlayer film for laminated glass according to claim 1,
wherein:
the interlayer film for laminated glass contains a colorant; and
the colorant contains a carbonaceous material and a coloring matter other than the carbonaceous material.

5. The interlayer film for laminated glass according to claim 1, wherein the interlayer film for laminated glass includes a light-permeable absorption region in which the visible light transmittance (X2) is 70% or more and the skin absorption energy rate (X1) is 25% or less.

6. The interlayer film for laminated glass according to claim 5, wherein the interlayer film for laminated glass contains a heat shielding agent in the light-permeable absorption region.

* * * * *